United States Patent
Hadani et al.

(10) Patent No.: US 8,976,851 B2
(45) Date of Patent: Mar. 10, 2015

(54) MODULATION AND EQUALIZATION IN AN ORTHONORMAL TIME-FREQUENCY SHIFTING COMMUNICATIONS SYSTEM

(71) Applicants: Ronny Hadani, Austin, TX (US); Salim Shlomo Rakib, Cupertino, CA (US)

(72) Inventors: Ronny Hadani, Austin, TX (US); Salim Shlomo Rakib, Cupertino, CA (US)

(73) Assignee: Cohere Technologies, Inc., Santa Clara, CA (US)

( * ) Notice: Subject to any disclaimer, the term of this patent is extended or adjusted under 35 U.S.C. 154(b) by 0 days.

(21) Appl. No.: 13/927,092

(22) Filed: Jun. 25, 2013

(65) Prior Publication Data

US 2014/0169433 A1    Jun. 19, 2014

Related U.S. Application Data

(63) Continuation-in-part of application No. 13/117,119, filed on May 26, 2011, and a continuation-in-part of application No. 13/117,124, filed on May 26, 2011, now Pat. No. 8,547,988.

(60) Provisional application No. 61/664,020, filed on Jun. 25, 2012, provisional application No. 61/801,398, filed on Mar. 15, 2013, provisional application No. 61/801,366, filed on Mar. 15, 2013, provisional application No. 61/801,435, filed on Mar. 15, 2013, provisional application No. 61/801,495, filed on Mar. 15, 2013, provisional application No. 61/801,994, filed on Mar. 15, 2013, provisional application No. 61/801,968, filed on Mar. 15, 2013.

(51) Int. Cl.
*H03H 7/30* (2006.01)
*H03H 7/40* (2006.01)
*H03K 5/159* (2006.01)
*H04L 27/01* (2006.01)
*H04L 5/00* (2006.01)
*H04L 23/02* (2006.01)
*H04L 27/26* (2006.01)
*H04L 25/03* (2006.01)

(52) U.S. Cl.
CPC .............. *H04L 27/01* (2013.01); *H04L 5/0016* (2013.01); *H04L 5/0044* (2013.01); *H04L 23/02* (2013.01); *H04L 27/265* (2013.01); *H04L 27/2655* (2013.01); *H04L 27/2697* (2013.01); *H04L 27/2634* (2013.01); *H04L 25/03834* (2013.01)
USPC ........... 375/229; 375/260; 375/267; 370/203; 370/210

(58) Field of Classification Search
CPC .... H04L 27/2634; H04L 5/0016; H04L 23/02
USPC .................. 375/229, 260, 267; 370/203–211
See application file for complete search history.

(56) References Cited

U.S. PATENT DOCUMENTS

2007/0014272 A1\* 1/2007 Palanki et al. ................ 370/344

\* cited by examiner

*Primary Examiner* — Curtis Odom
(74) *Attorney, Agent, or Firm* — Cooley LLP

(57) ABSTRACT

A method which includes receiving a first modulated signal from a first user device, the first modulated signal being generated based upon a time-frequency transformation of first user data. The method further includes receiving a second modulated signal from a second user device, the second modulated signal being generated based upon a time-frequency transformation of second user data. The first modulated signal and the second modulated signal are then processed.

6 Claims, 64 Drawing Sheets

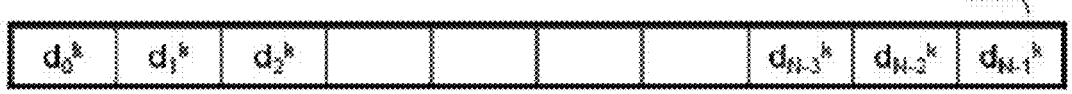
$$X_j^k = \exp(i*2*pi*j*k/N)$$
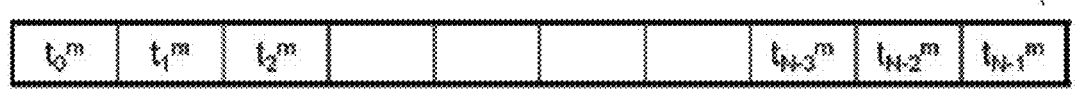
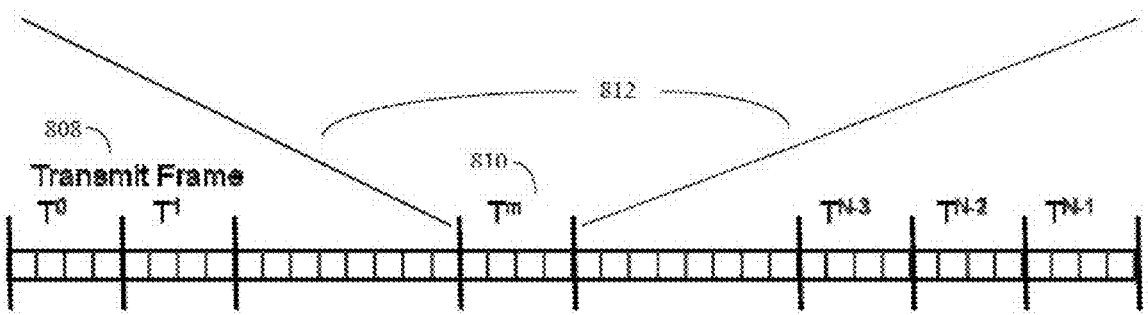
*FIG. 8*

Frame = L x NxN [Symbols]

Duration ⩾ N x [L x (NxT + $T_g$)]

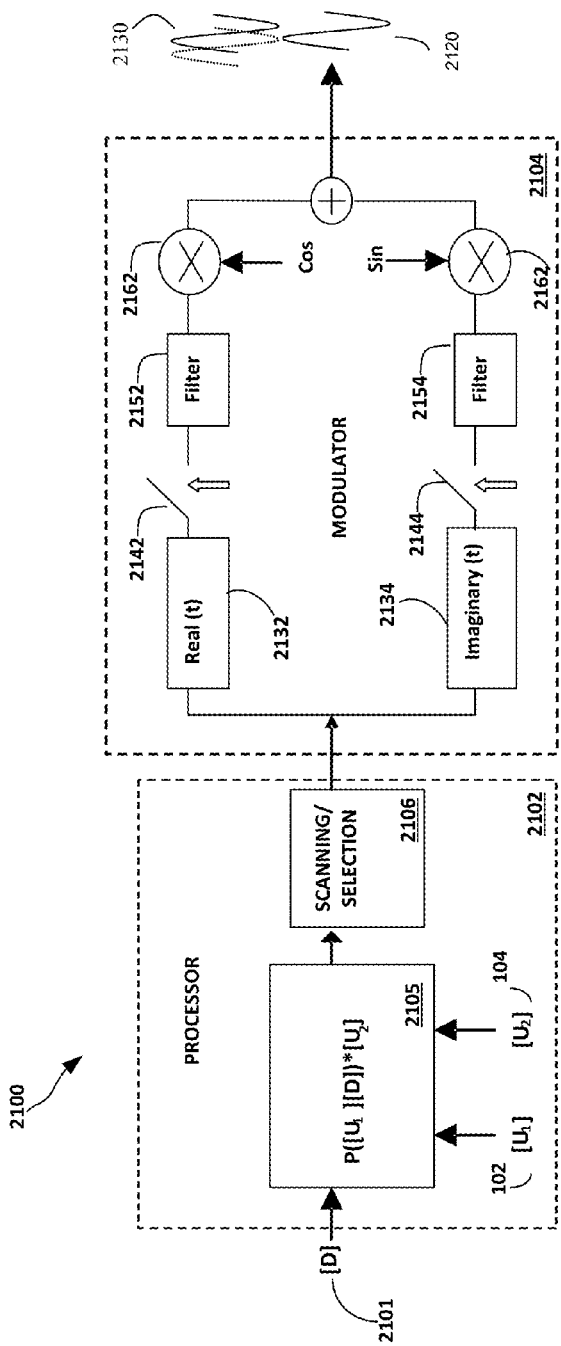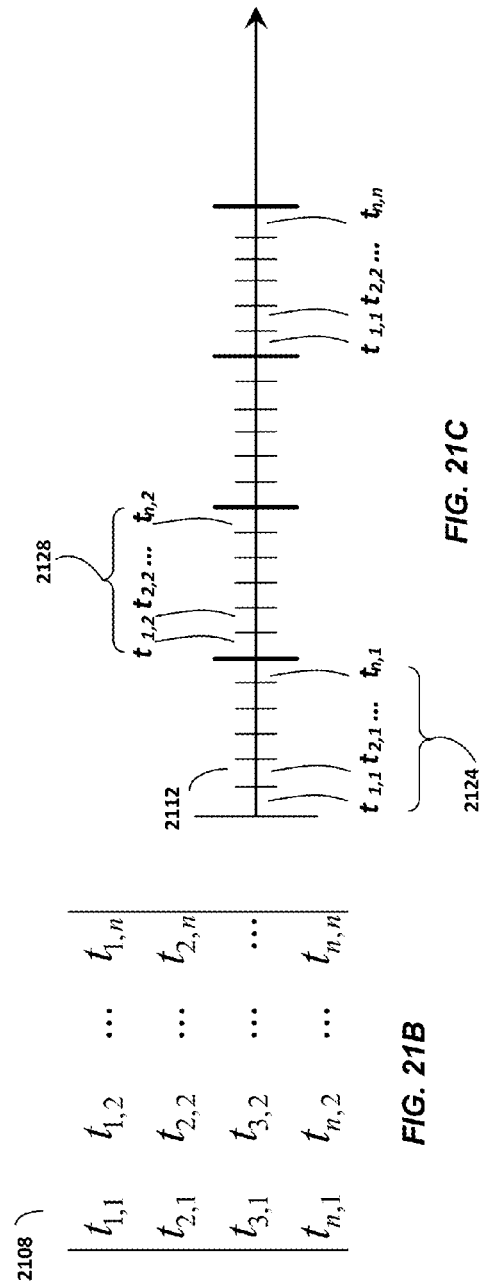
FIG. 21A
FIG. 21B
FIG. 21C

FIG. 22

Matrix B:

| $B^0$ | $B^1$ | $B^2$ | | | | $B^{N-2}$ | $B^{N-1}$ |
|---|---|---|---|---|---|---|---|
| $b_{0,0}$ | $b_{0,1}$ | $b_{0,2}$ | | | | $b_{0,N-2}$ | $b_{0,N-1}$ |
| $b_{1,0}$ | $b_{1,1}$ | $b_{1,2}$ | | | | $b_{1,N-2}$ | $b_{1,N-1}$ |
| $b_{2,0}$ | $b_{2,1}$ | $b_{2,2}$ | | | | $b_{2,N-2}$ | $b_{2,N-1}$ |
| | | | | | | | |
| | | | | | | | |
| $b_{N-2,0}$ | $b_{N-2,1}$ | $b_{N-2,2}$ | | | | $b_{N-2,N-2}$ | $b_{N-2,N-1}$ |
| $b_{N-1,0}$ | $b_{N-1,1}$ | $b_{N-1,2}$ | | | | $b_{N-1,N-2}$ | $b_{N-1,N-1}$ |

B =

Matrix A:

| $A^0$ | $A^1$ | $A^2$ | | | | $A^{N-2}$ | $A^{N-1}$ |
|---|---|---|---|---|---|---|---|
| $a_{0,0}$ | $a_{0,1}$ | $a_{0,2}$ | | | | $a_{0,N-2}$ | $a_{0,N-1}$ |
| $a_{1,1}$ | $a_{1,2}$ | $a_{1,3}$ | | | | $a_{1,N-1}$ | $a_{1,0}$ |
| $a_{2,2}$ | $a_{2,3}$ | $a_{2,4}$ | | | | $a_{2,0}$ | $a_{2,1}$ |
| | | | | | | | |
| | | | | | | | |
| $a_{N-2,N-2}$ | $a_{N-2,N-1}$ | $a_{N-2,0}$ | | | | $a_{N-2,N-4}$ | $a_{N-2,N-3}$ |
| $a_{N-1,N-1}$ | $a_{N-1,0}$ | $a_{N-1,1}$ | | | | $a_{N-1,N-3}$ | $a_{N-1,N-2}$ |

=

$b_{i,j} = a_{i,(i+j) \bmod N}$

FIG. 23

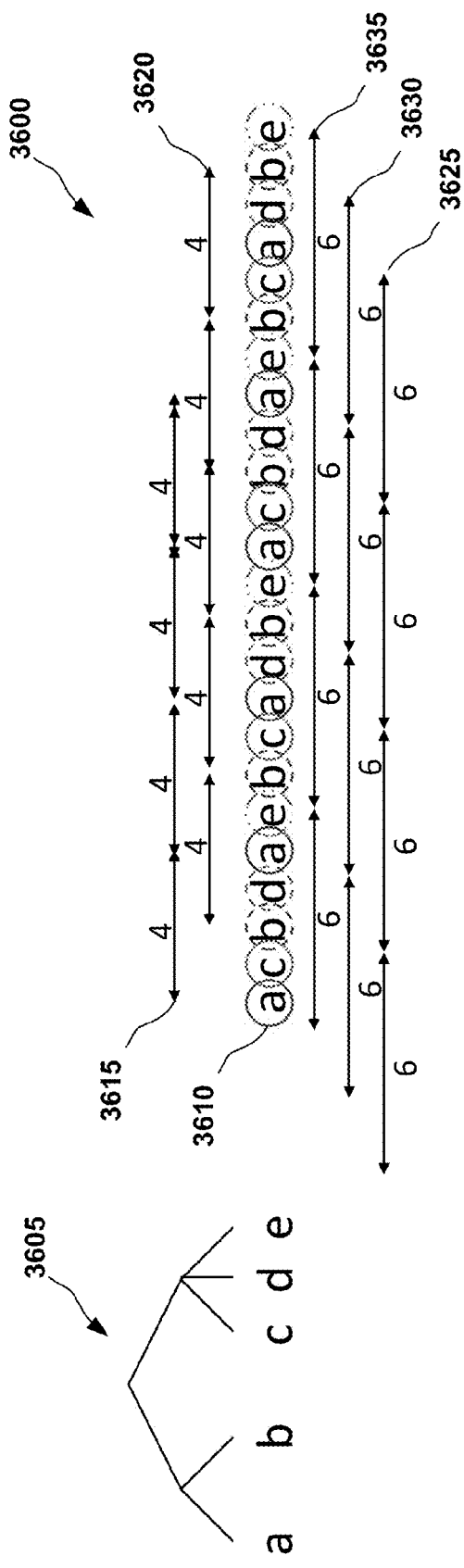
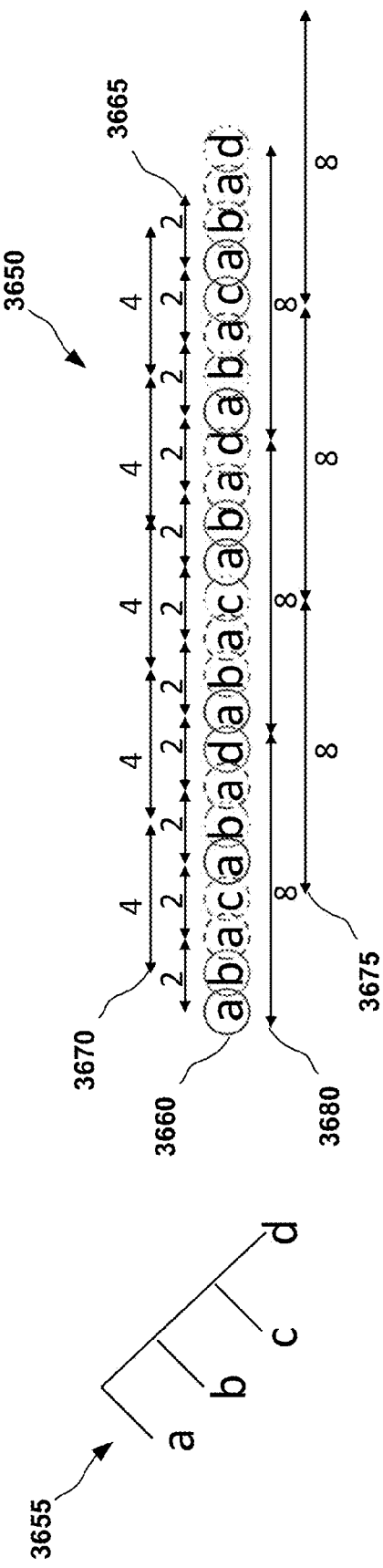
FIG. 36A
FIG. 36B

MODULATION AND EQUALIZATION IN AN ORTHONORMAL TIME-FREQUENCY SHIFTING COMMUNICATIONS SYSTEM

CROSS-REFERENCE TO RELATED APPLICATIONS

The present application claims the benefit of priority under 35 U.S.C. §119(e) of U.S. Provisional Application Ser. No. 61/664,020, entitled MODULATION AND EQUALIZATION IN AN ORTHONORMAL TIME-FREQUENCY SHIFTING COMMUNICATIONS SYSTEM, filed Jun. 25, 2012, of U.S. Provisional Application Ser. No. 61/801,398, entitled MODULATION AND EQUALIZATION IN AN ORTHONORMAL TIME-FREQUENCY SHIFTING COMMUNICATIONS SYSTEM, filed Mar. 15, 2013, of U.S. Provisional Application Ser. No. 61/801,366, entitled MODULATION AND EQUALIZATION IN AN ORTHONORMAL TIME-FREQUENCY SHIFTING COMMUNICATIONS SYSTEM, filed Mar. 15, 2013, of U.S. Provisional Application Ser. No. 61/801,435, entitled MODULATION AND EQUALIZATION IN AN ORTHONORMAL TIME-FREQUENCY SHIFTING COMMUNICATIONS SYSTEM, filed Mar. 15, 2013, of U.S. Provisional Application Ser. No. 61/801,495, entitled MODULATION AND EQUALIZATION IN AN ORTHONORMAL TIME-FREQUENCY SHIFTING COMMUNICATIONS SYSTEM, filed Mar. 15, 2013, of U.S. Provisional Application Ser. No. 61/801,994, entitled MODULATION AND EQUALIZATION IN AN ORTHONORMAL TIME-FREQUENCY SHIFTING COMMUNICATIONS SYSTEM, filed Mar. 15, 2013, and of U.S. Provisional Application Ser. No. 61/801,968, entitled MODULATION AND EQUALIZATION IN AN ORTHONORMAL TIME-FREQUENCY SHIFTING COMMUNICATIONS SYSTEM, filed Mar. 15, 2013, the contents of each of which are hereby incorporated by reference in their entirety for all purposes. This application is a continuation-in-part of U.S. patent application Ser. No. 13/117,119, entitled ORTHONORMAL TIME-FREQUENCY SHIFTING AND SPECTRAL SHAPING COMMUNICATIONS METHOD, filed May 26, 2011, which claims priority to U.S. Provisional Application Ser. No. 61/349,619, entitled ORTHONORMAL TIME-FREQUENCY SHIFTING AND SPECTRAL SHAPING COMMUNICATIONS METHOD, filed May 28, 2010, and is a continuation-in-part of U.S. patent application Ser. No. 13/117,124, entitled COMMUNICATIONS METHOD EMPLOYING ORTHONORMAL TIME-FREQUENCY SHIFTING AND SPECTRAL SHAPING, filed May 26, 2011, which claims priority to U.S. Provisional Application Ser. No. 61/349,619, entitled ORTHONORMAL TIME-FREQUENCY SHIFTING AND SPECTRAL SHAPING COMMUNICATIONS METHOD, filed May 28, 2010, the contents of each of which are hereby incorporated by reference in their entirety for all purposes.

FIELD

This disclosure generally relates communications protocols and methods, and more particularly relates to methods for modulation and related processing of signals used for wireless and other forms of communication.

BACKGROUND

Modern electronic communication devices, such as devices configured to communicate over transmission media such as optical fibers, electronic wires/cables, or wireless links, all operate by modulating signals and sending these signals over the applicable transmission medium. These signals, which generally travel at or near the speed of light, can be subjected to various types of degradation or channel impairments. For example, echo signals can potentially be generated by optical fiber or wire/cable mediums whenever the modulated signal encounters junctions in the optical fiber or wire/cable. Echo signals can also potentially be generated when wireless signals bounce off of wireless reflecting surfaces, such as the sides of buildings, and other structures. Similarly, frequency shifts can occur when the optical fiber or wire/cable pass through different regions of fiber or cable with somewhat different signal propagating properties or different ambient temperatures. For wireless signals, signals transmitted to or from a moving vehicle can encounter Doppler effects that also result in frequency shifts. Additionally, the underlying equipment (i.e. transmitters and receivers) themselves do not always operate perfectly, and can produce frequency shifts as well.

These echo effects and frequency shifts are undesirable and, if such shifts become too large, may adversely affect network performance by effectively lowering maximum attainable data rates and/or increasing error rates. Such performance degradation is particularly problematic in wireless networks, which are straining to accommodate more and more users, each desiring to send and receive ever-increasing amounts of data. Within wireless networks, the adverse effects arising from echo effects and frequency shifts stem at least in part from the characteristics of existing wireless devices having wireless communication capability. In particular, these portable wireless devices (such as cell phones, portable computers, and the like) are often powered by small batteries, and the users of such devices typically expect to operate them for many hours before recharging is required. To meet these user expectations, the wireless transmitters on these devices must output wireless signals using very small amounts of power, making it difficult to distinguish the wireless radio signal over background noise.

An additional problem is that many of these devices are carried on moving vehicles, such as automobiles. This causes additional complications because the low-power wireless signal transmitted by these devices can also be subjected to various distortions, such as varying and unpredictable Doppler shifts, and unpredictable multi-path effects often caused by varying radio reflections off of buildings or other structures.

Moreover, the noise background of the various wireless channels becomes ever higher as noise-producing electrical devices proliferate. The proliferation of other wireless devices also adds to the background noise.

SUMMARY

The system and method for wideband communications disclosed herein is capable of operating using relatively low amounts of power while maintaining improved resistance to problems of Doppler shift, multi-path reflections, and background noise. Although examples in the context of wireless communications will be used throughout this application, the methods disclosed herein are intended, unless stated otherwise, to be equally applicable to wired communication systems.

In one aspect, the present disclosure describes a method of providing a modulated signal useable in a signal transmission system. The method of this aspect includes establishing an original data frame having a first dimension of at least N elements and a second dimension of at least N elements, wherein N is greater than one. The method further includes transforming the original data frame in accordance with a time-frequency transformation so as to provide a transformed data matrix. A modulated signal is generated in accordance with elements of the transformed data matrix.

In another aspect, the present disclosure describes a method for modulating data for transmission within a communication system. The method of this aspect includes establishing a time-frequency shifting matrix of dimension N×N, wherein N is greater than one. The method further includes combining the time-frequency shifting matrix with a data frame to provide an intermediate data frame. A transformed data matrix is provided by permuting elements of the intermediate data frame. A modulated signal is generated in accordance with elements of the transformed data matrix.

In a further aspect the present disclosure is directed to a method which includes receiving a first modulated signal from a first user device, the first modulated signal being generated based upon a time-frequency transformation of first user data. The method further includes receiving a second modulated signal from a second user device, the second modulated signal being generated based upon a time-frequency transformation of second user data. In addition, the method includes processing the first modulated signal and the second modulated signal.

In yet a further aspect the present disclosure pertains to a method for echo cancellation. The method includes developing a time-frequency model of an echo channel between a transmit antenna and a receive antenna. The method further includes generating, based upon the time-frequency model, an echo cancellation signal.

The disclosure is further directed to a method for full-duplex communication. The method includes transmitting, from a transmit antenna and within a frequency band, a transmit signal. The method further includes receiving, at a receive antenna, a receive signal within the frequency band. In addition, the method includes correcting the receive signal in accordance with a time-frequency representation of a communication channel between the transmit antenna and the receive antenna.

In another aspect the disclosure relates to a method which includes receiving a set of M time-frequency representations of signal energy received by a set of M antennas of a receiver, the signal energy being received in response to information signals transmitted by a set of N transmit antennas of a transmitter wherein each of the information signals is generated using a time-frequency transformation. The method further includes generating estimates of the information signals based upon the M time-frequency representations, where M is greater than N.

In yet another aspect the disclosure is directed to a method of signal separation. The method includes receiving, at a receiver, first information signals within a first frequency band wherein the first information signals are modulated in accordance with a first data matrix encoded using a first basis matrix. In addition, the method includes receiving, at the receiver, second information signals within the first frequency band wherein the second information signals are modulated in accordance with a second data matrix encoded using a second basis matrix different from the first basis matrix. The method also includes generating estimates of elements of the first data matrix and elements of the second data matrix based upon the first information signals and the second information signals.

The present disclosure also pertains to a method which includes receiving a time resolution control signal. The method further includes transforming a first original data frame in accordance with a first time-frequency transformation so as to provide a first transformed data matrix wherein the first time-frequency transformation is selected in accordance with the time resolution control signal. In addition, the method includes generating a first modulated signal in accordance with elements of the first transformed data matrix.

In yet a further aspect the present disclosure pertains to a method of variable latency data transmission. The method includes transforming a first original data frame in accordance with a first time-frequency transformation so as to provide a first transformed data matrix wherein the first time-frequency transformation is associated with a first latency. In addition, the method includes transforming a second original data frame in accordance with a second time-frequency transformation so as to provide a second transformed data matrix wherein the second time-frequency transformation is associated with a second latency. The method further includes transmitting elements of the first transformed data matrix over a first frame period corresponding to the first latency and transmitting elements of the second transformed data matrix over a second frame period corresponding to the second latency wherein the first frame period is different from the second frame period.

In another aspect, the present disclosure describes a method of receiving data. The method of this aspect includes receiving, on one or more carrier waveforms, signals representing a plurality of data elements of an original data frame wherein each of the data elements are represented by cyclically time shifted and cyclically frequency shifted versions of a known set of waveforms, generating, based upon the signals, a received data frame having a first dimension of at least N elements and a second dimension of at least N elements, where N is greater than one, wherein the first dimension corresponds to a frequency shift axis and the second dimension corresponds to a time shift axis. The method of this aspect further includes performing, using a decoding matrix, an inverse transformation operation with respect to elements of the received data frame so as to yield a non-transformed matrix, and generating, based upon the non-transformed matrix, a recovered data frame comprising an estimate of the original data frame.

In another aspect, the present disclosure describes a new signal modulation technique which involves spreading data symbols over a large range of times, frequencies, and/or spectral shapes (waveforms). Such method, termed "Orthonormal Time-Frequency Shifting and Spectral Shaping ("OTFSSS") when spectral shaping is employed or, more generally, "OTFS", operates by sending data in what are generally substantially larger "chunks" or frames than the data frames used in prior methods. That is, while prior art methods might encode and send units or frames of "N" symbols over a communications link over a particular time interval, OTFS contemplates that frames of $N^2$ symbols are transmitted (often over a relatively longer time interval). With OTFS modulation, each data symbol or element that is transmitted is extensively spread in a novel manner in time, frequency and/or spectral shape space. At the receiving end of the connection, each data symbol is resolved based upon substantially the entire frame of $N^2$ received symbols.

In another aspect, disclosed herein is a wireless communication method predicated upon spreading input data over time, frequency and potentially spectral shape using convolution unit matrices (data frames) of N×N ($N^2$). In general, either all $N^2$ of the data symbols are received over N particular spreading time intervals (each composed of N time slices), or no such symbols are received. During the transmission process, each N×N data frame matrix will typically be multiplied by a first N×N time-frequency shifting matrix, permuted, and then multiplied by a second N×N spectral-shaping matrix, thereby mixing each data symbol across the entire resulting N×N matrix (which may be referred to as the TFSSS data matrix). Columns from the TFSSS data matrix are then selected, modulated, and transmitted, on a one element per time slice basis. At the receiver, a replica TFSSS matrix is reconstructed and deconvolved, yielding a reconstruction of the input data.

Embodiments of the systems and methods described herein may use novel time-frequency shifting and spectral shaping codes to spread data across time, spectrum, waveform, and/or spectral-shape. In such embodiments time-shifting techniques, frequency-shifting techniques and, optionally, spectral-shaping techniques may be used in conjunction to transmit data at high rates in a manner unusually resistant to problems caused by Doppler shifts, multi-path effects, and background noise.

During the signal transmission process, an OTFS transmitter may subdivide and transmit each data element or symbol over a cyclically varying range of frequencies and over a series of spreading time intervals. Often this will require that each data element or symbol be transmitted over a somewhat longer period of time than is utilized for transmission data frames in other communication systems. Notwithstanding these potentially longer transmission periods, the OTFS system is capable of achieving superior data rate performance by using a complex multiplexing methods premised on the convolution and deconvolution schemes discussed herein. Through use of such methods a comparatively large amount of information may be included within each transmitted signal. In particular, the relatively large number (i.e., $N^2$) of data symbols or elements transmitted during each data frame using the convolution and deconvolution schemes disclosed herein enable comparatively high data rates to be attained despite the diminution in data rate which could otherwise result from division of a single data element or symbol over N time-spreading intervals. Moreover, because each data symbol is typically subdivided and sent over a plurality of signals, signal processing schemes described herein may be employed to permit data symbols to be recovered even in the event of loss of one or more of the plurality of transmitted signals. In addition, such schemes may be employed to compensate for losses due to common wireless communications link impairments, such as Doppler shift and multi-path effects.

For example, whereas with prior art, if by chance Doppler effects caused by one wireless signal from a first transmitter fall on the same frequency as another signal from a first or second transmitter (for multi-path effects, a signal from a moving first or second transmitter that hits an object at an arbitrary angle to the receiver can produce a Doppler distorted reflection or echo signal of the first or second transmitter that also reaches the receiver), this could result in confusion, ambiguity, and data loss. By contrast, by cyclically shifting the frequency and sending an element of data over a plurality of time intervals, the impact of a Doppler "collision" is substantially minimized —at most there will be a brief transient effect resulting in the loss of only one of a plurality of signals used to transmit a particular data symbol or element. The effects of other communications link impairments, such as multi-path effects, can also be minimized because the cyclically shifting frequency provides yet another way to compensate for multi-path effects.

There exist at least two ways in which a data element or symbol may be partitioned across a time range of cyclically shifting frequencies, and thus two basic forms of the OTFS method. In a first form of the OTFS method, the data from a single symbol is convolved and partitioned across multiple time slices, and ultimately transmitted as a series of time slices, on a per time slice basis. When this transmission scheme is used the cyclically-shifting frequency is accomplished over a plurality of time spreading intervals. Thus, for this first form of the OTFS method, the basic unit of data transmission operates on a time slice basis.

In a second form of the OTFS method, the data is ultimately transmitted as a series of waveforms with characteristic frequencies, where each waveform lasts for a spreading interval of time generally consisting of N time slices. When this transmission scheme is used the cyclically-shifting frequency is accomplished over a plurality of time spreading intervals. Thus, for this second form of the OTFS method, the basic unit of data transmission operates over a relatively longer spreading time interval comprised of N time slices. Unless otherwise specified, the discussion within the remainder of this disclosure will focus on the first form of the OTFS method in which the basic unit of data transmission operates on a time slice basis.

Again considering the first form of the OTFS method, in one embodiment this form of the OTFS method contemplates formation of an N×N data frame matrix having $N^2$ symbols or elements and multiplication of this data frame by a first N×N time-frequency shifting matrix. The result of this multiplication is optionally permuted and, following permutation, optionally multiplied by a second N×N spectral shaping matrix. As a result, the $N^2$ data elements in the frame of data are essentially mixed or distributed throughout the resulting N×N matrix product, here called a "Time Frequency Shifted" data matrix or "TFS" data matrix. If the optional spectral shaping is used, the resulting N×N matrix product may be referred to as a "Time Frequency Shifted and Spectral Shaped" data matrix or "TFSSS" data matrix. Thus, for example, a single symbol or element in row 1 column 1 of the N×N frame of data may end up being distributed over all rows and columns of the resulting N×N TFS or TFSSS data matrix (in what follows the term TFS may connote either the TFS or TFSSS data matrix).

The contents (i.e. the individual elements) of this TFS data matrix may then be selected, modulated, and transmitted. Usually N elements at a time from this TFS data matrix (often a column from the TFS data matrix) are selected to be sent over one spreading interval of time, thus often requiring N spreading intervals of time to transmit the entire contents of the TFS data matrix. This spreading interval of time in turn is usually composed of at least N time slices. During each time slice, one element from the most recent selection of N elements (for example, from the selected column of the TFS data matrix) is selected, modulated, and transmitted.

At the receiving end, the process operates generally in reverse. The individual elements of the TFS data matrix are received over various time slices and various time spreading intervals, allowing the receiver to reassemble a replica (which may not be a perfect replica due to communications link impairment effects) of the original TFS data matrix. Using its knowledge of the first N×N time-frequency shifting matrix, the optional permutation process, the second N×N spectral shaping matrix, and the selection process used to select different elements of the TFS data matrix, as well as various noise reduction or compensation techniques to overcome impairment effects, the receiver will then reconstruct the original N×N data frame matrix of $N^2$ symbols or elements. Because each data symbol or element from the original data frame is often spread throughout the TFS data matrix, often most or the entire TFS matrix will need to be reconstructed in order to solve for the original data symbol or element. However, by using noise reduction and compensation techniques, minor data losses during transmission can often be compensated for.

In some embodiments, advanced signal modulation schemes utilizing cyclically time shifted and cyclically frequency shifted waveforms may be utilized to correct channel impairments in a broad range of situations. For example, in one aspect the OTFS method may contemplate transfer of a plurality of data symbols using a signal modulated in a manner which effectively compensates for the adverse effects of echo reflections and frequency offsets. This method will generally comprise distributing this plurality of data symbols into one or more N×N symbol matrices and using these one or more N×N symbol matrices to control the signal modulation occurring within a transmitter. Specifically, during the transmission process each data symbol within an N×N symbol matrix is used to weight N waveforms. These N waveforms are selected from an $N^2$ sized set of all permutations of N cyclically time shifted and N cyclically frequency shifted waveforms determined according to an encoding matrix U. The net result produces, for each data symbol, N symbol-weighted cyclically time shifted and cyclically frequency shifted waveforms. Generally this encoding matrix U is chosen to be an N×N unitary matrix that has a corresponding inverse decoding matrix $U^H$. Imposition of this constraint means that the encoding matrix U produces results which can generally be decoded.

Continuing with this example, for each data symbol in the N×N symbol matrix, the transmitter may sum the corresponding N symbol-weighted cyclically time shifted and cyclically frequency shifted waveforms, and by the time that the entire N×N symbol matrix is so encoded, produce $N^2$ summation-symbol-weighted cyclically time shifted and cyclically frequency shifted waveforms. The transmitter will then transmit these $N^2$ summation-symbol-weighted cyclically time shifted and cyclically frequency shifted waveforms, structured as N composite waveforms, over any combination of N time blocks or frequency blocks.

To receive and decode this transmission, the transmitted $N^2$ summation-symbol-weighted cyclically time shifted and cyclically frequency shifted waveforms are subsequently received by a receiver which is controlled by the corresponding decoding matrix $U^H$. The receiver will then use this decoding matrix $U^H$ to reconstruct the original symbols in the various N×N symbol matrices.

This process of transmission and reception will normally be performed by various electronic devices, such as a microprocessor equipped, digital signal processor equipped, or other electronic circuit that controls the convolution and modulation parts of the signal transmitter. Similarly the process of receiving and demodulation will also generally rely upon a microprocessor equipped, digital signal processor equipped, or other electronic circuit that controls the demodulation, accumulation, and deconvolution parts of the signal receiver. However, although the exemplary techniques and systems disclosed herein will often be discussed within the context of a wireless communication system comprised of at least one wireless transmitter and receiver, it should be understood that these examples are not intended to be limiting. In alternative embodiments, the transmitter and receiver may be optical/optical-fiber transmitters and receivers, electronic wire or cable transmitters and receivers, or other types of transmitters in receivers. In principle, more exotic signal transmission media, such as acoustic signals and the like, may also be utilized in connection with the present methods.

As previously discussed, regardless of the media (e.g. optical, electrical signals, or wireless signals) used to transmit the various waveforms, these waveforms can be distorted or impaired by various signal impairments such as various echo reflections and frequency shifts. As a result, the receiver will often receive a distorted form of the original signal. Here, embodiments of the OTFS method make use of the insight that cyclically time shifted and cyclically frequency shifted waveforms are particularly useful for detecting and correcting for such distortions.

Because communications signals propagate through their respective communications media at a finite speed (often at or near the speed of light), and because the distance from a transmitter to a receiver is usually substantially different than the distance between the transmitter, the place(s) where the echo is generated, and the distance between the place(s) where the echo is generated and the receiver, the net effect of echo reflections is that both an originally transmitted waveform and time-shifted versions thereof are received at the receiver, thereby resulting in a distorted composite signal. However, embodiments of the OTFS method utilizing cyclically time shifted waveforms may be employed to counteract this distortion. In particular, a time deconvolution device at the receiver may operate to analyze the cyclically time varying patterns of these waveforms, determine the repeating patterns, and use these repeating patterns to help decompose the echo distorted signal back into various time-shifted versions of the various signals. The time deconvolution device can also determine how much of a time-offset (or multiple time offsets) is or are required to enable the time delayed echo signal(s) to match up with the originally transmitted signal. This time offset value, which may be referred to herein as a time deconvolution parameter, can both give useful information as to the relative position of the echo location(s) relative to the transmitter and receiver, and can also help the system characterize some of the signal impairments that occur between the transmitter and receiver. This can help the communications system automatically optimize itself for better performance.

In addition to echo reflections, other signal distortions may occur that can result in one or more frequency shifts. For example, a Doppler shift or Doppler effects can occur when a wireless mobile transmitter moves towards or away from a stationary receiver. If the wireless mobile transmitter is moving towards the stationary receiver, the wireless waveforms that it transmits will be offset to higher frequencies, which can cause confusion if the receiver is expecting signals modulated at a lower frequency. An even more confusing result can occur if the wireless mobile transmitter is moving perpendicular to the receiver, and there is also an echo source (such as a building) in the path of the wireless mobile transmitter. Due to Doppler effects, the echo source receives a blue shifted (higher frequency) version of the original signal, and reflects this blue shifted (higher frequency) version of the original signal to the receiver. As a result, the receiver will receive both the originally transmitted "direct" wireless waveforms at the original lower frequency, and also a time-delayed higher frequency version of the original wireless waveforms, causing considerable confusion.

It has been found that the use of cyclically time shifted waveforms and cyclically frequency shifted waveforms may help address this type of problem. In particular, it has been found that the cyclic variation yields important pattern matching information which may enable the receiver to determine which portions of a received signal have been distorted and the extent of such distortion. In one embodiment these cyclically varying signals allow the receiver to perform a two-dimensional (e.g. time and frequency) deconvolution of the received signal. For example, the frequency deconvolution portion of the receiver can analyze the cyclically frequency varying patterns of the waveforms, essentially do frequency pattern matching, and decompose the distorted signal into various frequency shifted versions of the various signals. At the same time, this portion of the receiver can also determine how much of a frequency offset is required to cause the frequency distorted signal to match up with the originally transmitted signal. This frequency offset value, herein termed a "frequency deconvolution parameter", can give useful information as to the transmitter's velocity relative to the receiver. This may facilitate characterization of some of the frequency shift signal impairments that occur between the transmitter and receiver.

As before, the time deconvolution portion of the receiver can analyze the cyclically time varying patterns of the waveforms, again do time pattern matching, and decompose the echo distorted signal back into various time-shifted versions of the original signal. The time deconvolution portion of the receiver can also determine how much of a time-offset is required to cause the time delayed echo signal to match up with the original or direct signal. This time offset value, again called a "time deconvolution parameter", can also give useful information as to the relative positions of the echo location(s), and can also help the system characterize some of the signal impairments that occur between the transmitter and receiver.

The net effect of both the time and frequency deconvolution, when applied to transmitters, receivers, and echo sources that potentially exist at different distances and velocities relative to each other, is to allow the receiver to properly interpret the impaired echo and frequency shifted communications signals.

Further, even if, at the receiver, the energy received from the undistorted form of the originally transmitted signal is so low as to have a undesirable signal to noise ratio, by applying the appropriate time and frequency offsets or deconvolution parameters, the energy from the time and/or frequency shifted versions of the signals (which would otherwise be contributing to noise) can instead be harnessed to contribute to the signal instead.

As before, the time and frequency deconvolution parameters can also provide useful information as to the relative positions and velocities of the echo location(s) relative to the transmitter and receiver, as well as the various velocities between the transmitter and receiver. These in turn can help the system characterize some of the signal impairments that occur between the transmitter and receiver, as well as assist in automatic system optimization methods.

Thus in some embodiments, the OTFS system may also provide a method for an improved communication signal receiver where, due to either one or the combination of echo reflections and frequency offsets, multiple signals due to echo reflections and frequency offsets result in the receiver receiving a time and/or frequency convolved signal representing time and/or frequency shifted versions of the $N^2$ summation-symbol-weighed cyclically time shifted and frequency shifted waveforms previously sent by the transmitter. Here, the improved receiver will further perform a time and/or frequency deconvolution of the impaired signal to correct for various echo reflections and frequency offsets. This improved receiver method will result in both time and frequency deconvolved results (i.e. signals with higher quality and lower signal to noise ratios), as well as various time and frequency deconvolution parameters that, in addition to automatic communications channel optimization, are also useful for other purposes as well. These other purposes can include channel sounding (i.e. better characterizing the various communication system signal impairments), adaptively selecting modulation methods according to the various signal impairments, and even improvements in radar systems.

BRIEF DESCRIPTION OF THE DRAWINGS

For a better understanding of the nature and objects of various embodiments of the invention, reference should be made to the following detailed description taken in conjunction with the accompanying drawings, wherein:

FIG. 8 shows an exemplary set of basic building blocks used to convolve and deconvolve data according to a second form of the OTFS method.

FIG. 21A shows a more detailed diagram of one embodiment of an OTFS transmitter module.

FIG. 21B depicts a TFS matrix generated within the OTFS transmitter of FIG. 21A.

FIG. 21C depicts a timeline relevant to operation of the transmitter of FIG. 21A.

FIG. 22 illustrates an exemplary permutation operation that can be used in an OTFS modulation scheme.

FIG. 23 illustrates another exemplary permutation operation that can be used in an OTFS modulation scheme.

FIG. 25 illustrates a third exemplary time and frequency tiling scheme that can be used in the OTFS modulation scheme.

FIGS. 36A and 36B demonstrate the utility of transmitting various different time blocks consistent with an interleaving scheme based at least in part upon expected latency.

DETAILED DESCRIPTION

One unique aspect of the signal modulation techniques described herein is the concept of spreading the data of a single symbol over a relatively large range of times, frequencies, and spectral shapes. In contrast, prior communication systems have been predicated upon assigning a given data symbol to a specific time-spreading interval or time slice uniquely associated with such data symbol. As is discussed below, the disclosed OTFS method is based at least in part upon the realization that in many cases various advantages may accrue from spreading the data of a single symbol over multiple time-spreading intervals shared with other symbols. In contrast with prior art modulation techniques, the OTFS method may involve convolving a single data symbol over both a plurality of time slots, a plurality of frequencies or spectral regions (spread spectrum), and a plurality of spectral shapes. As is described below, this approach to data convolution results in superior performance over impaired communications links.

System Overview

Figure 1:
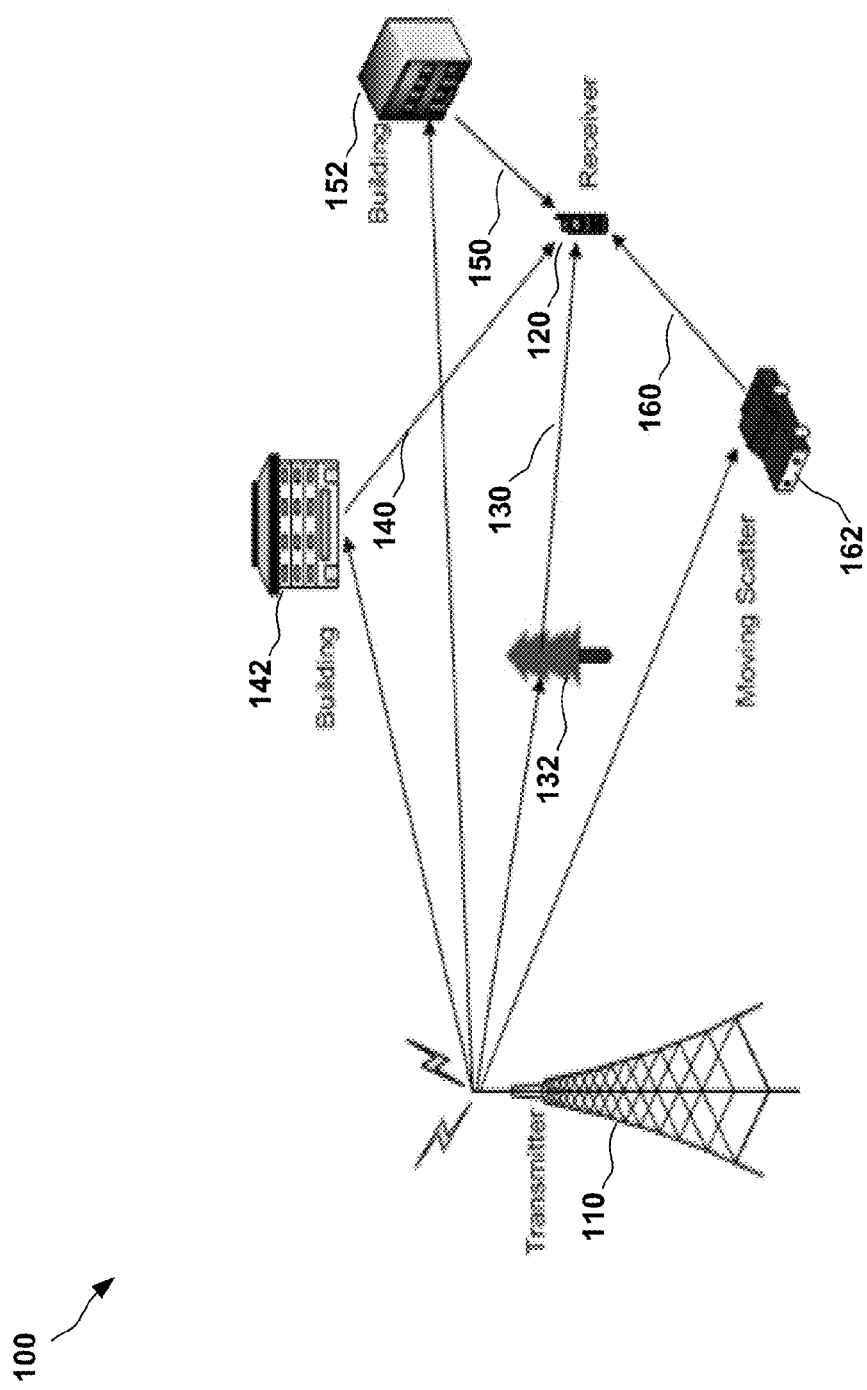
FIG. 1 illustrates an example of a wireless communication system that may exhibit time/frequency selective fading.

FIG. 1 illustrates an example of a wireless communication system 100 that may exhibit time/frequency selective fading. The system 100 includes a transmitter 110 (e.g., a cell phone tower) and a receiver 120 (e.g., a cell phone). The scenario illustrated in FIG. 1 includes multiple pathways (multi-path) that the signal transmitted from the transmitter 100 travels through before arriving at the receiver 100. A first pathway 130 reflects through a tree 132, second pathway 140 reflects off of a building 142 and a third pathway 150 reflects off of a second building 152. A fourth pathway 160 reflects off of a moving car 162. Because each of the pathways 130, 140, 150 and 160 travels a different distance, and is attenuated or faded at a different level and at a different frequency, when conventionally configured the receiver 120 may drop a call or at least suffer low throughput due to destructive interference of the multi-path signals.

Figure 43:
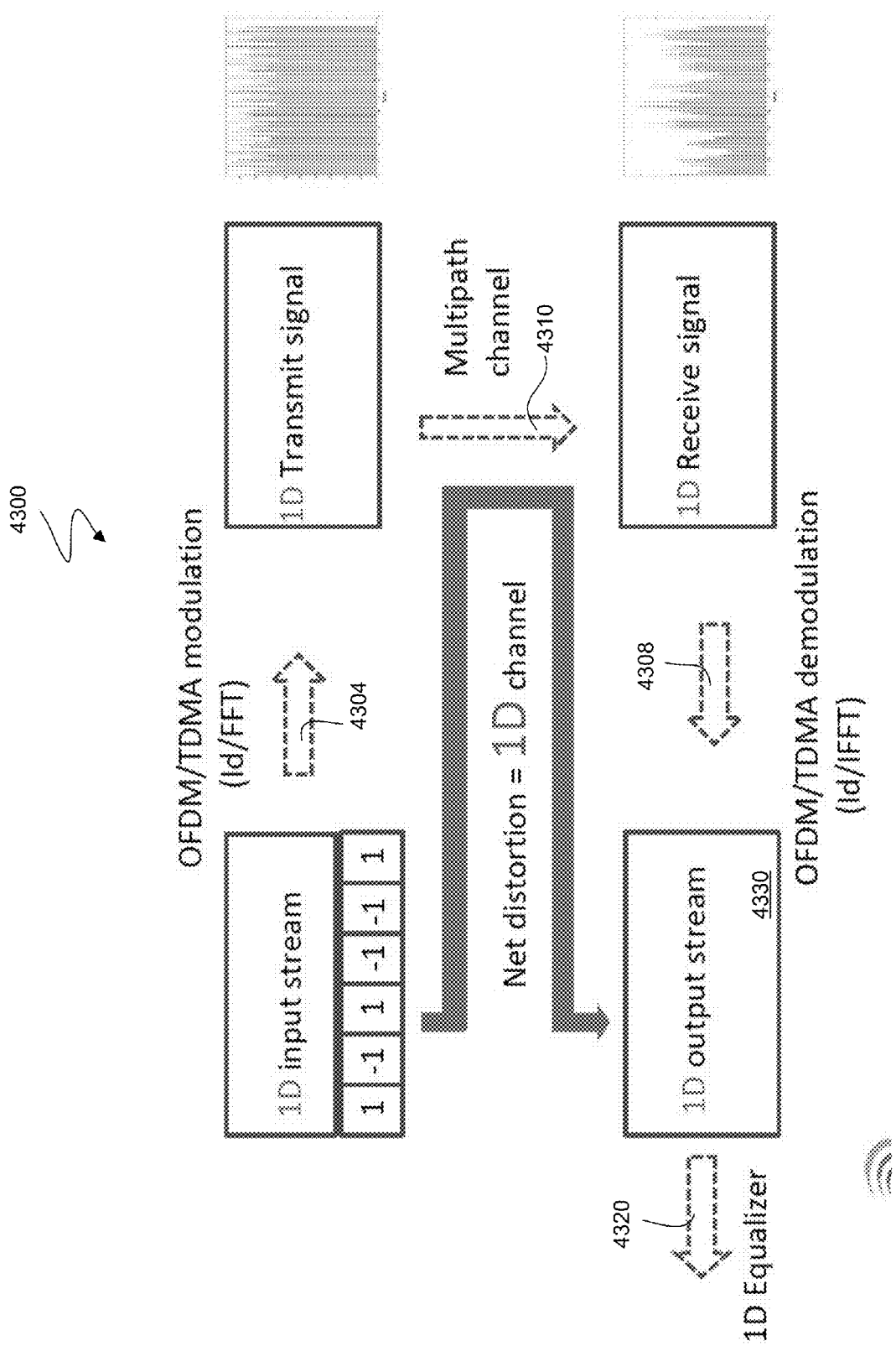
FIG. 43 provides a high-level representation of a conventional transceiver which could be utilized in an exemplary wireless communication system.

Turning now to FIG. 43, a high-level representation is provided of a conventional transceiver 4300 which could be utilized in the wireless communication system 100 of FIG. 1. The transceiver 4300 could, for example, operate in accordance with established protocols for time-division multiple access (TDMA), code-division multiple access (CDMA) or orthogonal frequency-division multiple access (OFDM) systems. In conventional wireless communication systems such as TDMA, CDMA, and OFDM systems, the multipath communication channel 4310 between a transmitter 4304 and a receiver 4308 is represented by a one-dimensional model. In these systems channel distortion is characterized using a one-dimensional representation of the impulse response of the communication channel. The transceiver 4300 may include a one-dimensional equalizer 4320 configured to at least partially remove this estimated channel distortion from the one-dimensional output data stream 4330 produced by the receiver 4308.

Unfortunately, use of a one-dimensional channel model presents a number of fundamental problems. First, the one-dimensional channel models employed in existing communication systems are non-stationary; that is, the symbol-distorting influence of the communication channel changes from symbol to symbol. In addition, when a channel is modeled in only one dimension it is likely and possible that certain received symbols will be significantly lower in energy than others due to "channel fading". Finally, one-dimensional channel state information (CSI) appears random and much of it is estimated by interpolating between channel measurements taken at specific points, thus rendering the information inherently inaccurate. These problems are only exacerbated in multi-antenna (MIMO) communication systems. As is discussed below, embodiments of the OTFS method described herein can be used to substantially overcome the fundamental problems arising from use of a one-dimensional channel model.

As is indicated below by Equation (1), in one aspect the OTFS method recognizes that a wireless channel may be represented as a weighted superposition of combination of time and Doppler shifts:

$$h^a(\varphi)(t) = \sum_{\tau,u} a(\tau, u) e^{j2\pi ut} \varphi(t + \tau) \qquad (1)$$

$$\uparrow$$

Time-frequency weights

In contrast to the parameters associated with existing channel models, the time-frequency weights ($\tau$,) of Equation (1) are two-dimensional and are believed to fully characterize the wireless channel. The time-frequency weights ($\tau$,) are intended to represent essentially all of the diversity branches existing in the wireless channel. This is believed to substantially minimize the fading effects experienced by the OTFS system and other communication systems generally based upon two-dimensional channel models relative to the fading common in systems predicated upon one-dimensional models. Finally, in contrast to the non-stationary, one-dimensional channel models employed in conventional communication systems, the time-frequency weights ($\tau$,) of Equation (1) are substantially stationary; that is, the weights change very slowly relative to the time scale of exemplary embodiments of the OTFS system.

Use of the two-dimensional channel model of Equation (1) in embodiments of the OTFS communication system affords a number of advantages. For example, use of the channel model of Equation (1) enables both channel multipath delay and Doppler shift to be accurately profiled simultaneously. Use of this model and the OTFS modulation techniques described herein also facilitate the coherent assembly of channel echoes and the minimization of fading phenomena, since every symbol experience substantially all of the diversity branches present within the channel. Given that the two-dimensional channel model is essentially stationary, every symbol is deterministically distorted (smeared) according to substantially the same two-dimensional pattern. This stable, accurate characterization of the communication channel in two dimensions on an ongoing basis further enables the OTFS system to minimize data distortion by "customizing" how each bit is delivered across the channel. Finally, use of a two-dimensional channel model enables effective signal separation by decoupling and eliminating mutual interference between multiple sources.

Figure 2:
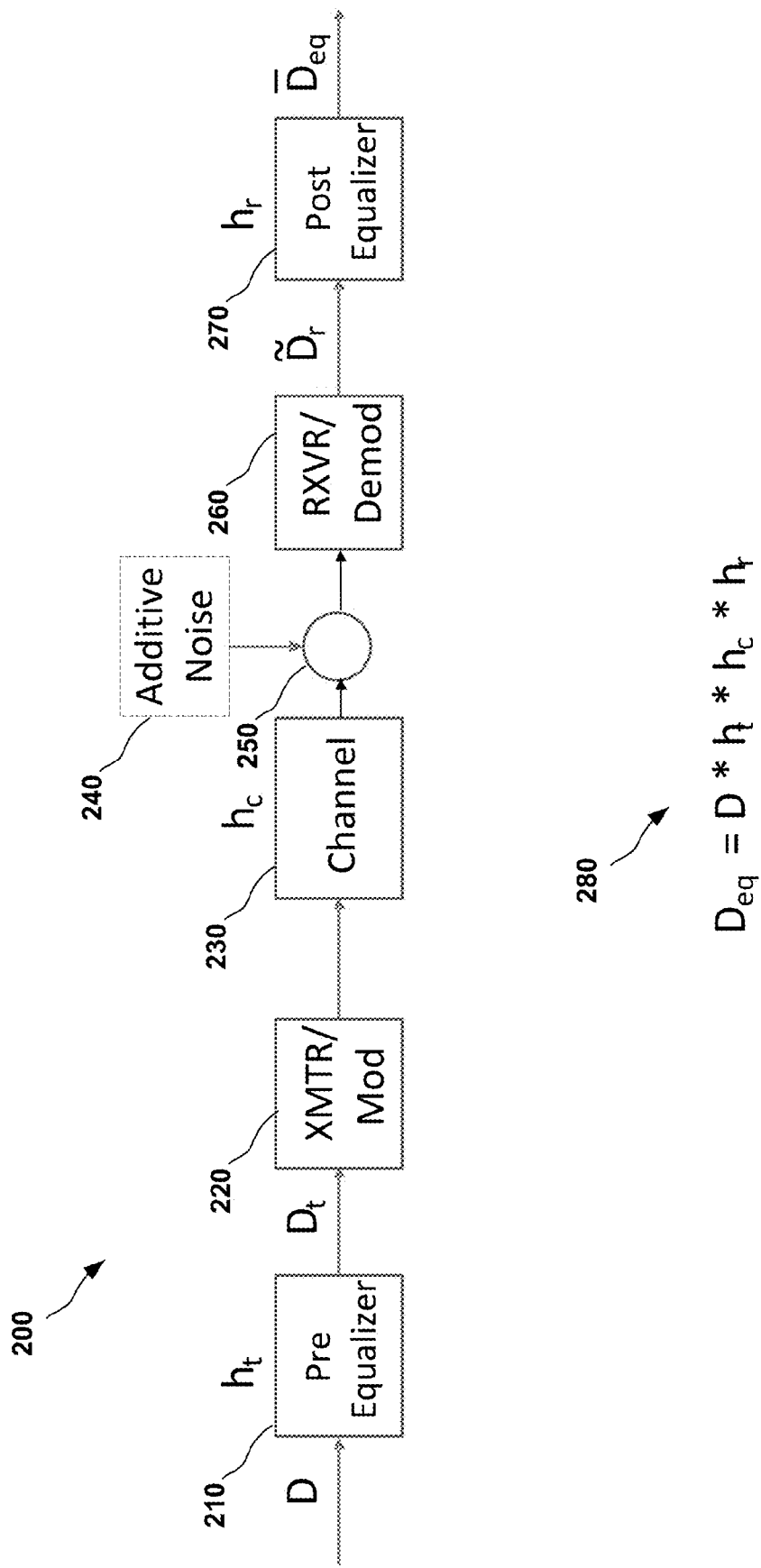
FIG. 2 shows an exemplary mathematical model that can be used to model communication in the wireless communication system of FIG. 1.

Attention is now directed to FIG. 2, which illustrates an example of a mathematical model 200 that can be used to model time/frequency selective fading. A transmit side of the model 200 includes a pre-equalizer 210, a transmitter/modulation component 220, a channel model 230, and additive noise 240 which is combined with the transmitted signal via a summer 250. A receive side of the model 200 includes a receiver/demodulator 260 and a post equalizer 270.

The pre-equalizer 210 is used to model a pre-distortion transfer function $h_t$ that can be used to make up for changing channel conditions in the channel model $h_c$ based on feedback received over the channel from the receive side of the model, as determined by measurements made by the receiver/demodulator 260 and/or the post equalizer 270. The transmitter/ modulator 220 uses modulation schemes described herein to transmit the data over the channel 230.

The receiver/demodulator 260 demodulates the signal received over the channel 230. The received signal has been distorted by time/frequency selective fading, as determined by the channel transfer function $h_c$, and includes the additive noise 240. The receiver/demodulator 260 and the post equalizer 270 utilize methods discussed herein to reduce the distortion caused by the time/frequency selective fading and additive noise due to the channel conditions. The mathematical model 200 can be used to determine the nature of the equalized data $D_{eq}$ by performing a mathematical combination of three transfer functions operating on the original data D. The three transfer functions include the transmitter transfer function $h_t$, the channel transfer function $h_c$ and the equalizer transfer function $h_r$.

Embodiments of the OTFS methods and systems described herein are based, in part, upon the realization that spreading the data for any given symbol over time, spectrum, and/or spectral shapes in the manner described herein yields modulated signals which are substantially resistant to interference, particularly interference caused by Doppler effects and multipath effects, as well as general background noise effects. Moreover, the OTFS method is believed to require less precise frequency synchronization between receiver and transmitter than is required by existing communication systems (e.g., OFDM systems).

In essence, the OTFS method convolves the data for a group of $N^2$ symbols (herein called a "frame") over both time, frequency, and in some embodiments spectral shape in a way that results in the data for the group of symbols being sent over a generally longer period of time than in prior art methods. Use of the OTFS method also results in the data for any given group of symbols being accumulated over a generally longer period of time than in prior art methods. However, in certain embodiments the OTFS method may nonetheless enable favorable data rates to be achieved despite the use of such longer transmission periods by exploiting other transmission efficiencies enabled by the method. For example, in one embodiment a group of symbols may be transmitted using the same spread-spectrum code. Although this could otherwise result in confusion and ambiguity (since each symbol would not be uniquely associated with a code), use of the OTFS method may, for example, enable the symbols to be sent using different (but previously defined) spread-spectrum convolution methods across a range of time and frequency periods. As a consequence, when all of the data corresponding to the symbols is finally accumulated within the receiver, the entire frame or group of symbols may be reconstructed in a manner not contemplated by prior art techniques. In general, one trade-off associated with the disclosed approach is that either an entire multi-symbol frame of data will be correctly received, or none of the frame will be correctly received; that is, if there is too much interference within the communication channel, then the ability to successfully deconvolve and retrieve multiple symbols may fail. However, as will be discussed, various aspects of the OTFS may mitigate any degradation in performance which would otherwise result from this apparent trade-off.

Figure 3A:
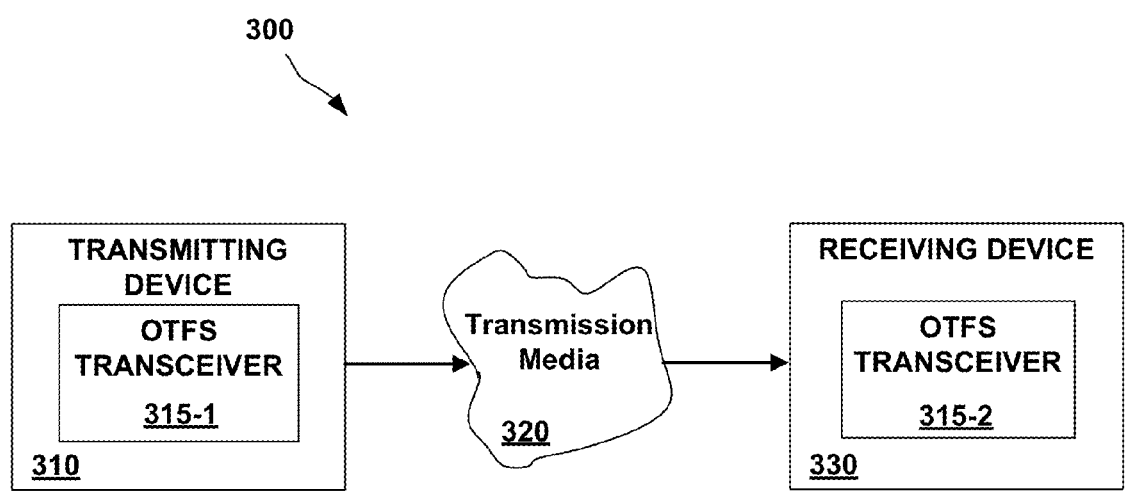
FIG. 3A shows an exemplary block diagram of components of an OTFS communication system.

FIG. 3A is a block diagram of components of an exemplary OTFS communication system 300. As shown, the system 300 includes a transmitting device 310 and a receiving device 330. The transmitting device 310 and the receiving device 330 include first and second OTFS transceivers 315-1 and 315-2, respectively. The OTFS transceivers 315-1 and 315-2 communicate, either unidirectionally or bidirectionally, via communication channel 320 in the manner described herein.

Although in the exemplary embodiments described herein the system 300 may comprise a wireless communication system, in other embodiments the communication channel may comprise a wired communication channel such as, for example, a communication channel within a fiber optic or coaxial cable. As was described above, the communication channel 320 may include multiple pathways and be characterized by time/frequency selective fading.

FIG. 4 illustrates components of an exemplary OTFS transceiver 400. The OTFS transceiver 400 can be used as one or both of the exemplary OTFS transceivers 315 illustrated in the communication system 300 of FIG. 3. The OTFS transceiver 400 includes a transmitter module 405 that includes a pre-equalizer 410, an OTFS encoder 420 and an OTFS modulator 430. The OTFS transceiver 400 also includes a receiver module 455 that includes a post-equalizer 480, an OTFS decoder 470 and an OTFS demodulator 460. The components of the OTFS transceiver may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, other electronic units designed to perform the functions described above, and/or a combination thereof. The disclosed OTFS methods will be described in view of the various components of the transceiver 400.

In one aspect a method of OTFS communication involves transmitting at least one frame of data ([D]) from the transmitting device 310 to the receiving device 330 through the communication channel 320, such frame of data comprising a matrix of up to $N^2$ data elements, N being greater than 1. The method comprises convolving, within the OTFS transceiver 315-1, the data elements of the data frame so that the value of each data element, when transmitted, is spread over a plurality of wireless waveforms, each waveform having a characteristic frequency, and each waveform carrying the convolved results from a plurality of said data elements from the data frame [D]. Further, during the transmission process, cyclically shifting the frequency of this plurality of wireless waveforms over a plurality of times so that the value of each data element is transmitted as a plurality of cyclically frequency shifted waveforms sent over a plurality of times. At the receiving device 330, the OTFS transceiver 315-2 receives and deconvolves these wireless waveforms thereby reconstructing a replica of said at least one frame of data [D]. In the exemplary embodiment the convolution process is such that an arbitrary data element of an arbitrary frame of data ([D]) cannot be guaranteed to be reconstructed with full accuracy until substantially all of these wireless waveforms have been transmitted and received.

Figure 5:
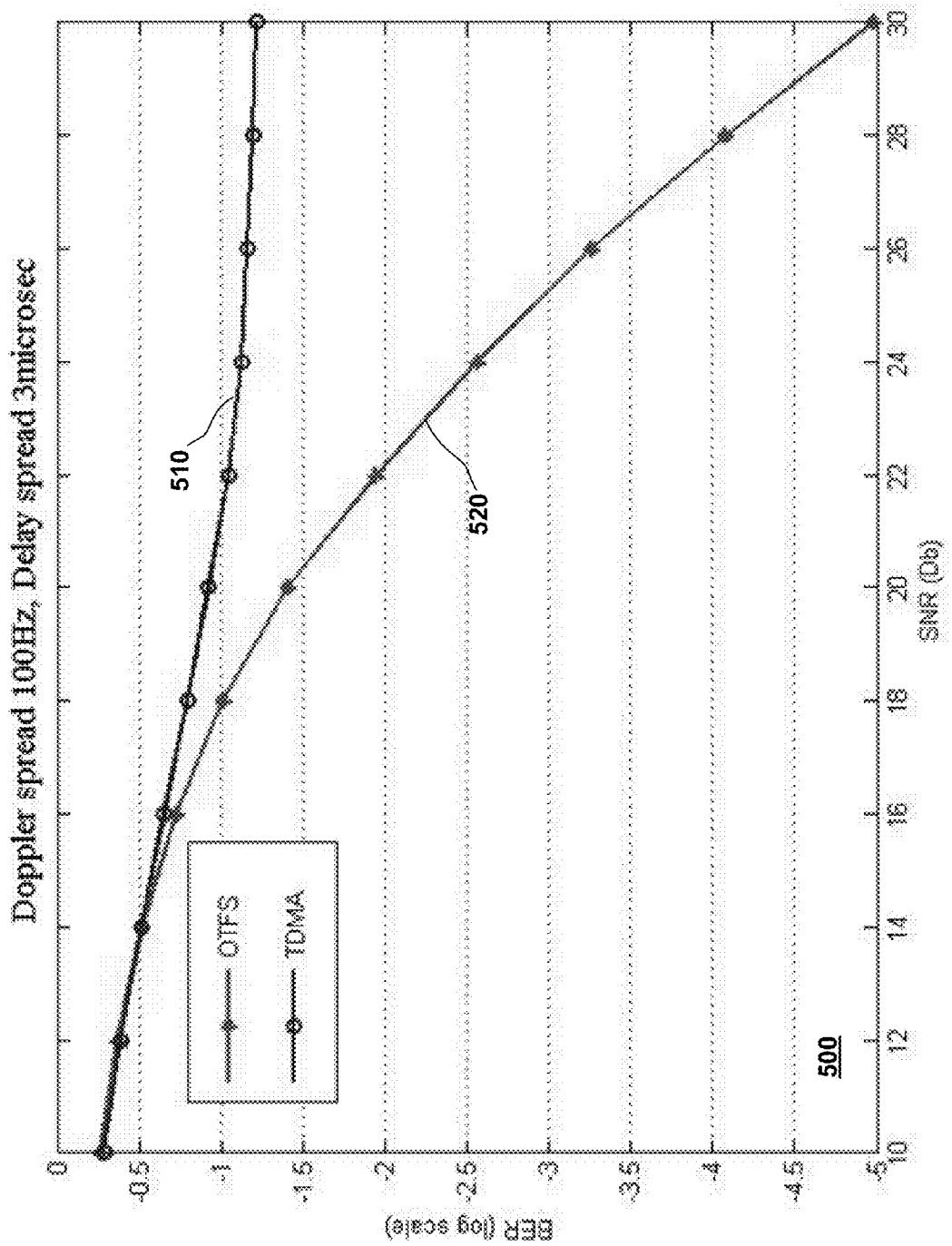
FIG. 5 illustrates a comparison of predicted bit error rate between an exemplary OTFS method and a time division multiple access method over an exemplary communication channel exhibiting time/frequency fading.

FIG. 5 illustrates a comparison of bit error rates (BER) predicted by a simulation of a TDMA system and an OTFS system. Both systems utilize a 16 QAM constellation. The simulation modeled a Doppler spread of 100 Hz and a delay spread of 3 microsec. As can be seen from the graphs, the OTFS system offers much lower BER than the TDMA system for the same signal-to-noise ratio (SNR).

Figure 45:
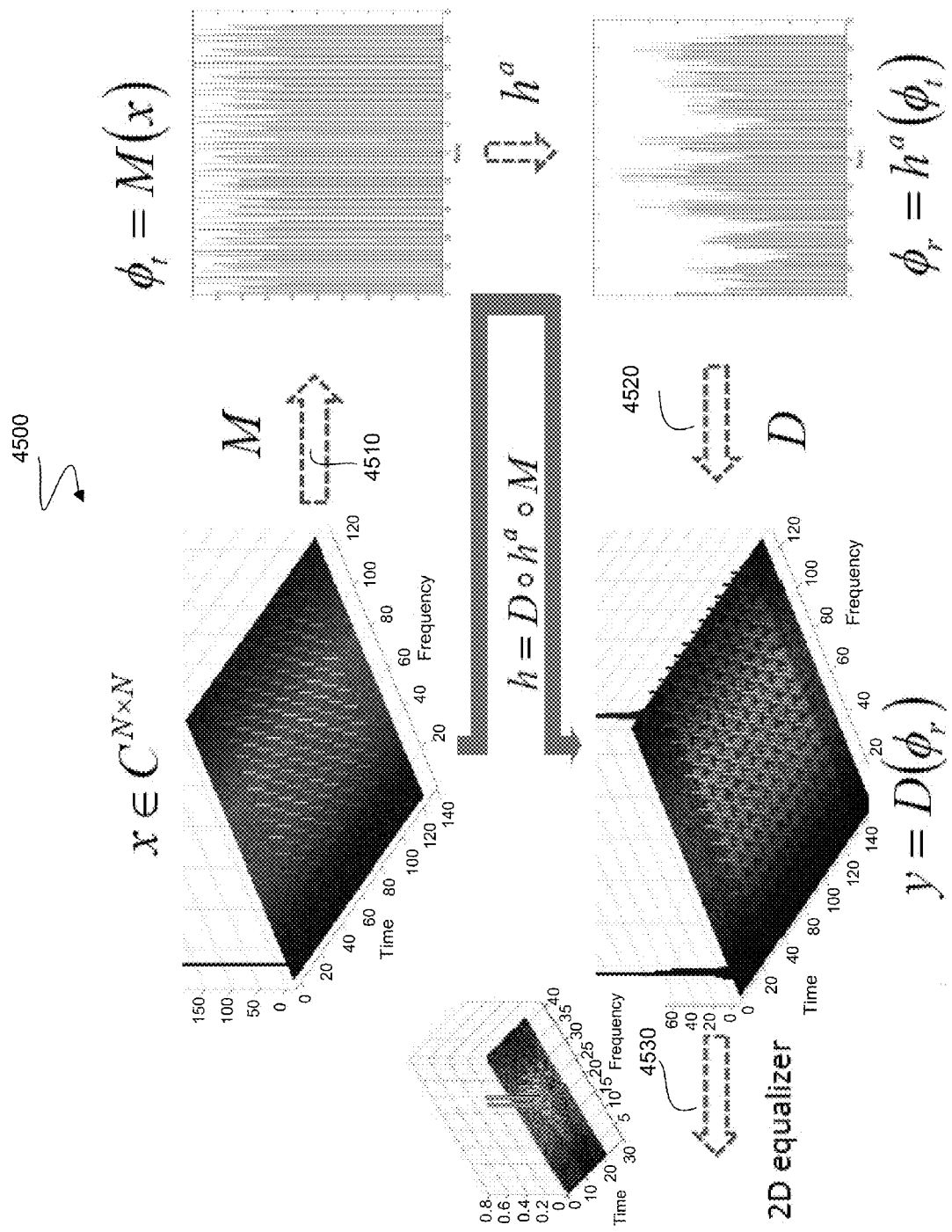
FIG. 45 is a flowchart representative of the operations performed by an OTFS transceiver.

Attention is now directed to FIG. 45, which is a flowchart representative of the operations performed by an OTFS transceiver 4500 which may be implemented as, for example, the OTFS transceiver 400. The OTFS transceiver 4500 includes a transmitter including a modulator 4510 and a receiver including a demodulator 4520 and two-dimensional equalizer 4530.

In operation, a transmitter of the OTFS transceiver 4500 receives a two-dimensional symbol stream in the form of an N×N matrix of symbols, which may hereinafter be referred to as a TF matrix:

$$x \in C^{N \times N}$$

Figure 46:
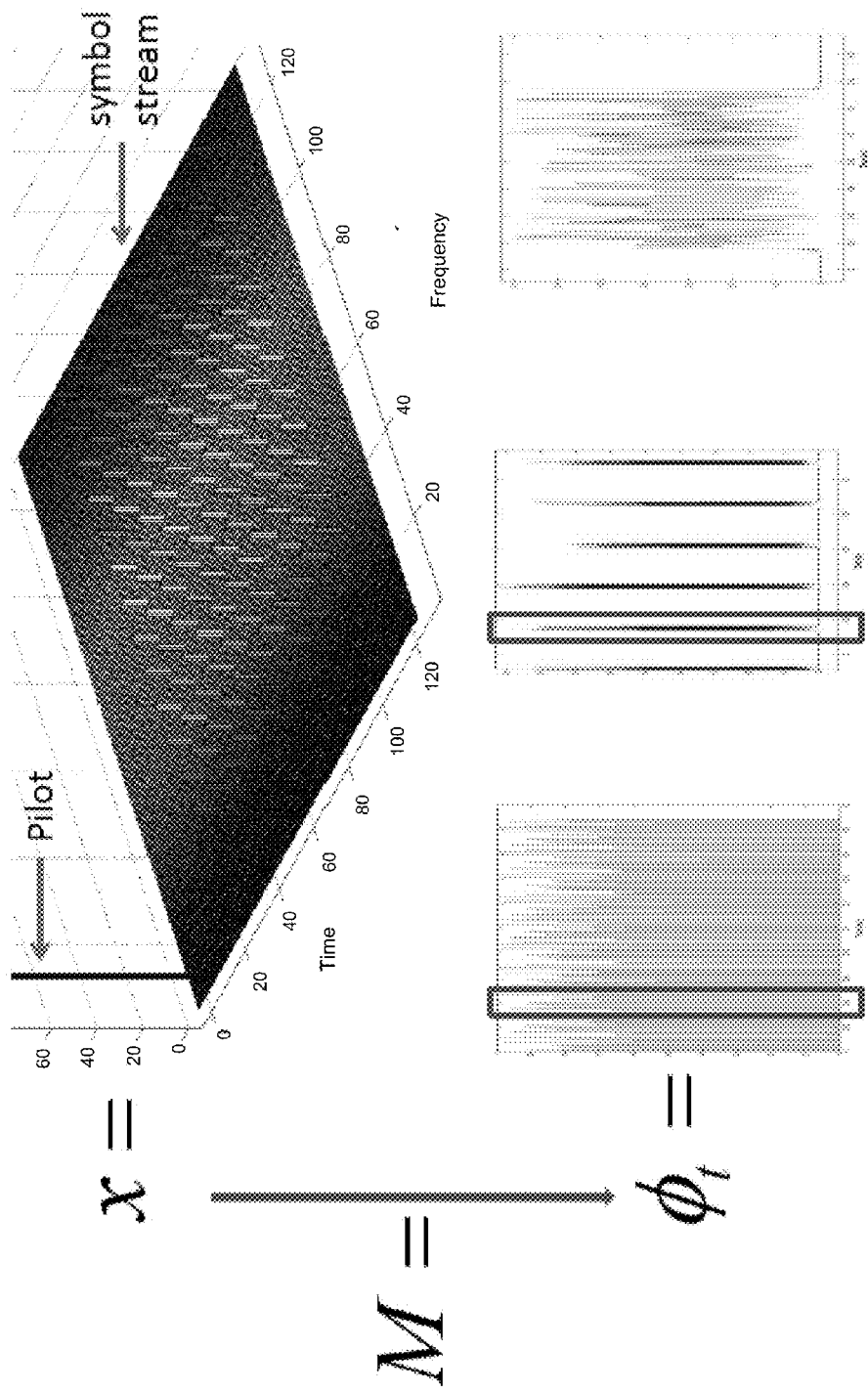
FIG. 46 illustrates the functioning of a modulator as an orthogonal map disposed to transform a two-dimensional time-frequency matrix to a transmitted waveform.

As is illustrated in FIG. 46, in one embodiment the modulator 4510 functions as an orthogonal map disposed to transform the two-dimensional TF matrix to the following transmitted waveform:

$$\phi_t = M(x) = \Sigma x(i,j) \phi_{i,j} \perp \phi_{k,j}$$

Figure 47:
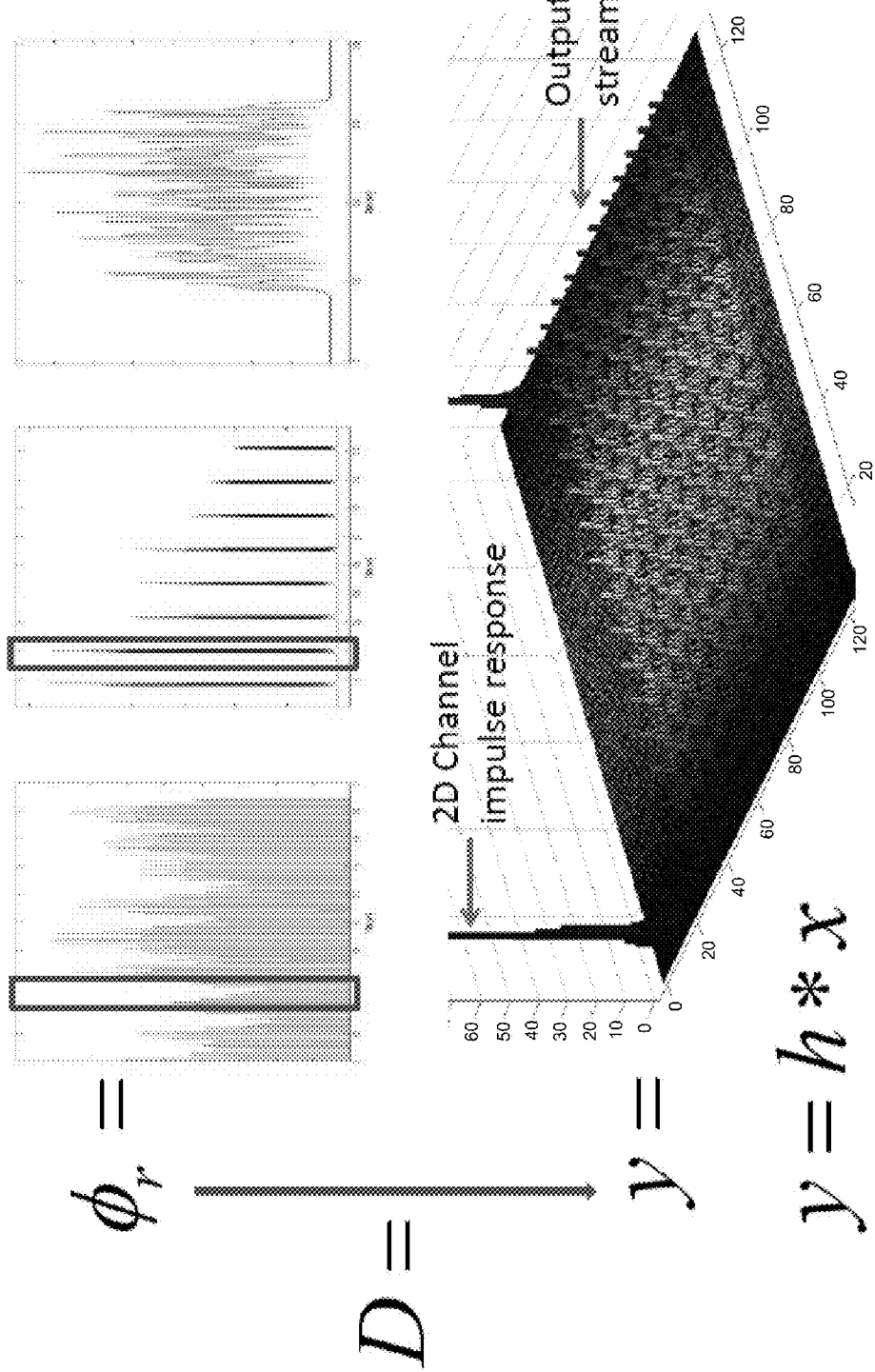
FIGS. 47 and 48 illustrate the transformation by a demodulator of a received waveform to a two-dimensional time-frequency matrix in accordance with an orthogonal map.

Referring to FIG. 47, the demodulator 4520 transforms the received waveform to a two-dimensional TF matrix in accordance with an orthogonal map in order to generate an output stream:

$$\phi_r \mapsto y = D(\phi_r)$$

In one embodiment the OTFS transceiver 4500 may be characterized by a number of variable parameters including, for example, delay resolution (i.e., digital time "tick" or clock increment), Doppler resolution, processing gain factor (block size) and orthonormal basis function. Each of these variable parameters may be represented as follows.

Delay resolution (digital time tick):

$$\Delta T \in R^{>0} \left( \Delta T = \frac{1}{Bw} \right)$$

Doppler resolution:

$$\Delta F \in R^{>0} \left( \Delta F = \frac{1}{T_{rans}} \right)$$

Processing gain factor (block size):

$$N > 0$$

Orthonormal basis of $C^{N \times 1}$ (spectral shapes):

$$U = \{u_1, u_2, \ldots, u_N\}$$

Figure 48:
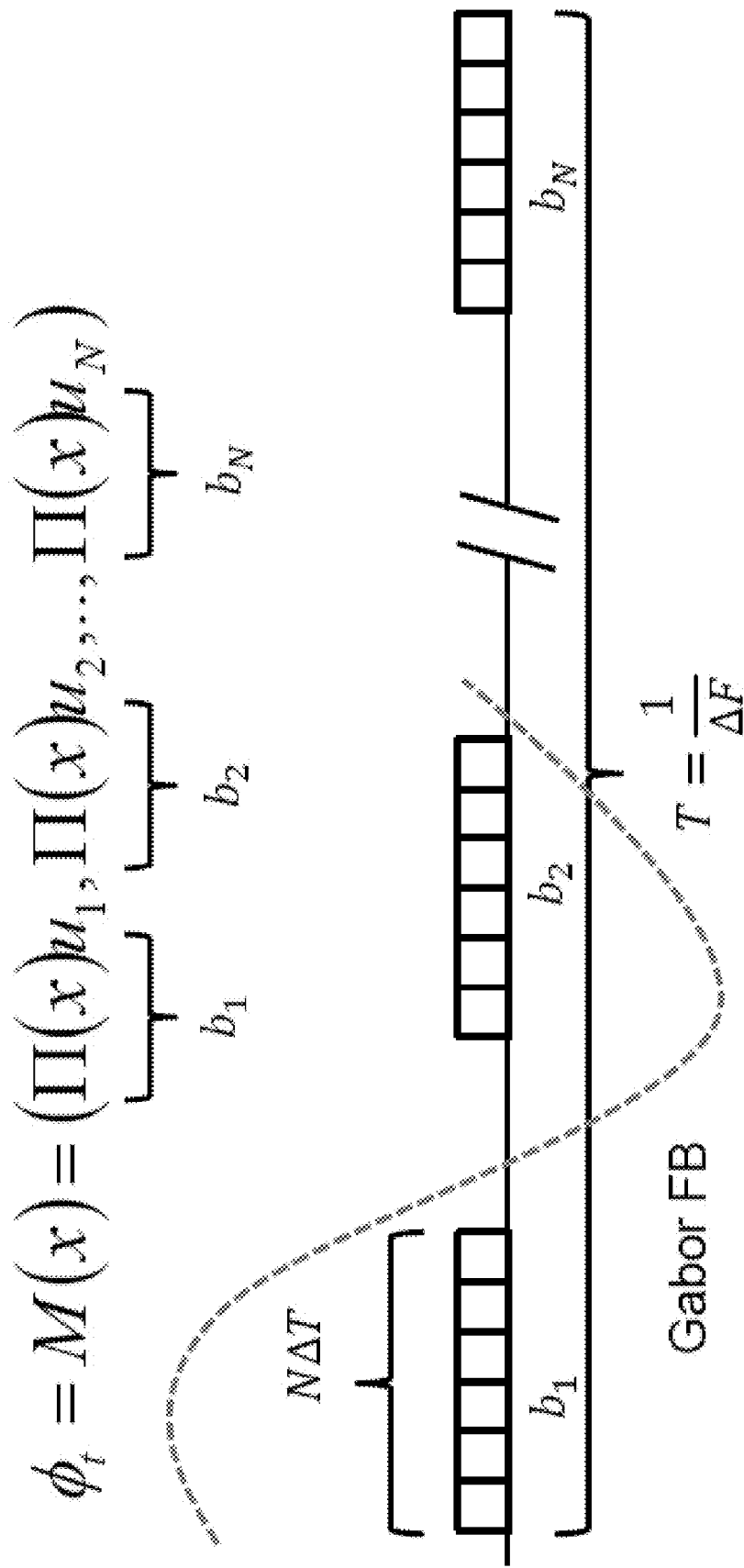

As is illustrated by FIG. 45, during operation the modulator 4510 takes a TF matrix $x \in C^{N \times N}$ and transforms it into a pulse waveform. In one embodiment the pulse waveform comprises a pulse train defined in terms of the Heisenberg representation and the spectral shapes:

$$\phi_t = M(x) = (\underbrace{\prod(x)u_1}_{b_1}, \underbrace{\prod(x)u_2}_{b_2}, \ldots, \underbrace{\prod(x)u_N}_{b_N})$$

where $b_1, b_2 \ldots b_N$ are illustrated in FIG. 48 and where, in accordance with the Heisenberg relation:

$$\pi(h^*x) = \pi(h) \cdot \pi(x) \text{ in particular:}$$

$$\pi(\delta_{(t,0)}^* x) = L_t \cdot \pi(x)$$

$$\pi(\delta_{(0,w)}^* x) = M_w \cdot \pi(x)$$

The Heisenberg representation provides that:

$$\prod : C^{N \times N} \xrightarrow{\approx} C^{N \times N} \text{ given by:}$$

$$\prod(x) = \sum_{\tau, w=0}^{N-1} x(\tau, w) M_w L_\tau,$$

$$x \in C^{N \times N}$$

where $L_t$ and $M_w$ are respectively representative of cyclic time and frequency shifts and may be represented as:

$$L_\tau \in C^{N \times N}: L_\tau(\varphi)(t) = \varphi(t + \tau),$$

$$\tau = 0, \ldots, N-1$$

$$M_w \in C^{N \times N}: M_w(\varphi)(t) = e^{\frac{j2\pi}{N} wt} \varphi(t),$$

$$w = 0, \ldots, N-1$$

The demodulator 4520 takes a received waveform and transforms it into a TF matrix $y \in C^{N \times N}$ defined in terms of the Wigner transform and the spectral shapes:

$$\phi_r = (b_1, b_2, \ldots, b_N)$$

$$y(\tau, w) = D(\phi_r)(\tau, w)$$

$$= \overbrace{\frac{1}{N} \sum_{n=1}^{N} \langle M_w L_\tau u_n, b_n \rangle}^{Wigner\ transform}$$

Main property of M and D (Stone von Neumann theorem):

$$D(h^a M(x)) = h^* x \text{ where:}$$

$$h(\tau, w) \approx a(\tau \Delta T, w \Delta F)$$

Figure 49:
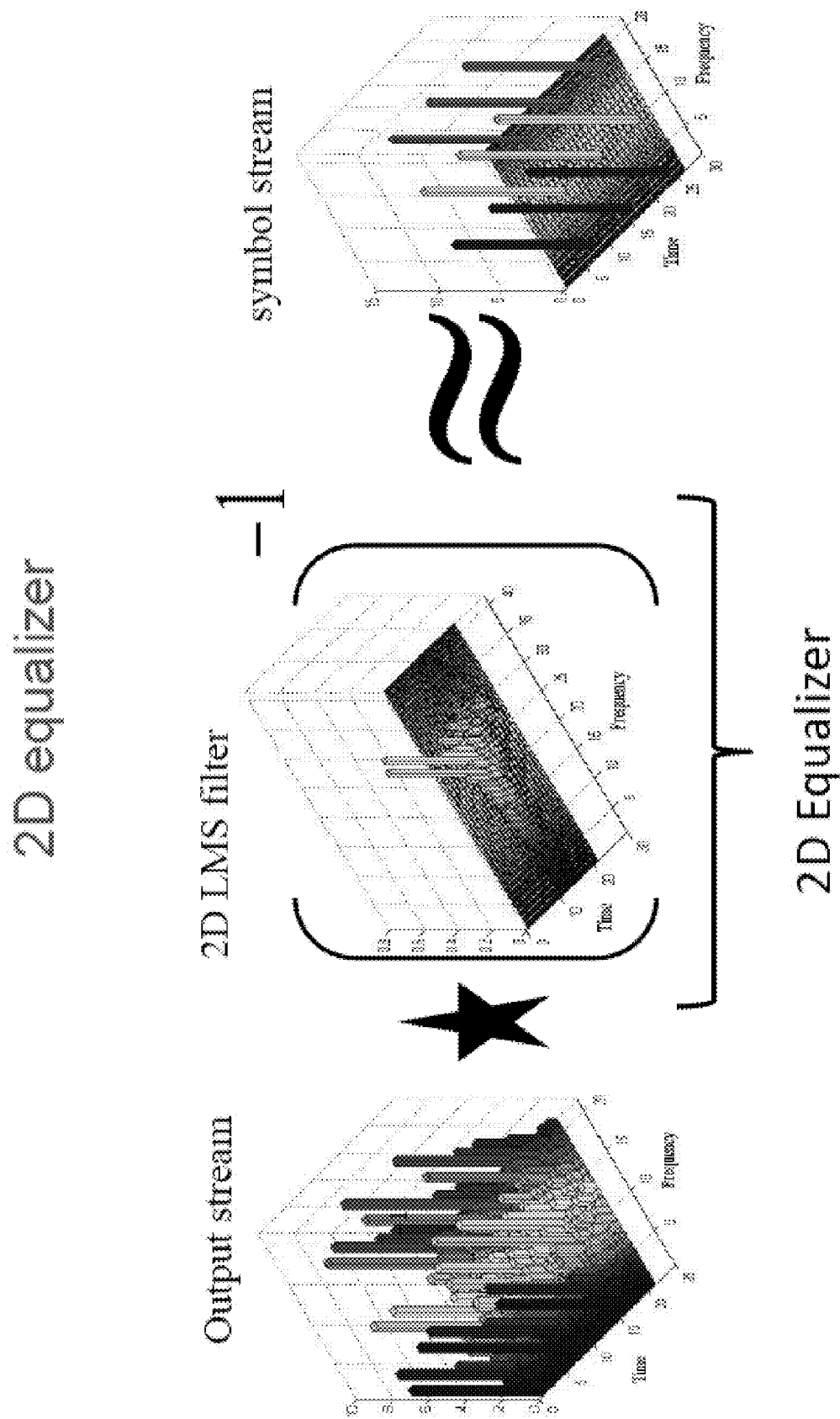
FIG. 49 illustrates an exemplary implementation of a two-dimensional decision feedback equalizer configured to perform a least means square (LMS) equalization procedure.

As illustrated in FIG. 49, the equalizer 4530 may be implemented as a two-dimensional decision feedback equalizer configured to perform a least means square (LMS) equalization procedure such that:

$$y \mapsto \hat{x}$$

Matrix Formulation

Throughout this description, the use of matrix terminology should be understood as being a concise description of the various operations that will be carried out by either the OTFS transceiver 315-1 or the OTFS transceiver 315-2. Thus the series of steps used to obtain the coefficients of a particular matrix generally correspond to a set of instructions for the transmitter or receiver electronic circuitry (e.g., the various components of the transmitter 405 and the receiver 455 illustrated in FIG. 4A). For example, one set of coefficients may instruct the transmitter 405 or receiver 455 to perform a spread spectrum operation, a different set of coefficients may instruct the transmitter 405 or receiver 455 to perform a spectral shaping modulation or demodulation operation, and another set of coefficients may instruct the transmitter to perform various time spreading or time accumulation functions. Here standard matrix mathematics is used as a shorthand way of reciting the series of instructions used to transmit and receive these complex series of wireless signals.

Figure 4A:
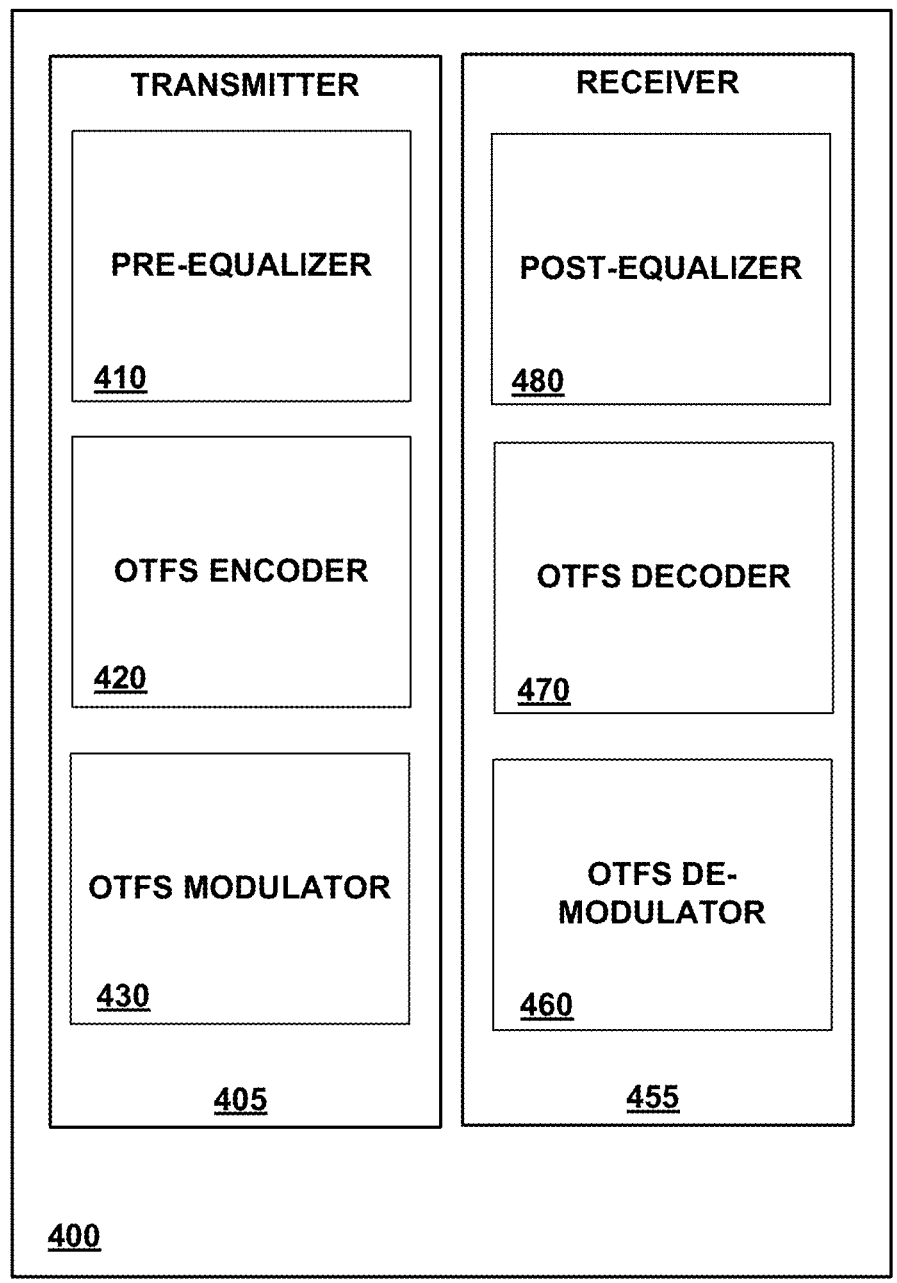
FIG. 4A illustrates components of an exemplary OTFS transceiver.

Thus, when the discussion speaks of multiplying matrices, each data element in the matrix formed by the multiplication can be understood in terms of various multi-step operations to be carried out by the transmitter or receiver electronic circuitry (e.g., the transmitter 405 or the receiver 455 as illustrated in FIG. 4A), rather than as a pure number. Thus, for example, a matrix element formed from one matrix that may have spread-spectrum like pseudorandom numbers multiplied by another matrix that may have tone or spectral-shape spreading instructions, such as QAM or phase shift keying instructions, multiplied by another scanning system, permutation scheme, or matrix that may have data instructions, should be understood as directing the transmitter 405 to transmit a radio signal that is modulated according to these three means, or as directing the receiver 455 to receive and demodulate/decode a radio signal that is modulated according to these three means.

Put into matrix terminology, the OTFS method of convolving the data for a group of symbols over both time, spectrum, and tone or spectral-shape can be viewed as transforming the data frame with $N^2$ information elements (symbols) to another new matrix with $N^2$ elements whereby each element in the new transformed matrix, (here called the TFS data matrix) carries information about all elements of the original data frame. In other words the new transformed TFS data matrix will generally carry a weighted contribution from each element of the original data frame matrix [D]. Elements of this TFS data matrix are in turn transmitted and received over successive time intervals.

As previously discussed, in embodiments of the OTFS method the basic unit of convolution and deconvolution (convolution unit) is composed of a matrix of $N^2$ symbols or data elements. Over each time interval, a different waveform may be used for each data element. By contrast, prior art methods generally use the same waveform for each data element. For consistency, the $N^2$ units of data will generally be referred to in this specification as a "data frame". N may be any value greater than one, and in some embodiments will range from 64 to 256.

One distinction between the OTFS method and conventional modulation schemes may be appreciated by observing that a basic unit of convolution, transmission, reception and deconvolution for a prior art communications protocol may be characterized as a data frame of n symbols or elements "d" operated on spreading codes that send the data for n symbols over one spreading interval time where:

$$[D_{1 \times n}] = [d_1 d_2 \ldots d_n]$$

In contrast, embodiments of the OTFS method generally use a different basic unit of convolution, transmission, reception, and deconvolution. In particular, such OTFS embodiments will typically use a larger data frame $[D_{N \times N}]$ composed of $N^2$ elements or symbols "d" that, as will be discussed, send the data for these $N^2$ elements over a plurality of spreading interval times (often the plurality is N). The data frame $[D_{N \times N}]$ may be expressed as:

$$[D_{N \times N}] = \begin{bmatrix} d_{1,1} & d_{1,2} & \ldots & d_{1,N} \\ d_{2,1} & d_{2,2} & \ldots & d_{2,N} \\ d_{3,1} & d_{3,2} & \ldots & \\ d_{4,1} & d_{4,2} & \ldots & d_{N,N} \end{bmatrix}$$

In general, references herein to a frame of data may be considered to be a reference to the N×N or $N^2$ matrix such as the one shown above, where at least some elements in the matrix may be zero or null elements. In some embodiments, a frame of data could be non-square, or N×M, where N≠M.

Signal Transmission

As previously discussed, the OTFS method will spread this group of $N^2$ symbols across a communications link over multiple spreading intervals of time (usually at least N spreading intervals or times), where each individual spreading interval of time is composed of at least N time slices. Note that due to potential overhead for synchronization and identification purposes, in some embodiments, extra time slices and/or extra spreading intervals of time may be allocated to provide room for this overhead. Although for clarity of presentation this overhead will generally be ignored, it should be understood that the disclosure is intended to also encompass methods in which such overhead exists.

In exemplary embodiments of the OTFS method the data will thus be transmitted as a complex series of waveforms, usually over wireless radio signals with frequencies usually above 100 MHz, and often above 1 GHz or more. These radio frequencies are then usually received over at least N spreading time intervals, where each spreading time interval is often composed of at least N time-slices. Once received, the original data frame will be deconvolved (i.e. solved for) and the most likely coefficients of the original group of symbols are reconstructed. It should be evident that in order to successfully deconvolve or solve for the original data frame, the receiver will usually have prior knowledge of the time, spectrum, and tone or spectral-shape spreading algorithms used by the transmitter.

Figure 3B:
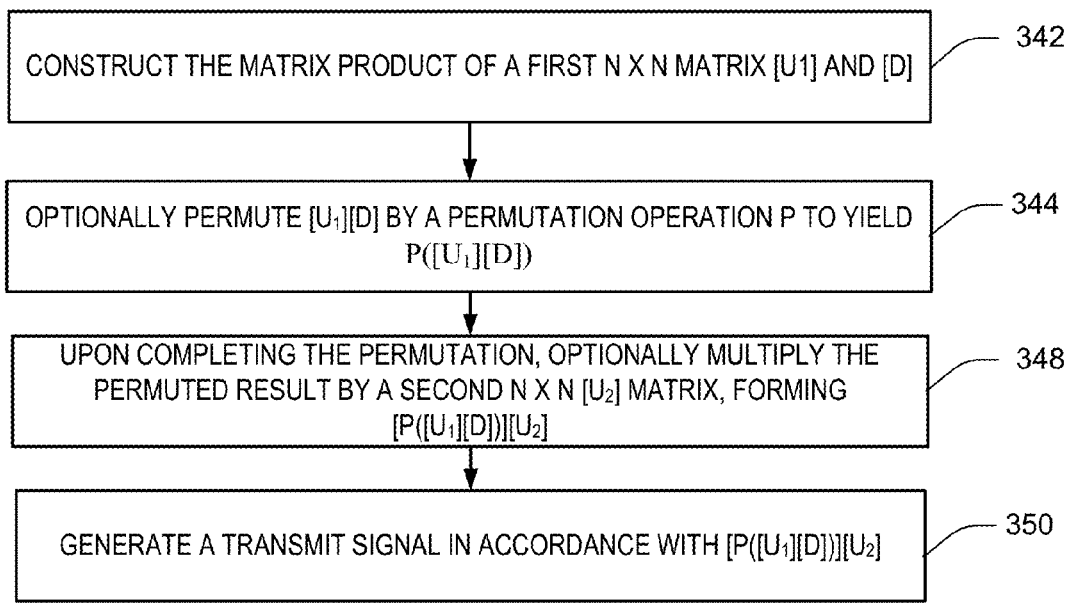
FIG. 3B illustrates a process by which an OTFS transceiver of a transmitting device within the system of FIG. 3A may transmit a data frame.

Attention is now directed to FIG. 3B, which illustrates a process 340 by which the OTFS transceiver 315-1 of the transmitting device 310 may transmit a data frame (or a convolution unit) of data, here expressed as an (N by N) or ($N^2$) matrix [D]. This process may be described using standard matrix multiplication as follows:

1: Construct the matrix product of a first N×N matrix [U1] and [D] (often written as either $[U_1]*[D]$ or more simply $[U_1][D]$—here both the "*" and simple close association (e.g. $[U_1][D]$) both are intended to represent matrix multiplication)(stage 342).
2: Optionally permute $[U_1][D]$ by a permutation operation P in order to create a new N×N matrix (stage 344). In general, any invertible permutation operation may be used. P may be an identity operation, or alternatively may be a permutation operation that essentially translates the columns of the original N×N $[U_1][D]$ matrix to diagonal elements of a transformed $[U_1][D]'$ matrix.
3: Upon completing the permutation, optionally multiply the permuted result by a second N×N $[U_2]$ matrix (for spectral shaping for example), forming:
$[P([U_1][D])][U_2]$ (stage 348).
4: Transmit this signal, according to methods discussed below (stage 350).

In one embodiment the permutation operation P may optionally be of the form:

$$b_{i,j} = a_{i,(j-i) \bmod N}$$

where [a] is the original matrix (here $[U_1][D]$), and [b] is the new matrix (here $P([U_1][D])$).

For sake of simplicity, the result of this permutation operation may be written as $P([U_1][D])$.

FIG. 22 illustrates another permutation that may be used. In this case, the permutation is given by the following relationship:

$$b_{i,j} = a_{i,(j+i) \bmod N}$$

Figure 23:
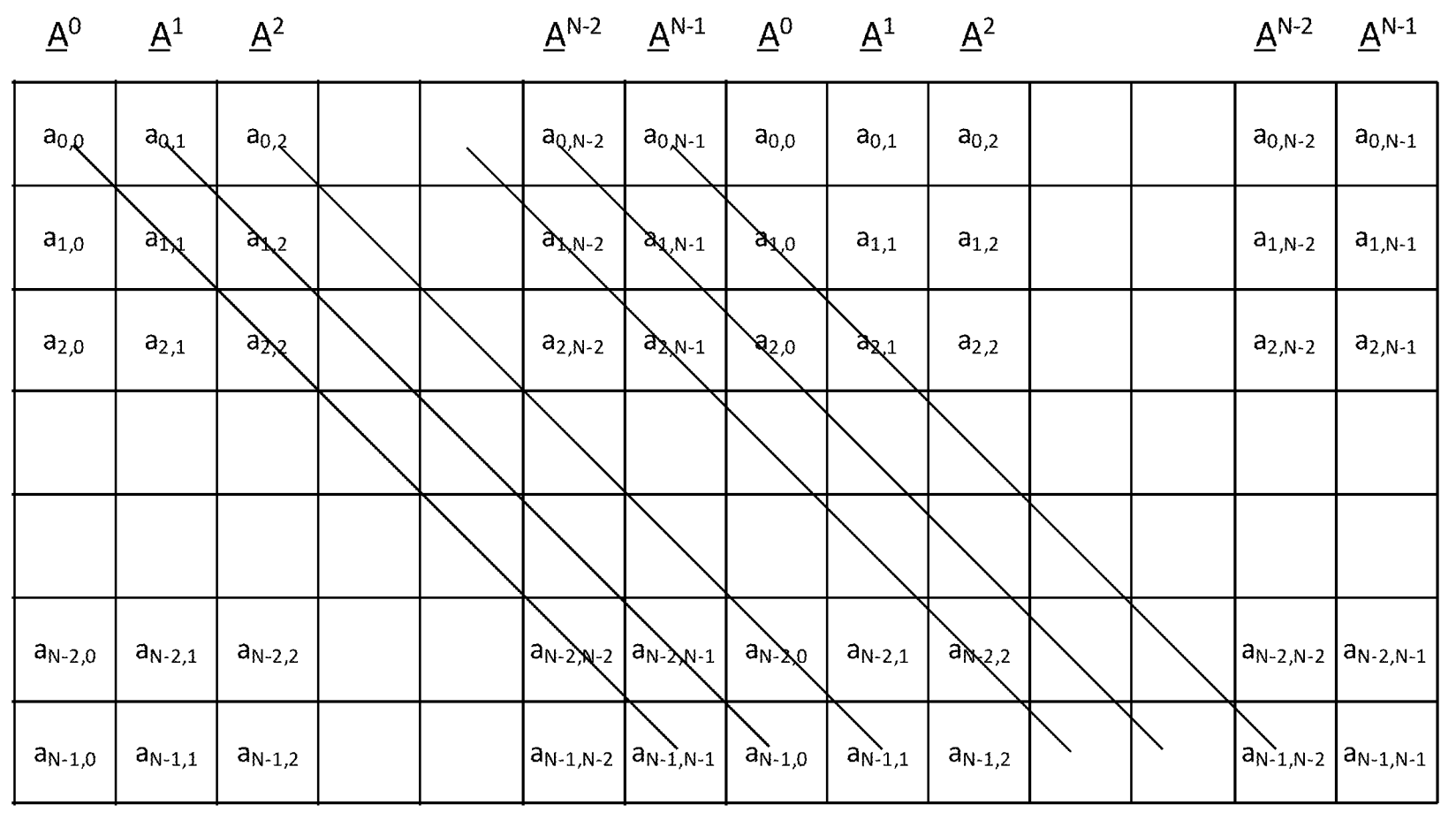

Yet another permutation option is illustrated in FIG. 23. In FIG. 23, for illustrative purposes, a second [a] matrix is placed next to the original [a] matrix. Diagonal lines are drawn overlapping the first and second [a] matrices. The permuted [b] matrix is formed by translating each diagonal line one column to the left (or right in yet another permutation), where one or more of the translated entries falls into the second [a] matrix such that one or more entries is moved from the second [a] matrix to the same position in the first [a] matrix.

Here [U₁] and [U₂], if being used, can both be unitary N×N matrices, usually chosen to mitigate certain impairments on the (often wireless) communications link, such as wide band noise, narrow-band interference, impulse noise, Doppler shift, crosstalk, etc. To do this, rather than simply selecting [U₁] and [U₂] to be relatively trivial identity matrices [I], or matrices with most of the coefficients simply being placed along the central diagonal of the matrix, [U₁] and [U₂] will usually be chosen with non-zero coefficients generally throughout the matrix so as to accomplish the desired spreading or convolution of the convolution unit [D] across spectrum and tone or spectral-shape space in a relatively efficient and uniform manner. Usually, the matrix coefficients will also be chosen to maintain orthogonality or to provide an ability to distinguish between the different encoding schemes embodied in the different rows of the respective matrices, as well as to minimize autocorrelation effects that can occur when radio signals are subjected to multi-path effects.

In reference to the specific case where [U₁] may have rows that correspond to pseudo-random sequences, it may be useful to employ a permutation scheme where each successive row in the matrix is a cyclically rotated version of the pseudo-random sequence in the row above it. Thus the entire N×N matrix may consist of successive cyclically rotated versions of a single pseudo-random sequence of length N.

Figure 17:
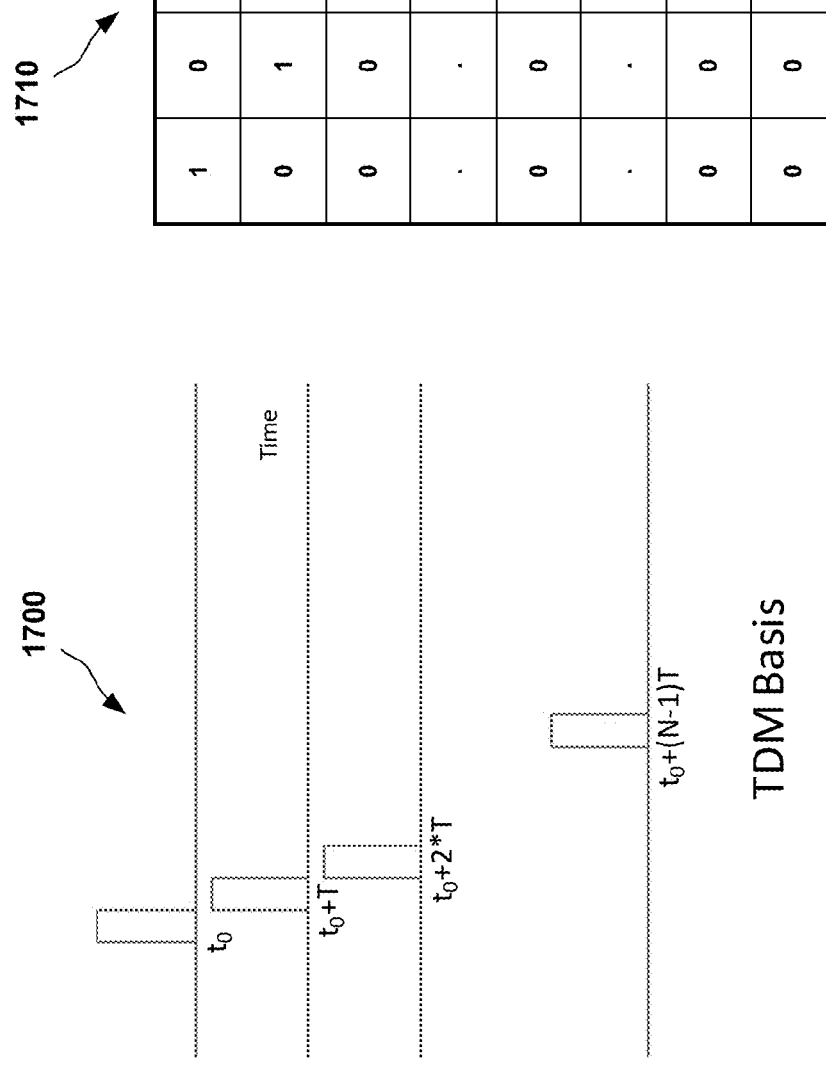
FIG. 17 illustrates a unitary matrix [1] in the form of an identity matrix representative of a time division multiplexed transmission basis.
Figure 18:
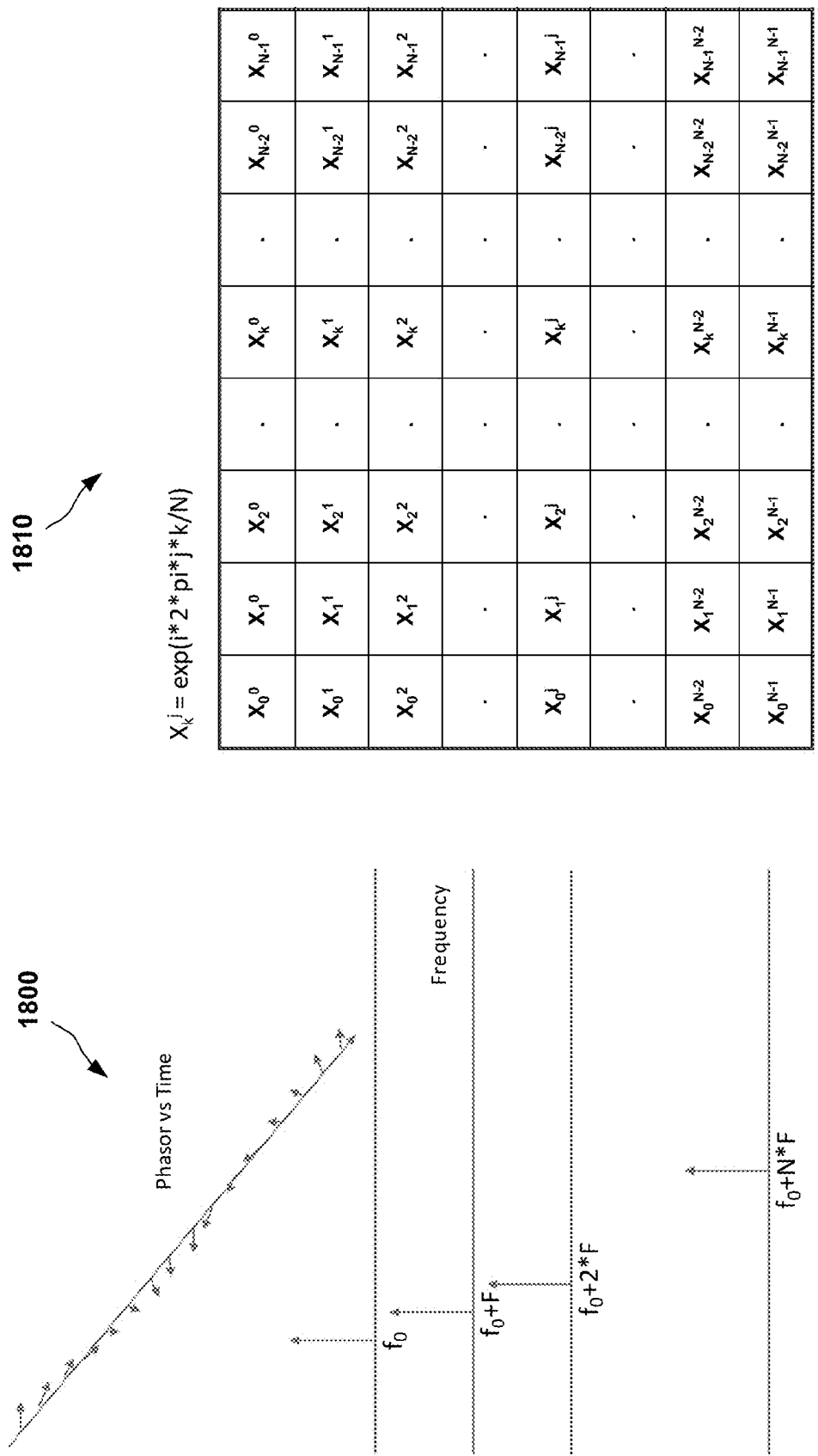
FIG. 18 illustrates a unitary matrix [1] in the form of a DFT matrix representative of a frequency division multiplexed transmission basis.
Figure 19:
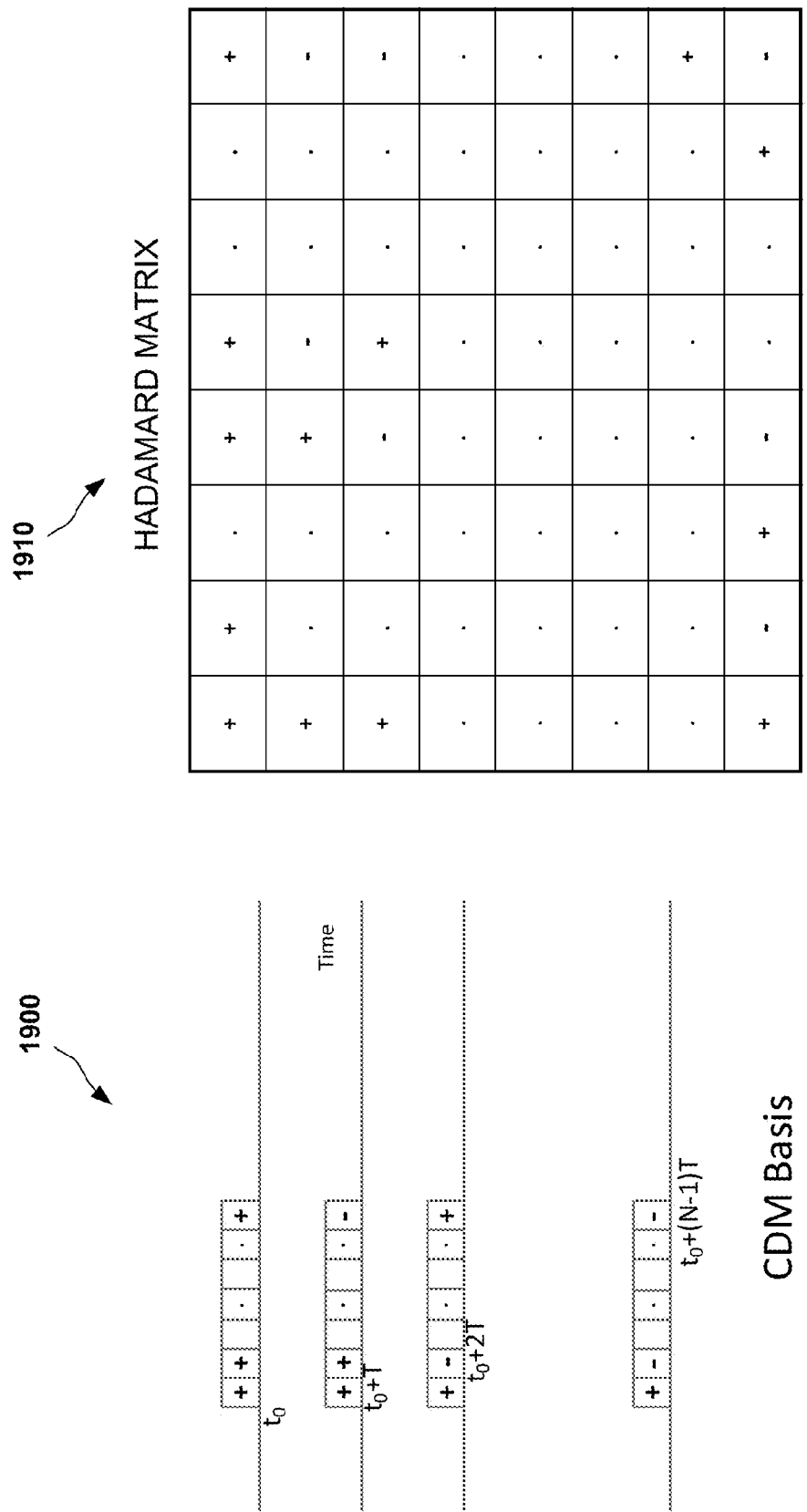
FIG. 19 illustrates a unitary matrix [1] in the form of a Hadamard matrix representative of a code division multiplexed transmission basis.

FIGS. 17-19 illustratively represent the manner in which different types of unitary matrices [U₁] can be used to represent various forms of modulation. For example, FIG. 17 illustrates a unitary matrix [U1] in the form of an identity matrix 1710 representative of a time division multiplexed transmission basis; that is, a matrix of basis vectors where each column and each row is comprised of a single "1" and multiple "0" values. When the identity matrix 1710 is combined with a data matrix [D], the result corresponds to each column of [D] being transmitted in a different time slot corresponding to one of the time lines 1700 (i.e., the columns of [D] are transmitted in a time division multiplexed series of transmissions).

FIG. 18 illustrates a unitary matrix [U₁] in the form of a DFT basis vector matrix 1810 representative of a frequency division multiplexed transmission basis. The DFT basis vector matrix 1810 is comprised of N column entries representing rotating phaser or tone basis vectors. When the DFT basis vector matrix 1810 is multiplied by a data matrix [D], the columns of the resulting matrix represent rotating phasers each having a different frequency offset or tone as represented by the set of time lines 1800. This corresponds to each column of [D] being transmitted at a different frequency offset or tone.

FIG. 19 illustrates a unitary matrix [U₁] in the form of a Hadamard matrix 1910 representative of a code division multiplexed transmission basis. The Hadamard matrix 1910 is comprised of a set of quasi-random plus and minus basis vectors. When the Hadamard matrix 1910 is multiplied by a data matrix [D], the columns of the resulting matrix represent different quasi-random code division multiplexed signals as represented by the set of time lines 1900. This corresponds to each column of [D] being transmitted using a different quasi-random code.

In principle, [U₁] and [U₂], if both are being used, may be a wide variety of different unitary matrices. For example, [U₁] may be a Discrete Fourier Transform (DFT) matrix and [U₂] may be a Hadamard matrix. Alternatively [U₁] may be a DFT matrix and [U₂] may be a chirp matrix. Alternatively [U₁] may be a DFT matrix and [U₂] may also be a DFT matrix, and so on. Thus although, for purposes of explaining certain aspects of the OTFS method, certain specific examples and embodiments of [U₁] and [U₂] will be given, these specific examples and embodiments are not intended to be limiting.

Note that a chirp matrix, [V], is commonly defined in signal processing as a matrix where, if Ψ the chirp rate,
[V]=diag(Ψ, Ψ², ... Ψⁿ), Ψ=$e^{j\Psi}$, and frequency=$e^{j\omega}$ where ω is the initial center frequency of the spectrum.

Alternatively, a different chirp matrix may be used, filled with elements of the form:

$$V_{j,k} = e^{\left(\frac{-i2\pi k j^2}{N}\right)}$$

Where j is the matrix row, k is the matrix column, and N is the size of the matrix.

Other commonly used orthonormal matrices, which may be used for [U₁], or [U₂] or [U₃] (to be discussed), include Discrete Fourier matrices, Polynomial exponent matrices, harmonic oscillatory, matrices, the previously discussed Hadamard matrices, Walsh matrices, Haar matrices, Paley matrices, Williamson matrices, M-sequence matrices, Legendre matrices, Jacobi matrices, Householder matrices, Rotation matrices, and Permutation matrices. The inverses of these matrices may also be used.

As will be discussed, in some embodiments, [U₁] can be understood as being a time-frequency shifting matrix, and [U₂] can be understood as being a spectral shaping matrix. In order to preserve readability, [U₁] will thus often be referred to as a first time-frequency shifting matrix, and [U₂] will thus often be referred to as a second spectral shaping matrix. However use of this nomenclature is also not intended to be limiting. In embodiments in which the optional permutation or multiplication by a second matrix [U2] is not performed, the [U1] matrix facilitates time shifting by providing a framework through which the elements of the resulting transformed data matrix to be transmitted at different times (e.g., on a column by column basis or any other ordered basis).

Turning to some more specific embodiments, in some embodiments, [U₁] may have rows that correspond to Legendre symbols, or spreading sequences, where each successive row in the matrix may be a cyclically shifted version of the Legendre symbols in the row above it. These Legendre symbols will occasionally also be referred to in the alternative as base vectors, and occasionally as spectrum-spreading codes.

In some embodiments, [U₂] may chosen to be a Discrete Fourier transform (DFT) matrix or an Inverse Discrete Fourier Transform matrix (IDFT). This DFT and IDFT matrix can be used to take a sequence of real or complex numbers, such as the N×N (P[U₁][D]) matrix, and further modulate P([U₁] [D]) into a series of spectral shapes suitable for wireless transmission.

The individual rows for the DFT and IDFT matrix [U₂] will occasionally be referred in the alternative as Fourier Vectors. In general, the Fourier vectors may create complex sinusoidal waveforms (tone or spectral-shapes) of the type:

$$X_j^k = e^{\left(\frac{-i*2*\pi*j*k}{N}\right)}$$

where, for an N×N DFT matrix, X is the coefficient of the Fourier vector in row k, column N of the DFT matrix, and j is the column number. The products of this Fourier vector can be considered to be tones or spectral-shapes.

Although certain specific [U₁] and [U₂] can be used to transmit any given data frame [D], when multiple data frames [D] are being transmitted simultaneously, the specific [U₁] and [U₂] chosen may vary between data frames [D], and indeed may be dynamically optimized to avoid certain communications link impairments over the course of transmitting many data frames [D] over a communications session.

This process of convolution and modulation will normally be done by an electronic device, such as a microprocessor equipped, digital signal processor equipped, or other electronic circuit that controls the convolution and modulation parts of the wireless radio transmitter. Similarly the process of receiving and demodulation will also generally rely upon a microprocessor equipped, digital signal processor equipped, or other electronic circuit that controls the demodulation, accumulation, and deconvolution parts of the wireless radio receiver.

Thus again using matrix multiplication, and again remembering that these are all N×N matrices, [P([U₁][D])][U₂], where [U₂] is optional, represents the TFS data matrix that the transmitter will distribute over a plurality of time spreading intervals, time slices, frequencies, and spectral shapes. Note again that as a result of the various matrix operation and optional permutation steps, a single element or symbol from the original N×N data matrix [D] after modulation and transmission, will be distributed throughout the different time spreading intervals, time slices, frequencies, and spectral shapes, and then reassembled by the receiver and deconvolved back to the original single data element of symbol.

Figure 6A:
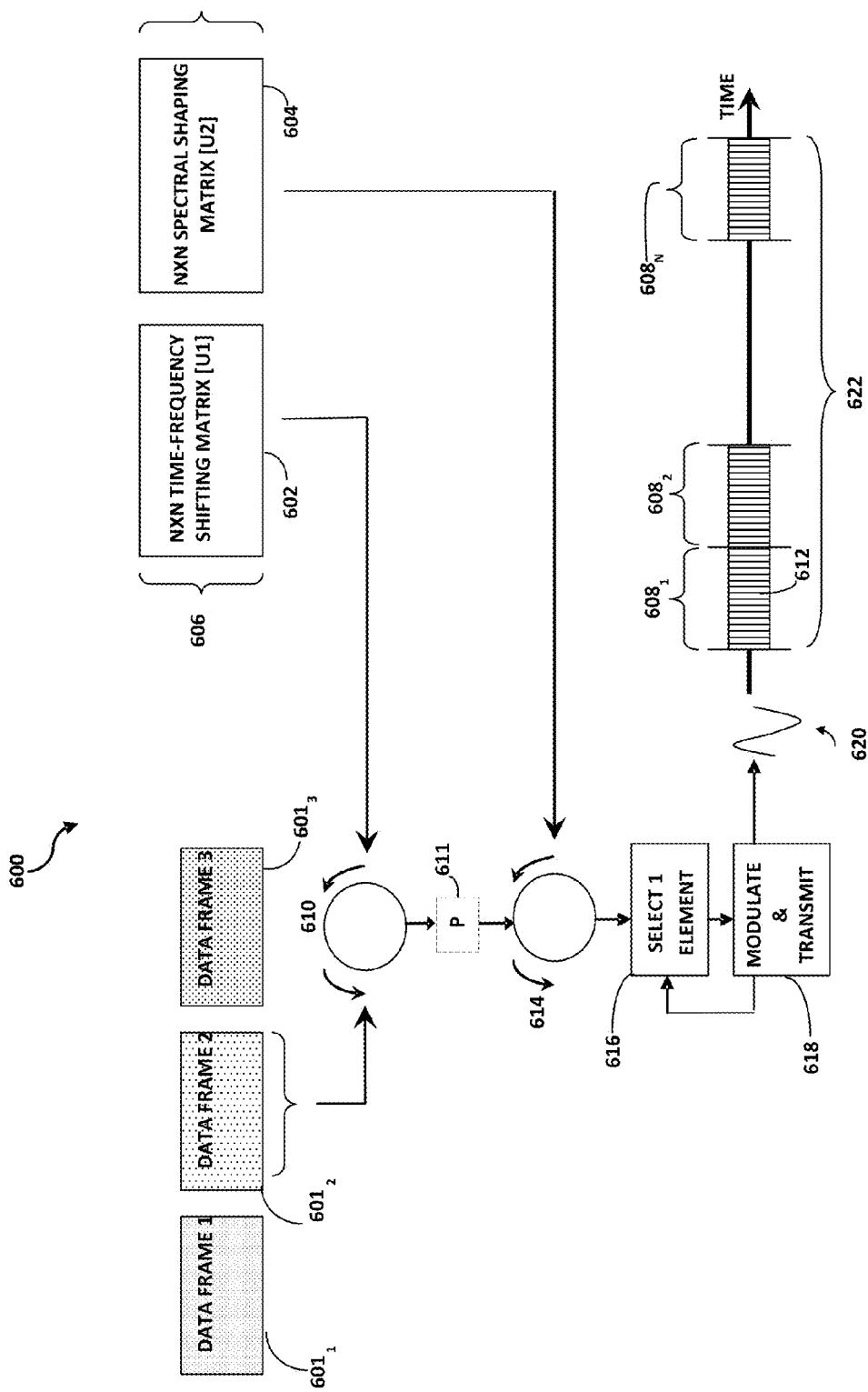
FIG. 6A shows an overview of one manner in which an OTFS method may be used to transmit data over a wireless link.
Figure 6B:
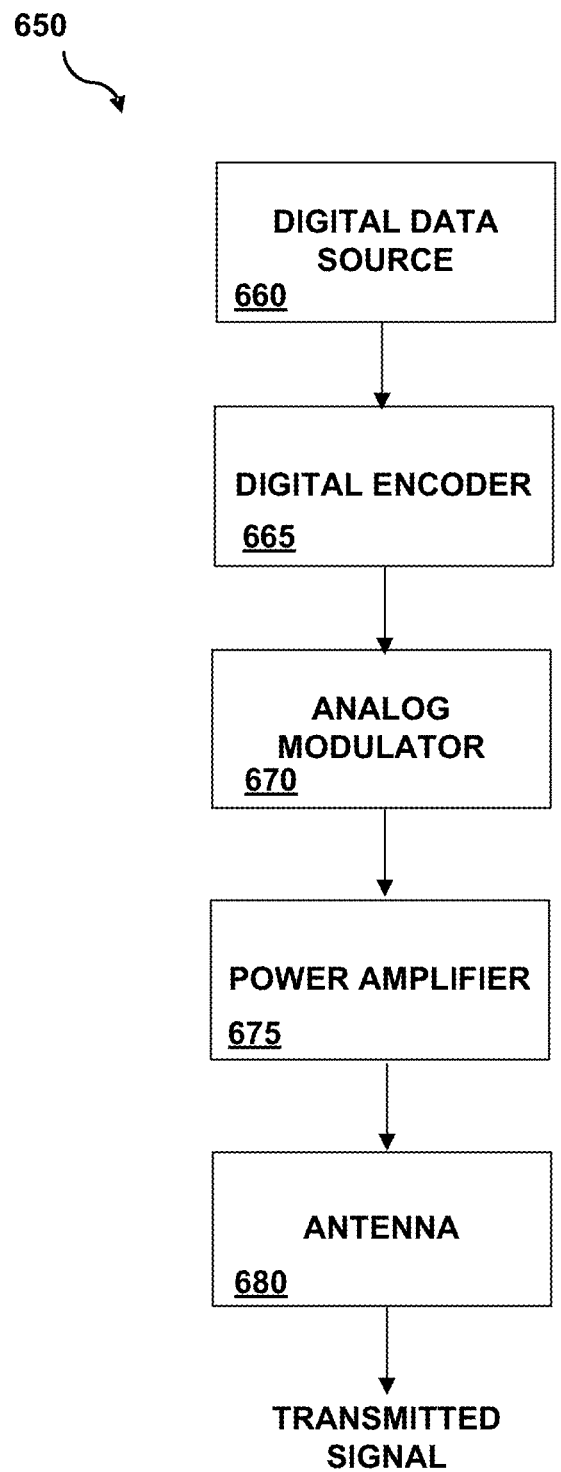
FIG. 6B illustrates components of an exemplary OTFS transmitter for performing the method of FIG. 6A.

FIG. 6A illustratively represents an exemplary OTFS method 600 for transmitting data over a wireless link such as the communication channel 320. FIG. 6B illustrates components of an exemplary OTFS transmitter 650 for performing the method of FIG. 6A. The method 600 can be performed, for example, by components of the OTFS transceiver 400 of FIG. 4 or by components of the OTFS transmitter 650 of FIG. 6B.

In the example of FIG. 6, the payload intended for transmission comprises an input data frame 601 composed of an N×N matrix [D] containing N² symbols or data elements. As shown in FIG. 6A, a succession of data frames 601 are provided, each of which defines a matrix [D] of N×N data elements. Each matrix [D] can be provided by a digital data source 660 in the OTFS transmitter 650. The elements of the matrix [D] can be complex values selected from points in a constellation matrix such as, for example, a 16 point constellation of a 16QAM quantizer. In order to encode this data, an OTFS digital encoder 665 will select an N×N matrix [U₁] 602 and, in some embodiments, select an N×N matrix [U₂] 604 (stage 606). As previously discussed, in some embodiments the matrix [U₁] 602 may be a matrix composed of Legendre symbols or a Hadamard matrix. This matrix [U₁] 602 will often be designed to time and frequency shift the symbols or elements in the underlying data matrix [D] 601.

The matrix [U₂] 604 may be a DFT or IDFT matrix and is often designed to spectrally shape the signals. For example, in some embodiments the matrix [U₂] 604 may contain the coefficients to direct the transmitter circuits of the OTFS modulator 430 to transform the signals over time in a OFDM manner, such as by quadrature-amplitude modulation (QAM) or phase-shift keying, or other scheme.

Usually the matrix [D] 601 will be matrix multiplied by the matrix [U₁] 602 by the digital encoder 665 at stage 610, and the matrix product of this operation [U₁][D] then optionally permuted by the digital encoder 665 forming P([U₁][D]) (stage 611). In embodiments in which a spectral shaping matrix is utilized, the digital encoder 665 multiplies matrix [U₁][D] by matrix [U₂] 604 forming an N×N TFS data matrix, which may also be referred to herein as an OFTS transmission matrix (stage 614).

The various elements of the TFS matrix are then selected by the OTFS analog modulator 670, usually a column of N elements at a time, on a single element at a time basis (stage 616) The selected elements are then used to generate a modulated signal that is transmitted via an antenna 680 (stage 618). More specifically, in one embodiment the particular real and imaginary components of each individual TFS matrix element are used to control a time variant radio signal 620 during each time slice. Thus one N-element column of the TFS matrix will usually be sent during each time-spreading interval 608, with each element from this column being sent in one of N time slices 612 of the time-spreading interval 608. Neglecting overhead effects, generally a complete N×N TFS matrix can be transmitted over N single time spreading intervals 622.

Figure 6C:
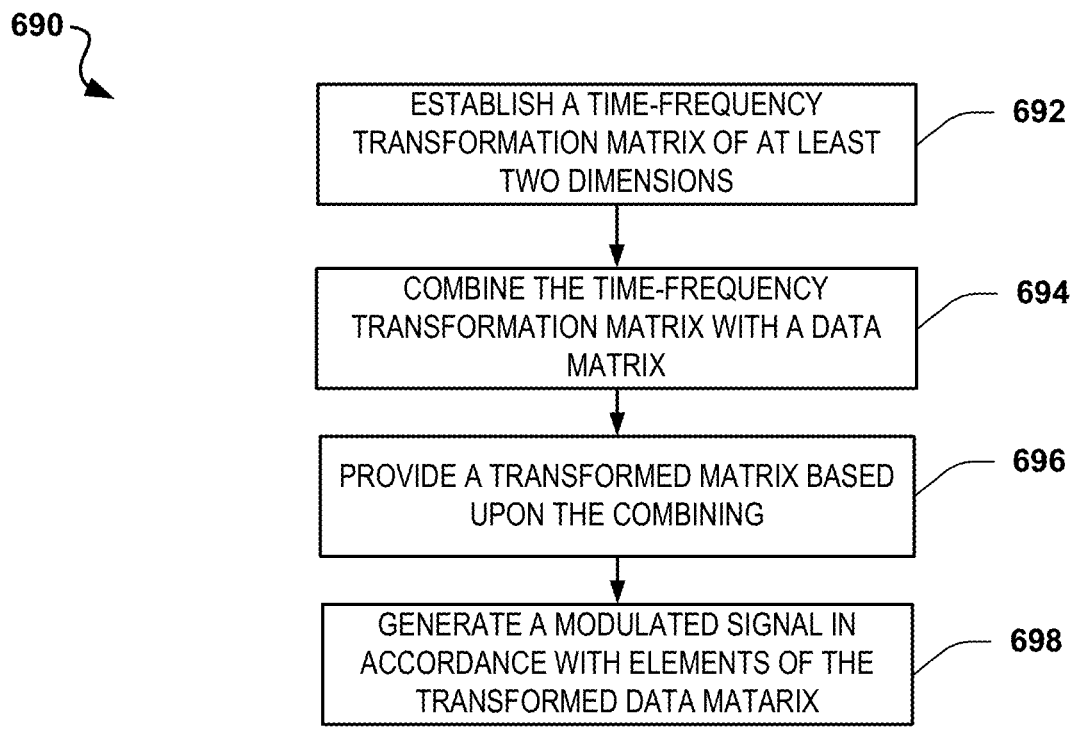
FIG. 6C is a flowchart representative of an exemplary OTFS data transmission method.

Attention is now directed to FIG. 6C, which is a flowchart representative of an exemplary OTFS data transmission method 690 capable of being implemented by the OTFS transmitter 650 or, for example, by the OTFS transmitter 2100 of FIG. 21 (discussed below). As shown, the method includes establishing a time-frequency transformation matrix of at least two dimensions (stage 692). The time-frequency transformation matrix is then combined with a data matrix (stage 694). The method 690 further includes providing a transformed matrix based upon the combining of the time-frequency transformation matrix and the data matrix (stage 696). A modulated signal is then generated in accordance with elements of the transformed data matrix (stage 698).

Attention is now directed to FIG. 21A, which is a block diagram representation of an OTFS transmitter module 2100 capable of performing functions of the OTFS transmitter 650 (FIG. 6B) in order to implement the transmission method 600 of FIGS. 6A and 6C. With reference to FIG. 21 and FIG. 6B, the transmitter 2100 includes a digital processor 2102 configured for inclusion within the digital encoder 665 and a modulator 2104 configured for inclusion within the analog modulator component 670. The digital processor 2102, which may be a microprocessor, digital signal processor, or other similar device, accepts as input the data matrix [D] 2101 and may either generate or accept as inputs a [U₁] matrix 2102 and a [U₂] matrix 2104. A matrix generation routine 2105 stored within a memory associated with the processor 2102 will, when executed by the processor 2102, generate a TFS matrix 2108 (FIG. 21B), which will generally be comprised of a set of complex-valued elements. Once generated, scanning/selection routine 2106 will, when executed by the processor 2102, select individual elements from the TFS matrix 2108 matrix, often by first selecting one column of N elements from the TFS matrix and then scanning down this column and selecting individual elements at a time. Generally one new element will be selected every time slice 2112 (FIG. 21C).

Thus every successive time slice, one element from the TFS matrix 2108 will be used to control the modulator 2104. In one embodiment of the OTFS method, the modulator 2104 includes modules 2132 and 2134 for separating the element into its real and imaginary components, modules 2142 and 2144 for chopping the resultant real and imaginary components, and filtering modules 2152 and 2154 for subsequently performing filtering operations. The filtered results are then used to control the operation of sin and cosine generators 2162 and 2164, the outputs of which are upconverted using a RF carrier in order to produce an analog radio waveform 2120. This waveform then travels to the receiver where it is demodulated and deconvolved as will be described below with reference to FIG. 7. Thus in this scheme (again neglecting overhead effects), element $t_{1,1}$ from the first column of the TFS matrix can be sent in the first time slice, and the Nth element from the first column of the TFS matrix can be sent in the last time slice of the first time spreading interval 2124. The next element $t_{1,2}$ from the second column of the TFS matrix can be sent in the first time slice of the second time spreading interval 2128, and so on. Thus, the modulator 2104 transmits a composite waveform during each time spreading interval, where the value of the waveform is determined by a different element of the TFS matrix 2108 during each time slice of the spreading interval.

In an alternative embodiment, diagonals of the TFS data matrix may be transmitted over a series of single time-spreading intervals, one diagonal per single time-spreading interval, so that N diagonals of the final N×N transmission matrix are transmitted over N time intervals. In other embodiments the order in which individual elements of the TFS transmission matrix $[[U_1][D]][U_2]$ are transmitted across the communications link is determined by a transmit matrix or transmit vector.

In some embodiments, there may be some overhead to this basic model. Thus, for example, with some time padding (additional time slices or additional time spreading intervals), checksums or other verification/handshaking data, which could be transmitted in a non-convolved manner, could be sent back by the receiver to the transmitter on a per time-spreading interval, per N time spreading intervals, or even on a per time slice interval in order to request retransmission of certain parts of the TFS data matrix as needed.

Figure 9:
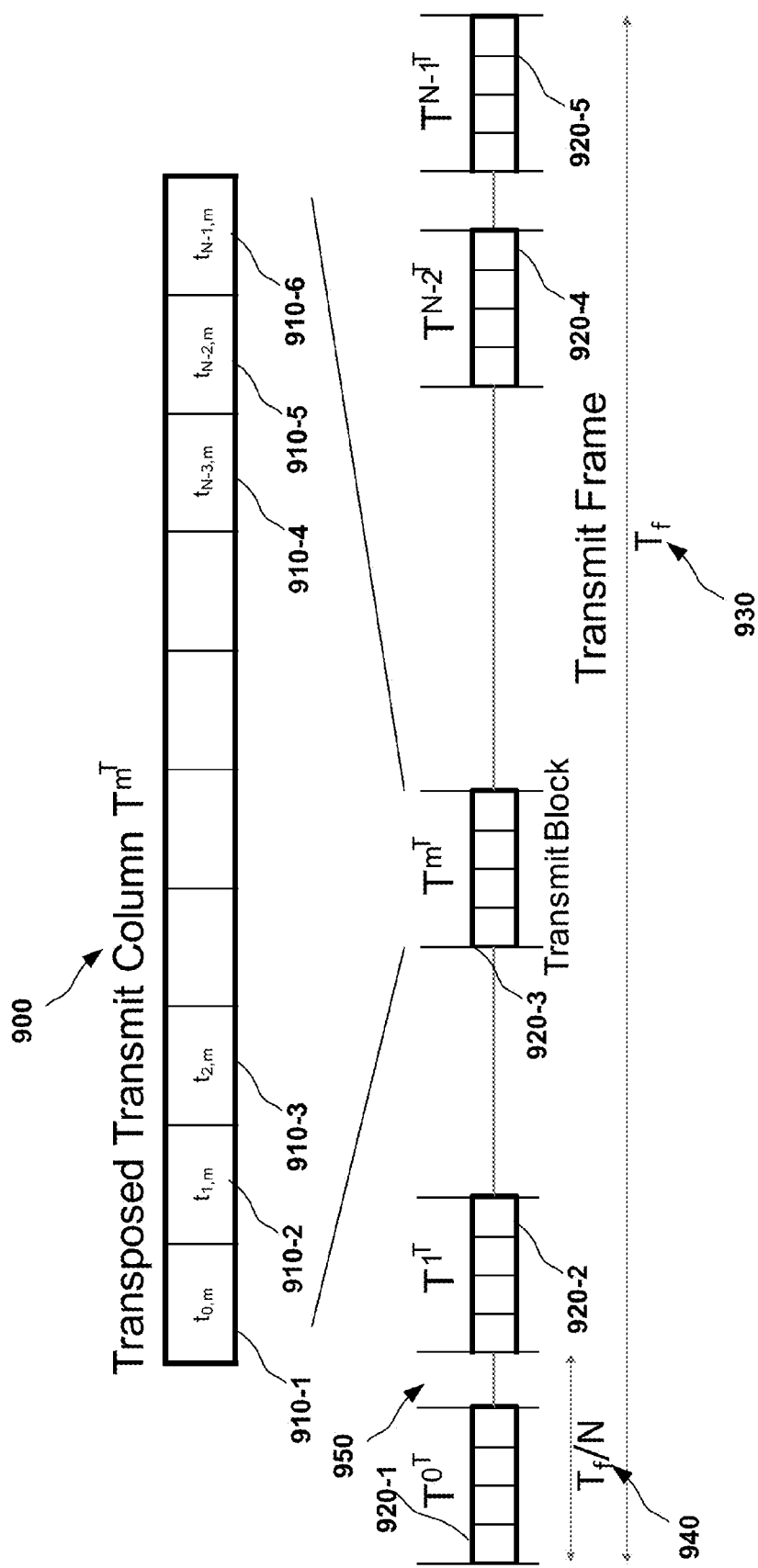
FIG. 9 shows an exemplary transmit frame including guard times between groups of transmitted data.

FIG. 9 illustratively represents an exemplary transmit frame 900 comprised of a plurality of transmit blocks 920 separated by guard times 950. Each transmit block 920 includes data corresponding to a portion of the [D] matrix, such as a column as shown in FIG. 9, or a row, or sub-blocks of the [D] matrix. The guard time 950 can provide the receiver with time to resolve Doppler shift in transmitted signals. The Doppler shift causes delays or advances in the receive time and the OTFS receiver 455 can use the spaces between the transmit blocks 920-1, 920-2, 920-3, 920-4 and 920-5 to capture data without interference from other users. The guard times 950 can be used with either the first or second forms of the OTFS methodology. The guard times 950 can be utilized by other transmitters in the area so long as the transmission uses different codes (e.g., Hadamard codes) than those used to transmit the frame 900.

Figure 20:
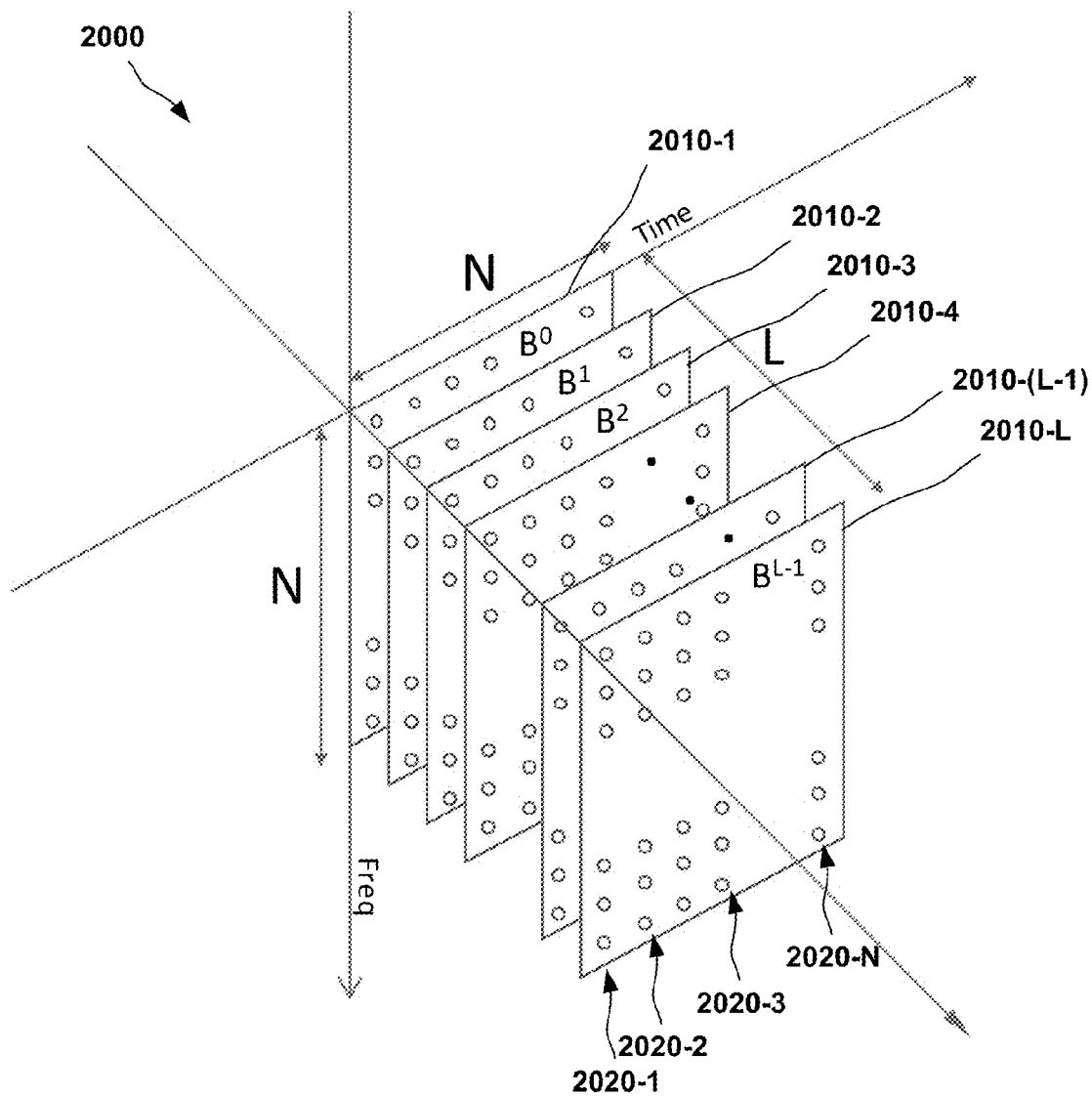
FIG. 20 illustrates a sequence of L-OTFS N×N matrices making up a frame of data comprising L×N×N symbols spread in both time and frequency.

Attention is now directed to FIG. 20, which illustrates a sequence of L OTFS matrices 2010, each of dimension N×N. The L OFTS matrices 2010 collectively comprise a frame of data which includes L×N×N symbols spread out in both time and frequency. The matrices 2010-1 through 2010-L are transmitted back-to-back and include guard times ($T_g$) between matrices 2010. The N columns 2020 of a given matrix 2010 are transmitted on a column-by-column basis, typically with guard times inserted between the transmission of each column 2020. Therefore, the L frames 2010 are transmitted in a time greater than N×[L×(N×T+Tg)], where T is the time to transmit one column of symbols inclusive of the guard times described above.

As previously discussed, in some embodiments, the first N×N time spreading matrix $[U_1]$ may be constructed out of N rows of a cyclically shifted Legendre symbols or pseudorandom number of length N. That is, the entire N×N spreading matrix is filled with all of the various cyclic permutations of the same Legendre symbols. In some embodiments, this version of the $[U_1]$ matrix can be used for spectrum spreading purposes and may, for example, instruct the transmitter to rapidly modulate the elements of any matrix that it affects rapidly over time, that is, with a chip rate that is much faster than the information signal bit rate of the elements of the matrix that the Legendre symbols are operating on.

In some embodiments, the second N×N spectral shaping matrix $[U_2]$ can be a Discrete Fourier Transform (DFT) or an Inverse Discrete Fourier Transform (IDFT) matrix. These DFT and IDFT matrices can instruct the transmitter to spectrally shift the elements of any matrix that the DFT matrix coefficients act upon. Although many different modulation schemes may be used, in some embodiments, this modulation may be chosen to be an Orthogonal Frequency-Division Multiplexing (OFDM) type modulation, in which case a modulation scheme such as quadrature amplitude modulation or phase-shift keying may be used, and this in turn may optionally be divided over many closely-spaced orthogonal subcarriers.

Often the actual choice of which coefficients to use for the first N×N time-frequency shifting matrix $[U_1]$ and what coefficients to use for the second N×N spectral shaping matrix $[U_2]$ may depend on the conditions present in the communications channel 320. If, for example, a communications channel 320 is subjected to a particular type of impairment, such as wide band noise, narrow-band interference, impulse noise, Doppler shift, crosstalk and so on, then some first N×N time-frequency shifting matrices and some second N×N spectral shaping matrices will be better able to cope with these impairments. In some embodiments of the OTFS method, the transmitter and receiver will attempt to measure these channel impairments, and may suggest alternate types of first N×N time-frequency shifting matrices $[U_1]$ and second N×N spectral shaping matrices to each $[U_2]$ in order to minimize the data loss caused by such impairments.

Figure 13:
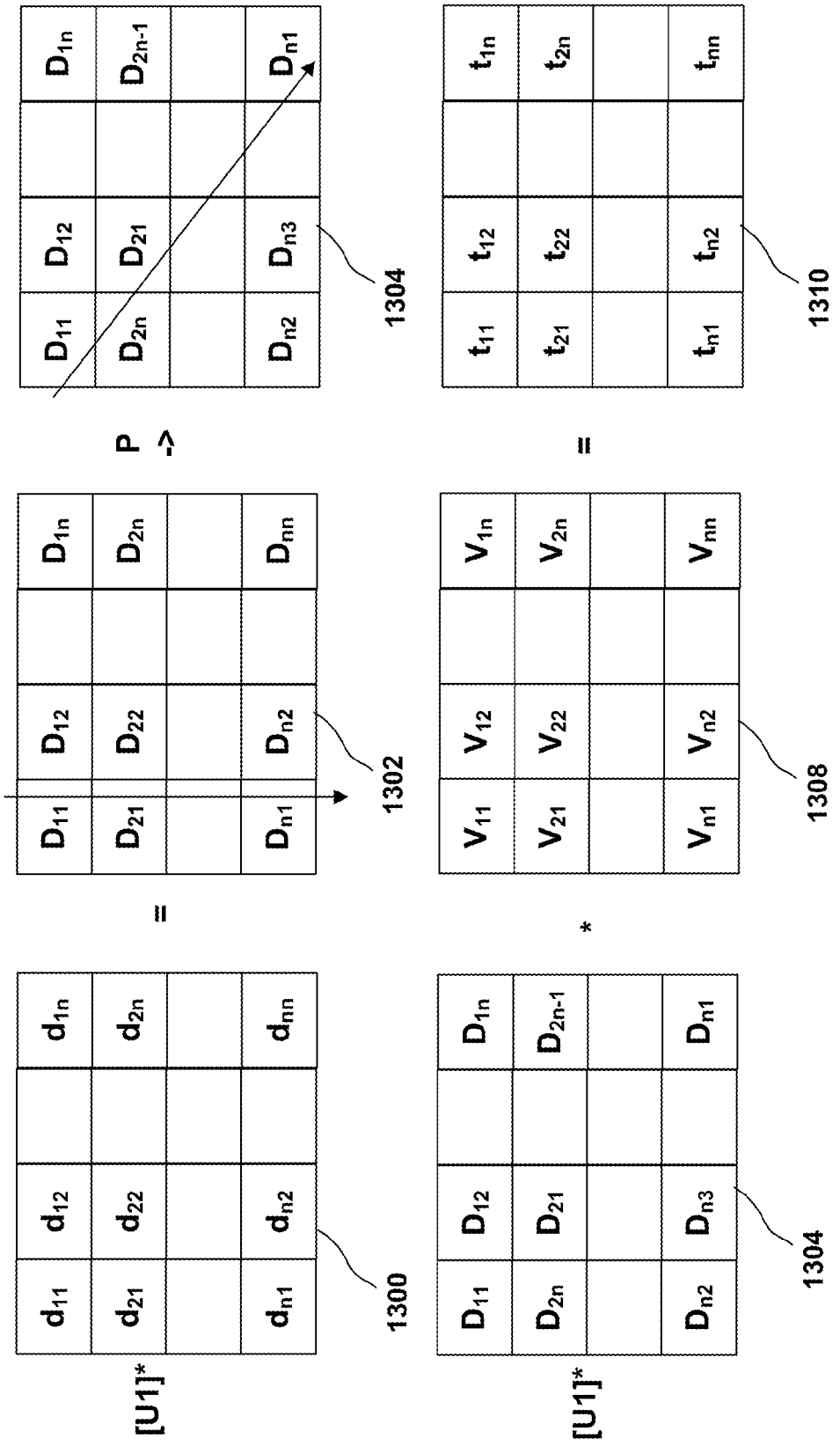
FIG. 13 illustrates operations performed by a transmitter consistent with a first alternative OTFS transmission scheme.

Various modifications of the above-described data transmission process represented by the matrix multiplication $[[U_1][D]][U_2]$ are also within the scope of the present disclosure and are described below with reference to FIGS. 13 and 15. For example, FIG. 13 shows a first alternative OTFS transmission scheme. In the embodiment of FIG. 13, the data matrix [D] may be further convolved by means of a third unitary matrix $[U_3]$ 1306, which may be an IDFT matrix. In one implementation [U1] may be a DFT matrix and the matrix $[U_2]$ 1308 may be the product of a DFT matrix and a base. In this scheme, the process of scanning and transmitting the data is represented by the previously described permutation operation P. The basic transmission process can thus be represented as $[U_3]*[P([U_1][D])]*[U_2]$. Here the matrix [D] is identified by reference numeral 1300, and the matrix product $([U_1][D])$ is identified by reference numeral 1302. The permuted version of the matrix product $([U_1][D])$, i.e., $P([U_1][D])$, is identified by reference numeral 1304 and the final matrix product $[U_3][P([U_1][D])][U_2]$ is identified by reference numeral 1310. In various embodiment the matrix $[U_3]$ 1306 may comprise a DFT matrix, an IDFT matrix, or a trivial identity matrix (in which case this first alternative scheme becomes essential equivalent to a scheme in which a matrix $[U_3]$ is not employed).

Figure 15:
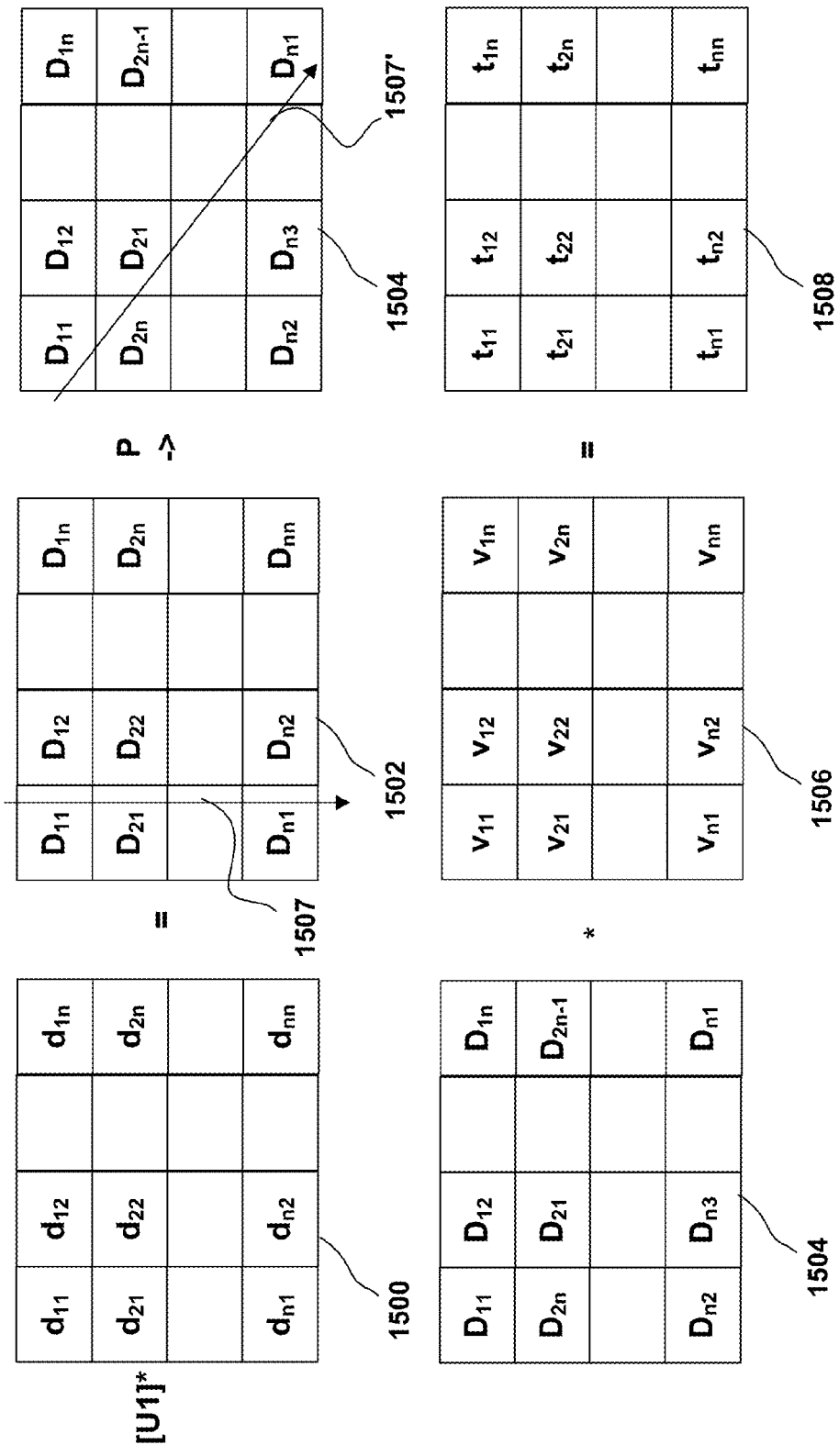
FIG. 15 illustrates operations performed by a transmitter consistent with a second alternative OTFS scheme.

Attention is now directed to FIG. 15, which illustrates a second alternative OTFS transmission scheme. As shown, the original data matrix [D] is identified by reference numeral 1500, the matrix product $[U_1][D]$ is identified by reference numeral 1502, the permuted matrix $P([U_1][D])$ is identified by reference numeral 1504, and the matrix $[U_2]$ is identified by reference numeral 1506. In the representation of FIG. 15, at least certain of the effects of the permutation operation P are represented by the differing directions of arrow 1507 and arrow 1507'. In one embodiment $[U_1]$ may be a Hadamard matrix; that is, a square matrix composed of mutually orthogonal rows and either +1 or −1 coefficients. This matrix has the property that $H^*H^T=nI_n$ where $I_n$ is an N×N identity matrix and $H^T$ is the transpose of H). Consistent with the alternative OTFS transmission scheme of FIG. 15, the matrix corresponding to the transmitted signal may be expressed as $[P([U_1][D])]^*[U_2]$ and is identified by reference numeral 1508.

Signal Reception and Data Reconstruction

Figure 3C:
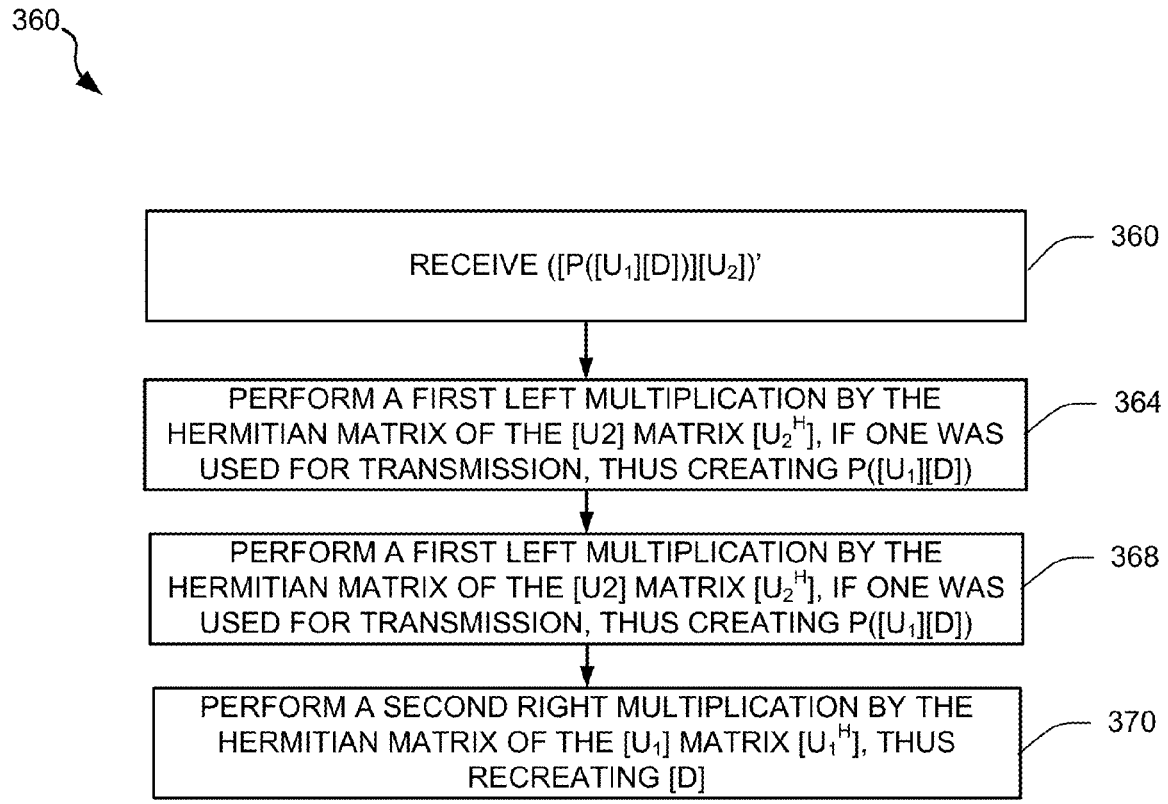
FIG. 3C illustrates a process by which an OTFS transceiver of a receiving device within the system of FIG. 3A may operate to receive a transmitted data frame.

Attention is now directed to FIG. 3C, which illustrates a process 360 by which the OTFS transceiver 315-2 of the receiving device 330 may operate to receive a transmitted data frame. Within the OTFS transceiver 315-2, the process performed during transmission is essentially done in reverse. Here the time and frequency spread replica of the TFS data matrix $([P([U_1][D])][U_2])'$ (where the ' annotation is indicative of a replicated matrix) is accumulated over multiple time spreading intervals, time slices, frequencies, and spectral shapes, and then deconvolved to solve for $[D]$ by performing the following operations:

1: Receive $([P([U_1][D])][U_2])'$ (stage 362)
2: Perform a first left multiplication by the Hermitian matrix of the [U2] matrix $[U_2^H]$, if one was used for transmission, thus creating $P([U_1][D])$ (stage 364).
3: Inverse permute this replica by $(P([U_1][D])P^{-1}$, if a permutation was used during transmission, thus creating $[U_1][D]$ (stage 368)
4. Perform a second right multiplication by the Hermitian matrix of the $[U_1]$ matrix $[U_1^H]$, thus recreating $[D]$ (stage 370).

As a consequence of noise and other impairments in the channel, use of information matrices and other noise reduction methods may be employed to compensate for data loss or distortion due to various impairments in the communications link. Indeed, it may be readily appreciated that one advantage of spreading out the original elements of the data frame [D] over a large range of times, frequencies, and spectral shapes as contemplated by embodiments of the OTFS method is that it becomes straightforward to compensate for the loss during transmission of information associated with a few of the many transmission times, frequencies and spectral shapes.

Although various deconvolution methods may used in embodiments of the OTFS method, the use of Hermitian matrices may be particularly suitable since, in general, for any Hermitian matrix $[U^H]$ of a unitary matrix $[U]$, the following relationship applies:

$[U][U^H]=[I]$ where $[I]$ is the identity matrix.

Communications links are not, of course, capable of transmitting data at an infinite rate. Accordingly, in one embodiment of the OTFS method the first N×N time-frequency shifting matrix $([U_1]$, the second N×N spectral shaping matrix $([U_2]$ (when one is used), and the elements of the data frame, as well as the constraints of the communications link (e.g. available bandwidth, power, amount of time, etc.), are chosen so that in balance (and neglecting overhead), at least N elements of the N×N TFS data matrix can be transmitted over the communications link in one time-spreading interval. More specifically (and again neglecting overhead), one element of the N×N TFS data matrix will generally be transmitted during each time slice of each time-spreading interval.

Given this rate of communicating data, then typically the entire TFS data matrix may be communicated over N time-spreading intervals, and this assumption will generally be used for this discussion. However it should be evident that given other balancing considerations between the first N×N time-frequency shifting matrix, the second N×N spectral shaping matrix, and the elements of the data frame, as well as the constraints of the communications link, the entire TFS data matrix may be communicated in less than N time-spreading intervals, or greater than N time spreading intervals as well.

As discussed above, the contents of the TFS data matrix may be transmitted by selecting different elements from the TFS data matrix, and sending them over the communications link, on a one element per time slice basis, over multiple spreading time intervals. Although in principle this process of selecting different elements of the TFS data matrix can be accomplished by a variety of different methods, such as sending successive rows of the TFS data matrix each single time spreading interval, sending successive columns of the TFS data matrix each successive time spreading interval, sending successive diagonals of the TFS data matrix each successive time spreading intervals, and so on, from the standpoint of communications link capacity, minimizing interference, and reducing ambiguity, some schemes are often better than others. Thus, often the $[U_1]$ and $[U_2]$ matrices, as well as the permutation scheme P, may be chosen to optimize transmission efficiency in response to various impairments in the communications link.

Figure 4B:
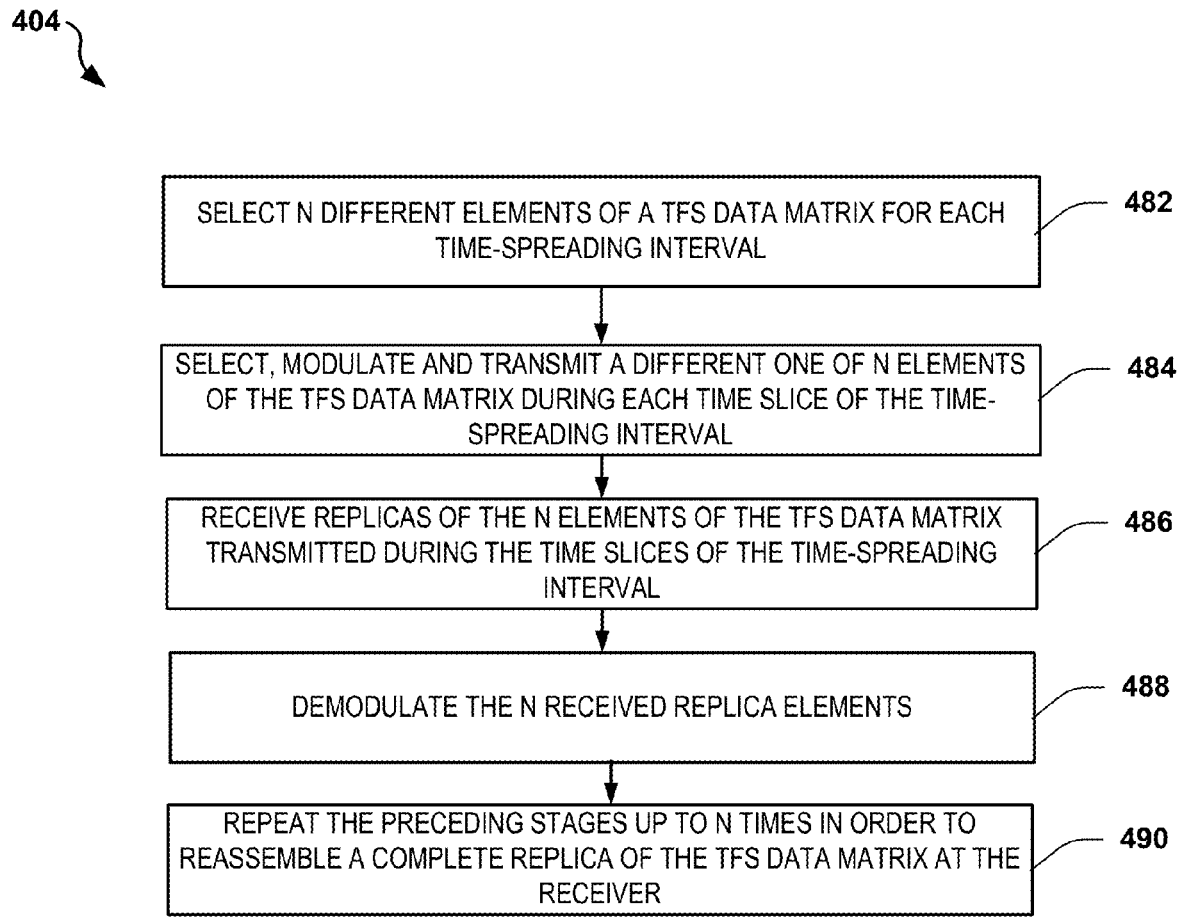
FIG. 4B illustrates an exemplary process pursuant to which an OTFS transceiver may transmit, receive and reconstruct information utilizing a TFS data matrix.

As shown in FIG. 4B, an exemplary process 404 pursuant to which an OTFS transceiver may transmit, receive and reconstruct information utilizing a TFS data matrix may thus be generally characterized as follows:

1: For each single time-spreading interval, selecting N different elements of the TFS data matrix (often successive columns of the TFS matrix will be chosen)(stage 482).
2: Over different time slices in the given time spreading interval, selecting one element (a different element each time slice) from the N different elements of the TFS data matrix, modulating this element, and transmitting this element so that each different element occupies its own time slice (stage 484).
3: Receiving these N different replica elements of the transmitted TFS data matrix over different said time slices in the given time spreading interval (stage 486).
4: Demodulating these N different elements of the TFS data matrix (stage 488).
5. Repeating stages 482, 484, 486 and 488 up to a total of N times in order to reassemble a replica of the TFS data matrix at the receiver (stage 490).

This method assumes knowledge by the receiver of the first N×N spreading code matrix $[U_1]$, the second N×N spectral shaping matrix $[U_2]$, the permutation scheme P, as well as the particular scheme used to select elements from the TFS matrix to transmit over various periods of time. In one embodiment the receiver takes the accumulated TFS data matrix and solves for the original N×N data frame using standard linear algebra methods. It may be appreciated that because each original data symbol from the original data frame [D] has essentially been distributed over the entire TFS data matrix, it may not be possible to reconstruct an arbitrary element or symbol from the data [D] until the complete TFS data matrix is received by the receiver.

Figure 7A:
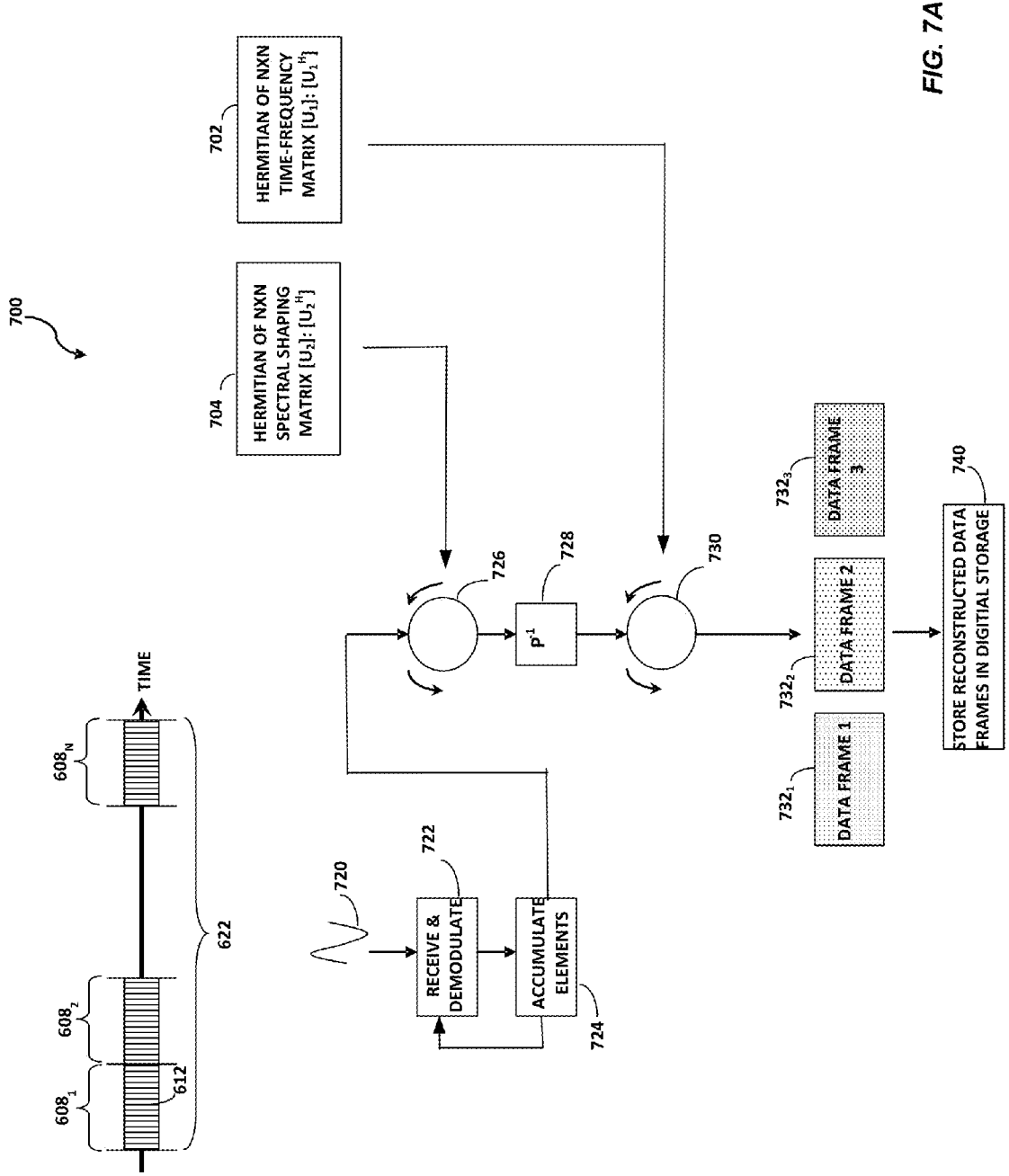
FIG. 7A shows an overview of one manner in which an OTFS method may be used to receive data over a wireless link.
Figure 7B:
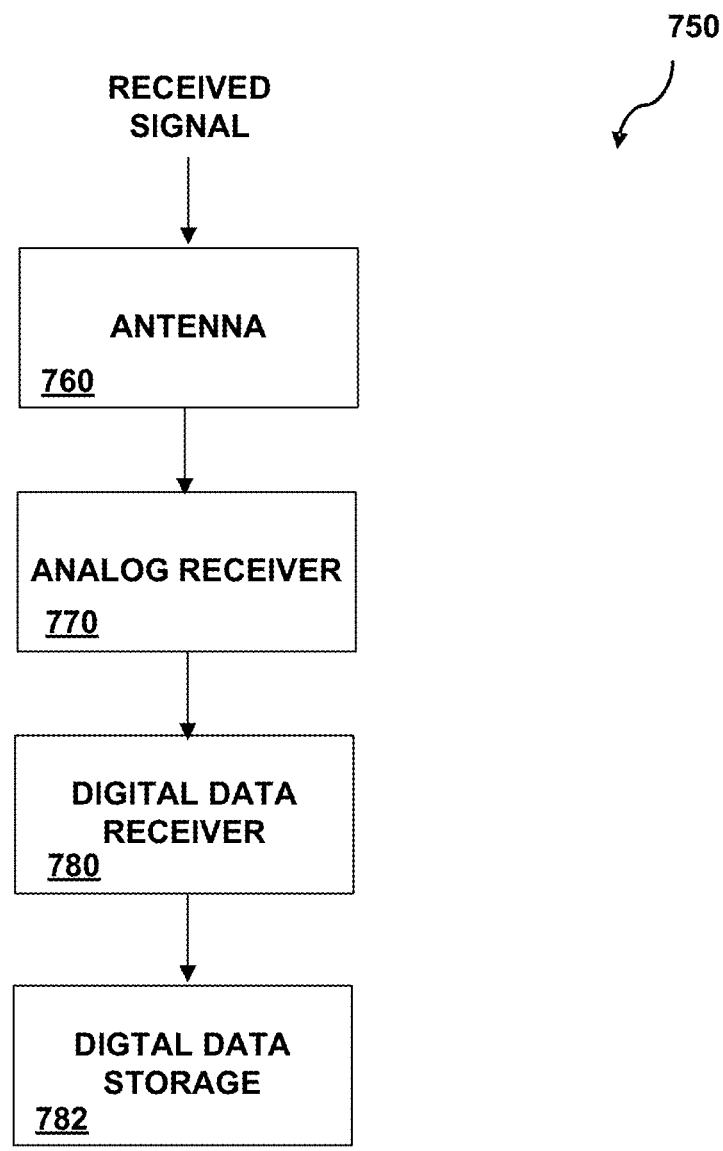
FIG. 7B illustrates components of an exemplary OTFS receiver for performing the method of FIG. 7A.

Attention is now directed to FIG. 7A, which illustratively represents an exemplary method 700 for demodulating OTFS-modulated data over a wireless link such as the communication channel 320. FIG. 7B illustrates components of an exemplary OTFS receiver for performing the method of FIG. 7A. The method 700 can be performed by the OTFS receiver module 455 of the OTFS transceiver 400 of FIG. 4A or by the OTFS receiver 750 of FIG. 7B. Just as the OTFS transmitter 405 is often a hybrid analog/digital device, capable of performing matrix calculations in the digital portion and then converting the results to analog signals in the analog portion, so to the OTFS receiver 750 will typically be capable of receiving and demodulating the radio signals in the analog receiver 770 of the OTFS receiver 750, and then often decoding or deconvolving these signals in the digital portion of the digital OTFS receiver 780.

As shown in FIG. 7A, received signals 720 corresponding to channel-impaired versions of the transmitted radio signals 620 may be received by, for example, an antenna 760 of the OTFS receiver 750. The received signals 720 will generally not comprise exact copies of the transmitted signals 620 because of the signal artifacts, impairments, or distortions engendered by the communication channel 320. Thus replicas, but not exact copies, of the original elements of the TFS matrix are received and demodulated 722 by the OTFS analog receiver 770 every time slice 612. In an exemplary embodiment one column of the TFS matrix is demodulated at stage 722 during every spreading time interval 608. As a consequence, the OTFS demodulator 460 will accumulate these elements over N single time spreading intervals, eventually accumulating the elements necessary to create a replica of the original TFS matrix (stage 724)

In order to decode or deconvolve the TFS matrix accumulated during stage 724, the digital OTFS data receiver 780 left multiplies, during a stage 726, the TFS matrix by the Hermitian matrix of the [$U_2$] matrix, i.e., [$U_2^H$], established at a stage 704. Next, the digital OTFS data receiver 780 performs, at a stage 728, an inverse permutation ($P^{-1}$) of the result of this left multiplication. The digital OTFS data receiver 780 then deconvolves the TFS matrix in order to reconstruct a replica 732 of the original data matrix [D] by, in a stage 730, right multiplying the result of stage 728 by the Hermitian of the original N×N time-frequency shifting matrix [$U_1$], i.e., [$U_1^H$], established at a stage 702. Because the reconstructed signal will generally have some noise and distortion due to various communications link impairments, various standard noise reduction and statistical averaging techniques, such as information matrices, may be used to assist in the reconstruction process (not shown). Each replicated frame 732 of each original data matrix [D] may be stored within digital data storage 782 (stage 740).

Figure 7C:
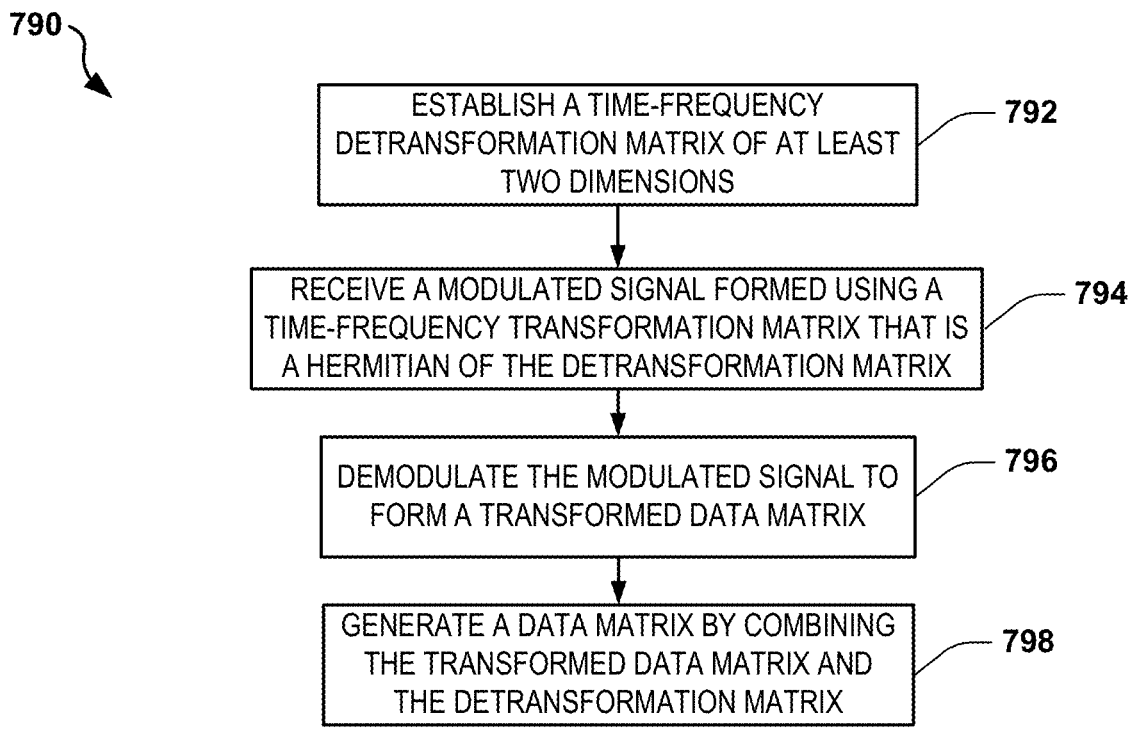
FIG. 7C is a flowchart representative of an exemplary OTFS data demodulation method.

Attention is now directed to FIG. 7C, which is a flowchart representative of an exemplary OTFS data demodulation method 790 capable of being implemented by the OTFS receiver module 455 of the OTFS transceiver 400 or, for example, by the OTFS receiver 750 of FIG. 7B. As shown in FIG. 7C, the method includes establishing a time-frequency detransformation matrix of at least two dimensions (stage 792). The method further includes receiving a modulated signal formed using a time-frequency transformation matrix that is a hermetian of the detransformation matrix (stage 794). The modulated signal is then demodulated to form a transformed data matrix (stage 796). The method further includes generating a data matrix by combining the transformed data matrix and the detransformation matrix (stage 798).

Figure 16:
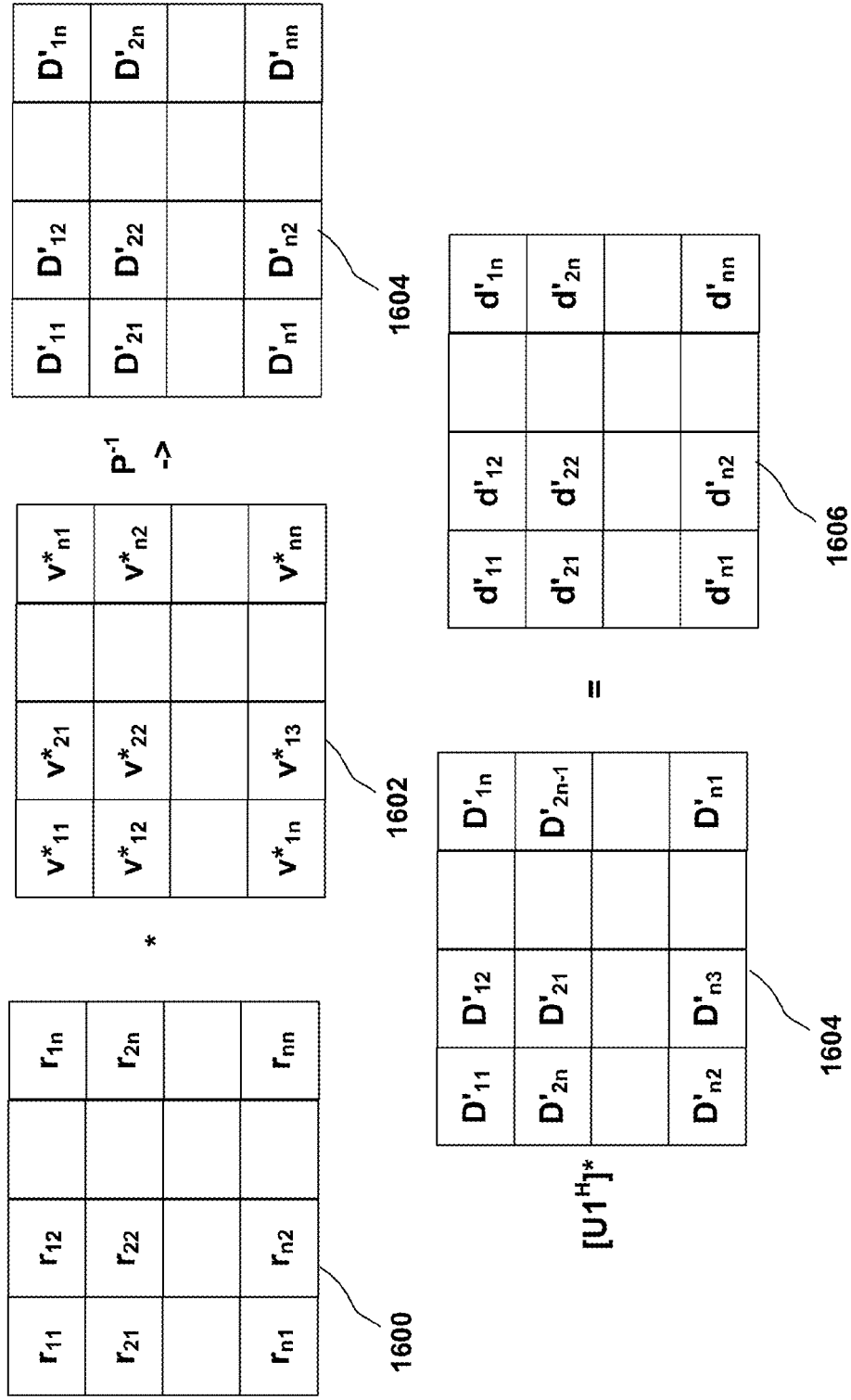
FIG. 16 illustrates operations performed by a receiver consistent with the second alternative OTFS scheme.

Attention is now directed to FIG. 16, which illustrates an alternative OTFS signal reception scheme corresponding to the alternative OTFS transmission scheme of FIG. 15. As shown, the matrix [r] 1600 of received data is demodulated and deconvolved (decoded) by forming the Hermitian matrices of the matrices [$U_1$] and [$U_2$] used to encode and modulate the data [D], as well as the inverse permutation operation $P^{-1}$ to undo the original permutation operation P used to scan and transmit the data over multiple time intervals. In the illustration of FIG. 16, the inverse permutation $P^{-1}([r][U_2^H])$ is identified by reference numeral 1604 and the reconstructed data matrix [D] (created from $[U_1^H]*P^{-1}([r]*[U_2^H])$) is identified by the reference numeral 1606.

Attention is now directed to FIG. 15, which illustrates an alternative OTFS transmission scheme. As shown, the original data matrix [D] is identified by reference numeral 1500, the matrix product [$U_1$][D] is identified by reference numeral 1502, the permuted matrix P([$U_1$][D]) is identified by reference numeral 1504, and the matrix [$U_2$] is identified by reference numeral 1506. In the representation of FIG. 15, at least certain of the effects of the permutation operation P are represented by the differing directions of arrow 1507 and arrow 1507'. In one embodiment [$U_1$] may be a Hadamard matrix; that is, a square matrix composed of mutually orthogonal rows and either +1 or -1 coefficients. This matrix has the property that $H*H^T=nI_n$ where $I_n$ is an N×N identity matrix and $H^T$ is the transpose of H). Consistent with the alternative OTFS transmission scheme of FIG. 15, the matrix corresponding to the transmitted signal may be expressed as $[P([U_1][D])]*[U_2]$ and is identified by reference numeral 1508.

Figure 14:
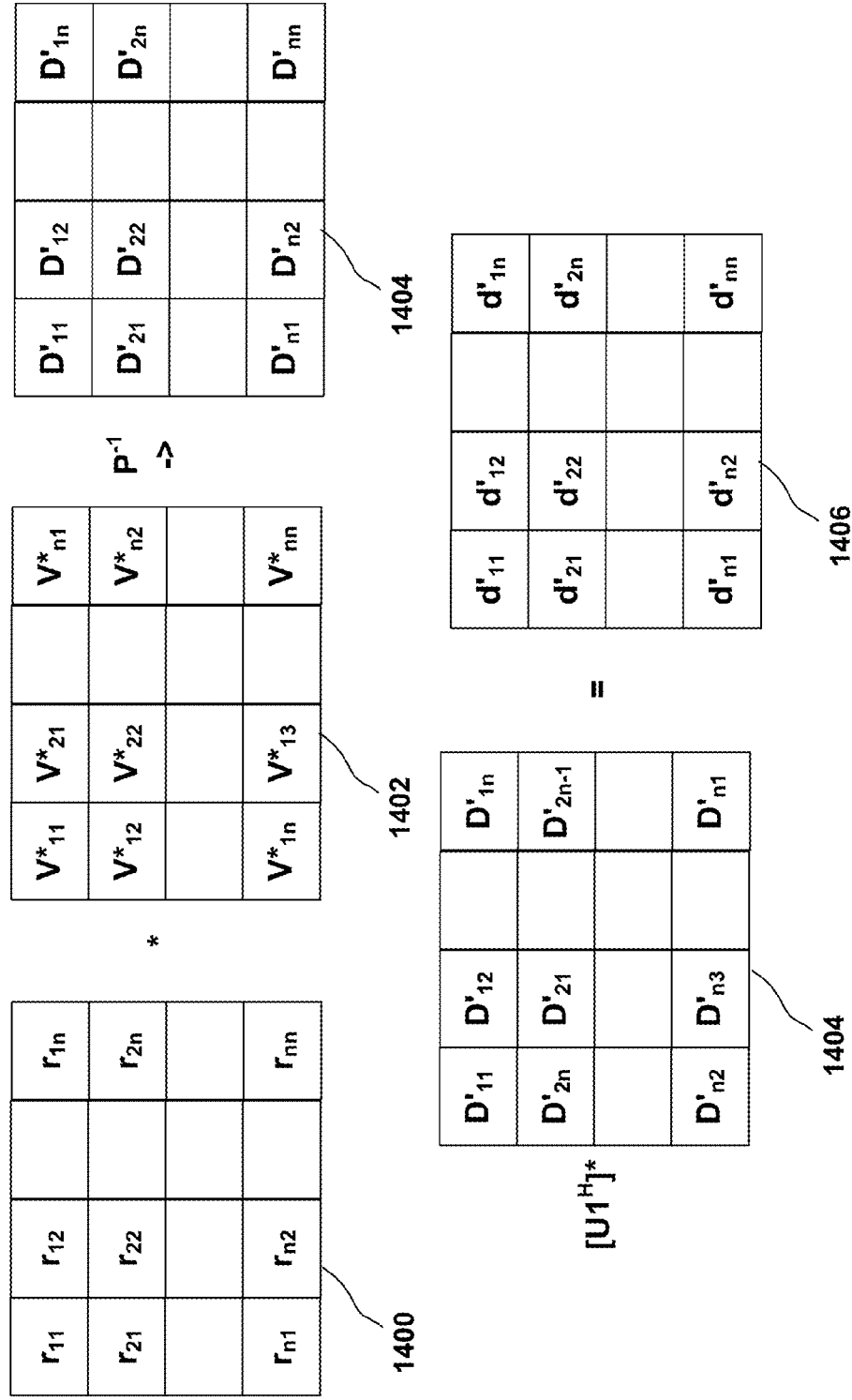
FIG. 14 illustrates operations performed by a receiver consistent with the first alternative OTFS scheme.

Various modifications of the above-described data reconstruction process are also within the scope of the present disclosure and are described below with reference to FIGS. 14 and 16. Turning now to FIG. 14, there is illustrated a scheme for reception and reconstruction of signals transmitted consistent with the first alternative OTFS transmission scheme of FIG. 13. Here the data that the transmitter has received and accumulated, after various communications link impairment effects, is represented as the [r] matrix 1400. The [r] matrix 1400 is demodulated and deconvolved (decoded) by forming the Hermitian matrices of the original [$U_1$], [$U_2$], and [$U_3$] matrices originally used to encode and modulate the data [D], as well as the inverse permutation operation $P^{-1}$ to undo the original permutation operation P used to scan and transmit the data over multiple time intervals. Here [$U_1^H$] may be an IDFT matrix, [$U_3^H$] may be a DFT matrix, and [$U_2^H$] 1402 may be a DFT matrix times a base. As shown, $P^{-1}([U_3^H][r][U_2^H])$ is identified by the reference numeral 1404 and the reconstructed data matrix [D] is identified by reference numeral 1406.

Figure 11:
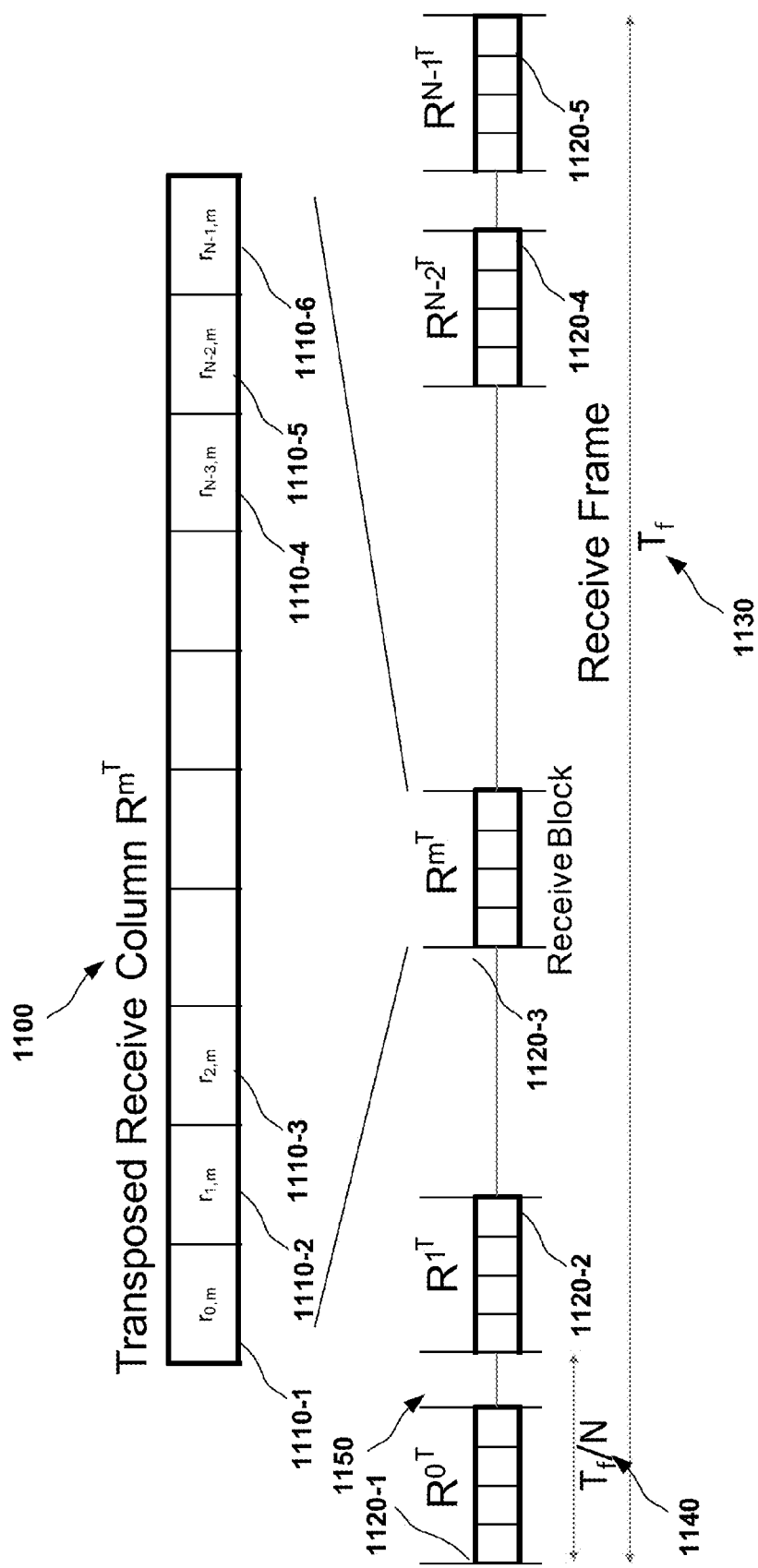
FIG. 11 shows an exemplary structure of a receive frame resulting from the transmit frame of FIG. 9.

Referring now to FIG. 11, there is illustrated an exemplary receive frame 1100 including guard times 1150 between groups of received data or blocks 1120. The receive frame 1100 corresponds to a frame received in response to transmission of a frame having characteristics equivalent to those illustrated in FIG. 9. As shown in FIG. 11, each receive block 1120 includes information comprising a portion of the [D] matrix, such as a column as shown in FIG. 11, or a row, or sub-blocks of the [D] matrix. The entire [D] matrix is received in a time $T_f$ 1130 that includes N blocks 1120 and N−1 guard times 1150. The guard time 1150 provides the receiver with time to resolve Doppler shift in the received signals. The Doppler shift causes delays or advances in the receive time and the OTFS receiver 455 can use the guard times 1120 between the receive blocks 1120-1, 1120-2, 1120-3, 1120-4 and 1120-5 to capture data without interference from other users.

Second Form of OTFS Method

Figure 10:
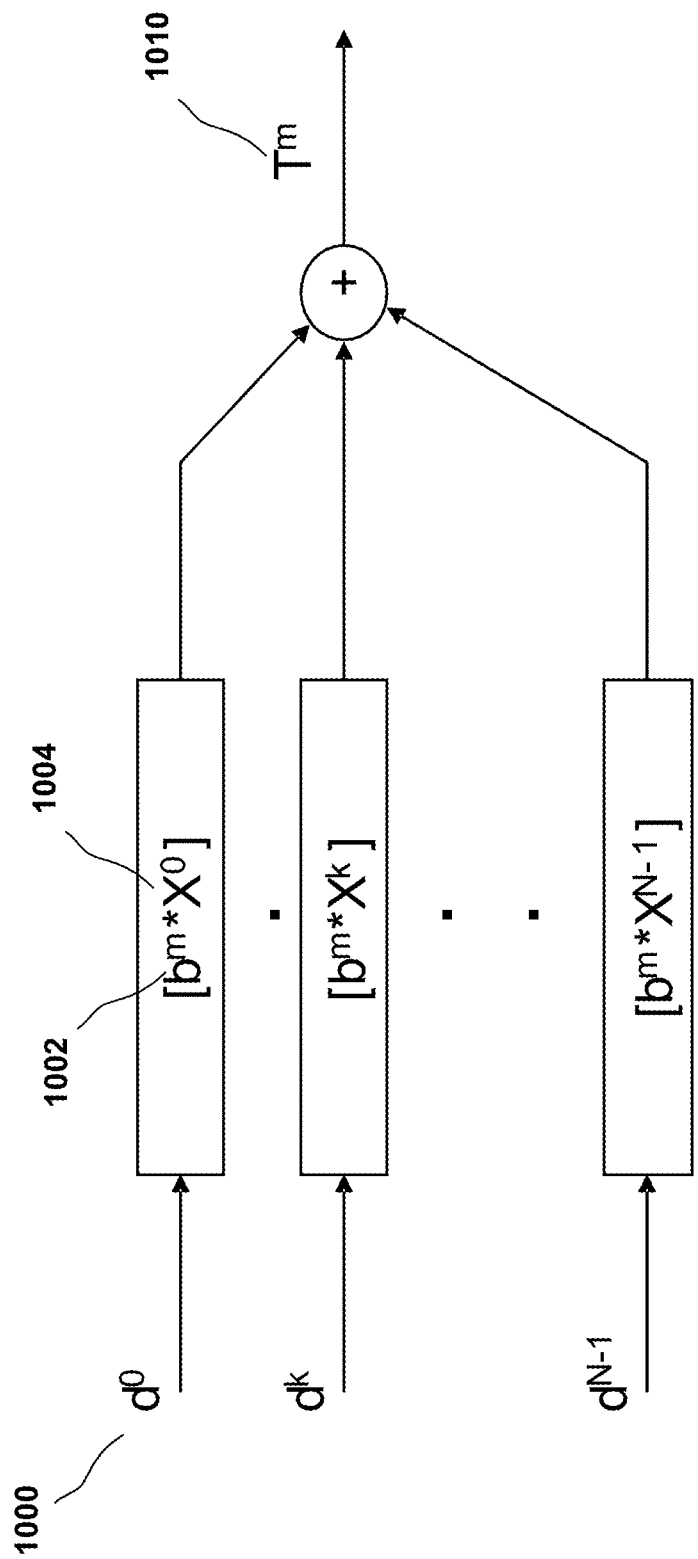
FIG. 10 shows a diagram of the cyclic convolution method used to convolve data and transmit data according to the second form of the OTFS method.
Figure 12:
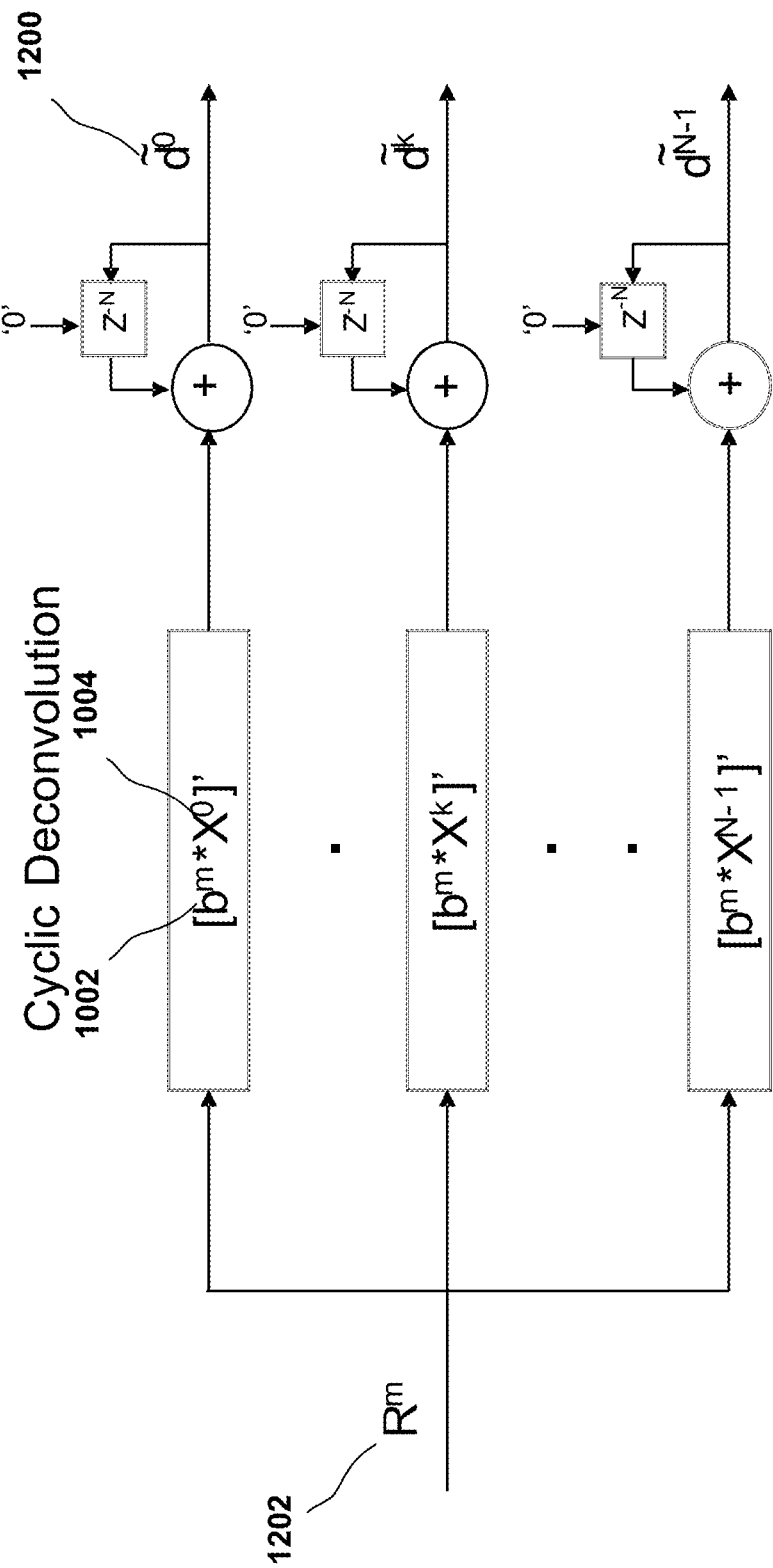
FIG. 12 shows a diagram of the cyclic deconvolution method used to deconvolve received data according to the second form of the OTFS method.

Attention is now directed to FIGS. 8, 10 and 12, to which reference will be made in describing aspects of a second form of the OTFS method. As mentioned previously, in the first OTFS method, which was described with reference to FIGS.

6 and 7, data is transmitted on a per time slice basis. In contrast, the second form of the OTFS method contemplates that data is transmitted as a series of waveforms, each of which generally subsists for a period of N time slices. More particularly, in embodiments of the second form of the OTFS method each data element within an input frame of data [D] including $N^2$ data elements is assigned a unique waveform derived from a basic waveform of duration N time slices. In one implementation this uniqueness is obtained by assigning to each data element a specific combination of a time and frequency cyclic shift of the basic waveform.

Consistent with one embodiment of the second form of the OTFS method, each element in the input frame of data [D] is multiplied by its corresponding unique waveform, thereby producing a series of $N^2$ weighted unique waveforms. Over one spreading time interval (generally composed of N time slices), all $N^2$ weighted unique waveforms corresponding to each data element in the frame of data [D] are simultaneously combined and transmitted. Further, in this embodiment a different unique basic waveform of length (or duration) of N time slices is used for each consecutive time-spreading interval. The set of N unique basic waveforms (i.e., one for each of the N time-spreading intervals) form an orthonormal basis. As may be appreciated, embodiments of the second form of the OTFS element contemplate that at least a part of [D] is transmitted within each of the N time-spreading intervals.

To receive waveforms modulated and transmitted in accordance with this second form of the OTFS method, the received signal is (over each spreading interval of N time slices), correlated with the set of all $N^2$ waveforms previously assigned to each data element during the transmission process for that specific time spreading interval. Upon performing this correlation, the receiver will produce a unique correlation score for each one of the $N^2$ data elements (the receiver will have or be provided with knowledge of the set of $N^2$ waveforms respectively assigned by the transmitter to the corresponding set of $N^2$ data elements). This process will generally be repeated over all N time-spreading intervals. The original data matrix [D] can thus be reconstructed by the receiver by, for each data element, summing the correlation scores over N time-spreading intervals. This summation of correlation scores will typically yield the $N^2$ data elements of the frame of data [D].

Turning now to FIG. 8, there are shown an exemplary set of vectors used in convolving and deconvolving data in accordance with the second form of the OTFS method. Specifically, FIG. 8 depicts a base vector 802, data vector 800, Fourier vector 804 and Transmit vector 806. In the embodiment of FIG. 8 the data vector 800 may include N elements (often one row, column, or diagonal) of an N×N [D] matrix, the base vector 802 may include N elements (often one row, column, or diagonal) of an N×N [$U_1$] matrix, the Fourier vector 804 may include N elements (often one row, column, or diagonal) of an N×N [$U_2$] matrix, which may often comprise a DFT or IDFT matrix. The transmit frame 808 is composed of N single time-spreading intervals $T^m$ 810, each of which is defined by a transmit vector 806 containing multiple (such as N) time slices. In the embodiment of FIG. 8, the transmit vector 806 provides information used by the transmitter in selecting elements of the OTFS transmission matrix for transmission during each time slice of each transmission interval.

In FIG. 8, the lines 812 are intended to indicate that each Fourier vector waveform 804 is manifested over one spreading time interval $T^m$ 810. It is observed that this is representative of a difference in wireless radio signal modulation between the second form of the OTFS method (in which each waveform exists over a time spreading interval composed of multiple (e.g. N) time slices) and the first form of the OTFS method (in which the wireless signal is essentially transmitted on a per time slice basis).

FIG. 10 illustrates aspects of a cyclic convolution method that may be used to convolve data and transmit data according to the second form of the OTFS methodology. As previously discussed, particularly in the case where [$U_1$] is composed of a cyclically permuted Legendre number of length N, the process of convolving the data and scanning the data can be understood alternatively as being a cyclic convolution of the underlying data. Here the $d^0$, $d^k$, $d^{N-1}$ can be understood as being the elements or symbols of the data vector 1000 component of the [D] matrix, the $b^m$ coefficients can be understood as representing the base vector 1002 components of the [$U_1$] matrix, and the X coefficients can be understood as representing the Fourier vector 1004 components of the [$U_2$] matrix. The combinations of the $b^m$ coefficients and the X coefficients are summed to form the transmit block $T^m$ 1010. In the illustration of FIG. 10, each such combination is represented as [$b^m * X^k$] and comprises the element-wise multiplication of the $m^{th}$ base vector with the $k^{th}$ Fourier vector.

Figure 39A:
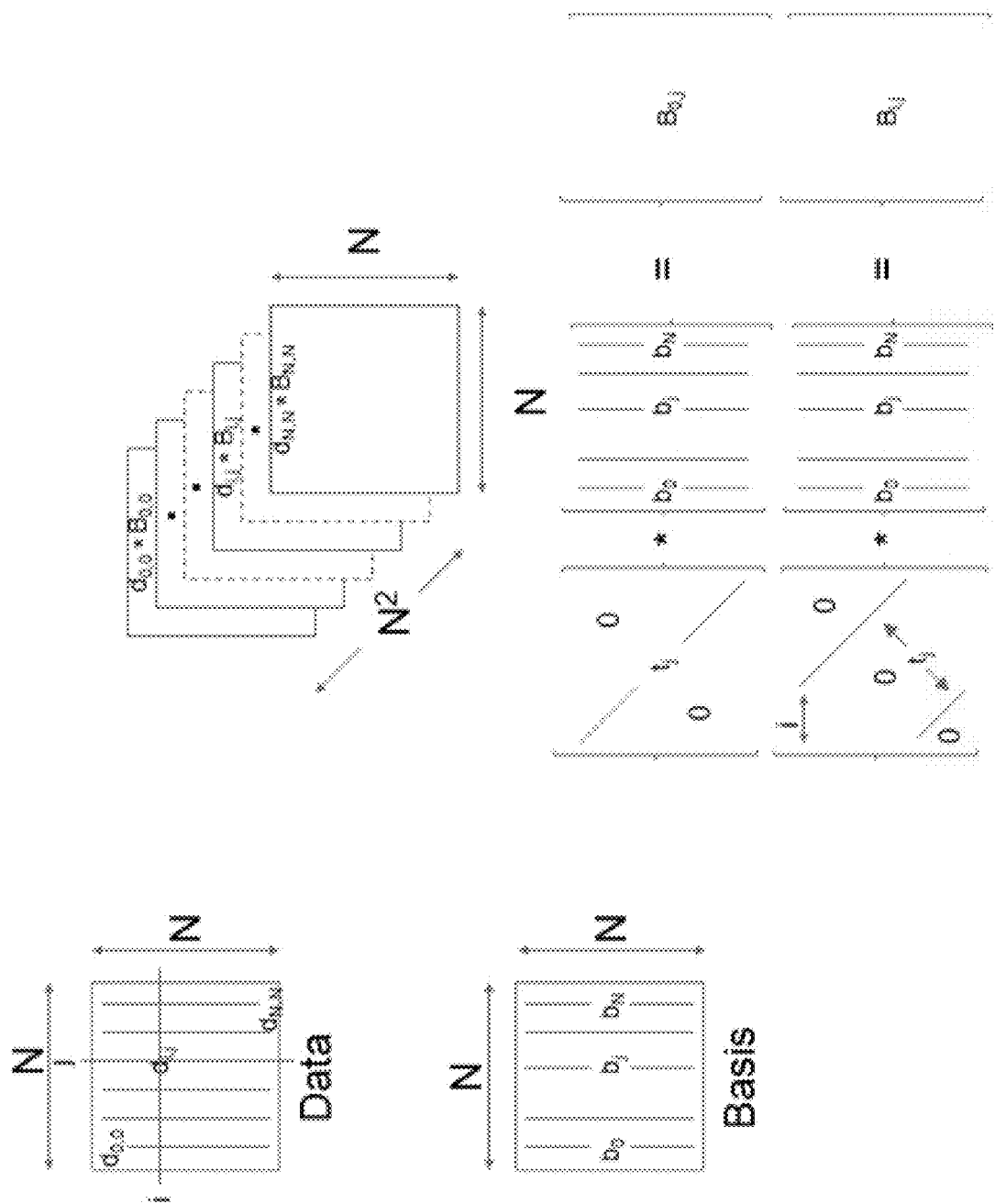
FIG. 39A is a basis matrix including N length N basis vectors $b_0$-$b_{N-1}$ used in illustrating one manner in which OTFS encoding using a pair of transform matrices or frames can spread $N^2$ data symbols $d_{ij}$ into $N^2$ different basis matrices $B_{ij}$ of basis frames $F_{ij}$.

FIGS. 39A, 39B, 39C and 39D illustrate an exemplary OTFS encoding scheme pursuant to which $N^2$ data symbols $d_{ij}$ of a data matrix are spread using a pair of transform matrices into $N^2$ different basis matrices $B_{ij}$ of basis frames $F_{ij}$. With reference to FIG. 39A, a basis matrix includes N length N basis vectors $b_0$-$b_{N-1}$. When [U1] is implemented using a DFT or IDFT matrix, the multiplication of the [D] matrix by [U1] and [U2] can be replicated by multiplying each of the basis vectors $b_0$-$b_{N-1}$ by a diagonal matrix formed by placing the N components of each DFT vector (column) along the main diagonal. The result of these multiplications is $N^2$ basis matrices. As shown in FIG. 39A, each data element $d_{ij}$ is then multiplied by one of the $N^2$ basis matrices and the resulting $N^2$ matrices $d_{ij}*B_{ij}$ are summed to yield an OTFS data matrix. This is illustrated by, for example, the cyclic convolution of FIG. 10. Thus, each data element $d_{ij}$ is spread over each element of the OTFS data matrix.

Figure 39B:
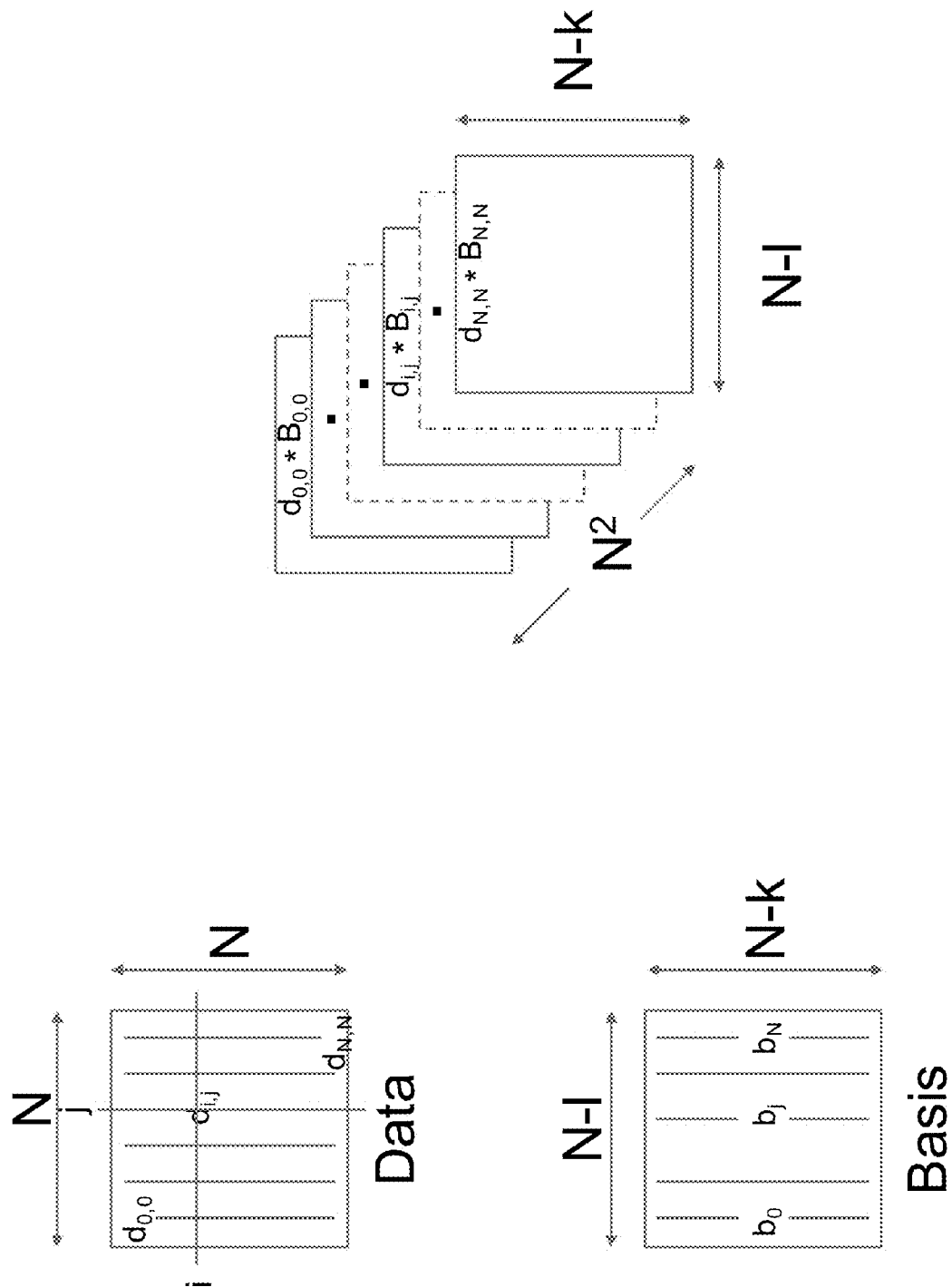
FIG. 39B illustrates an incomplete basis matrix that includes N−l columns and N−k rows where l and k are greater than or equal to one.
Figure 39C:
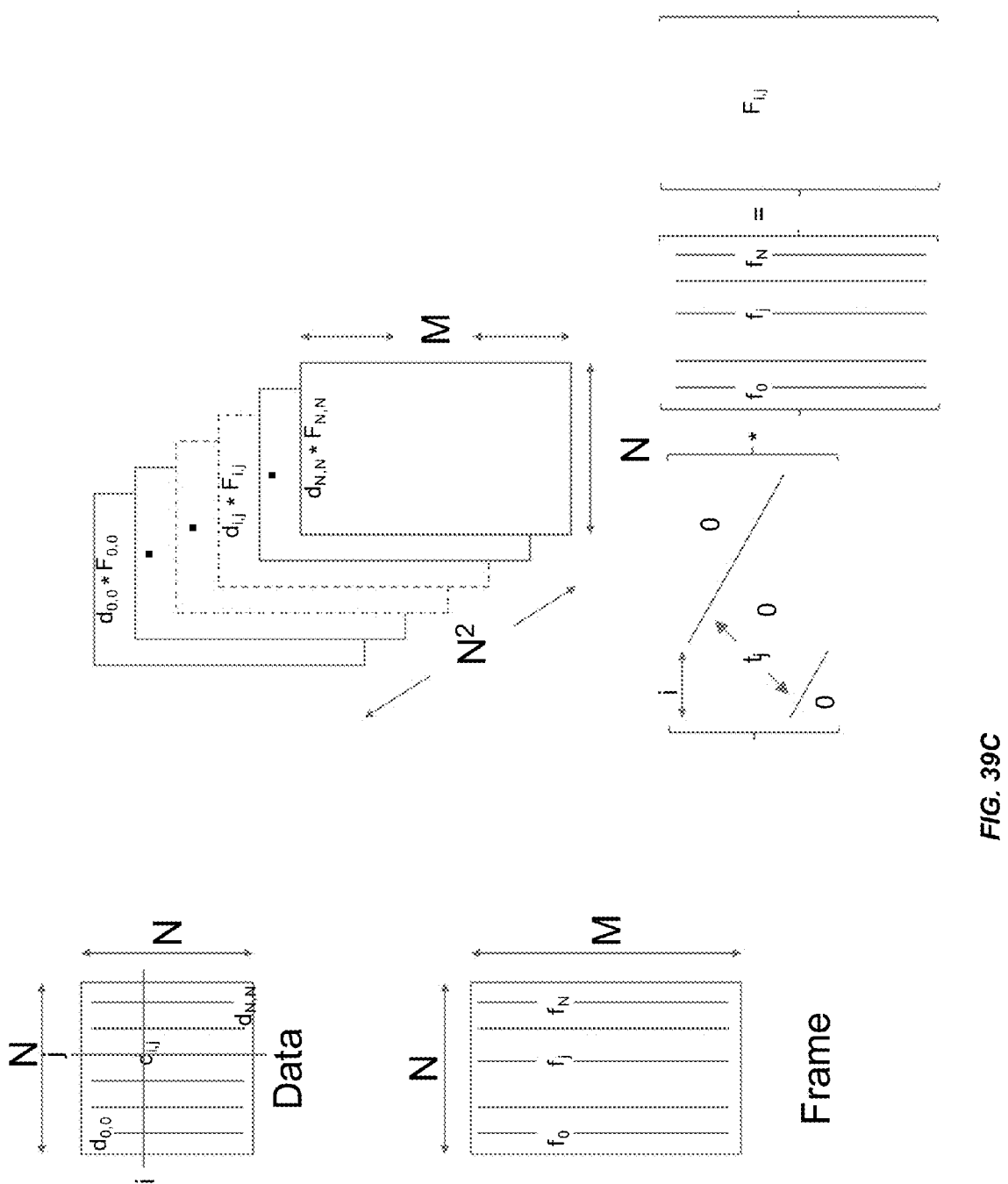
FIG. 39C illustrates a basis frame that has N vectors of length M where M is greater than N.
Figure 39D:
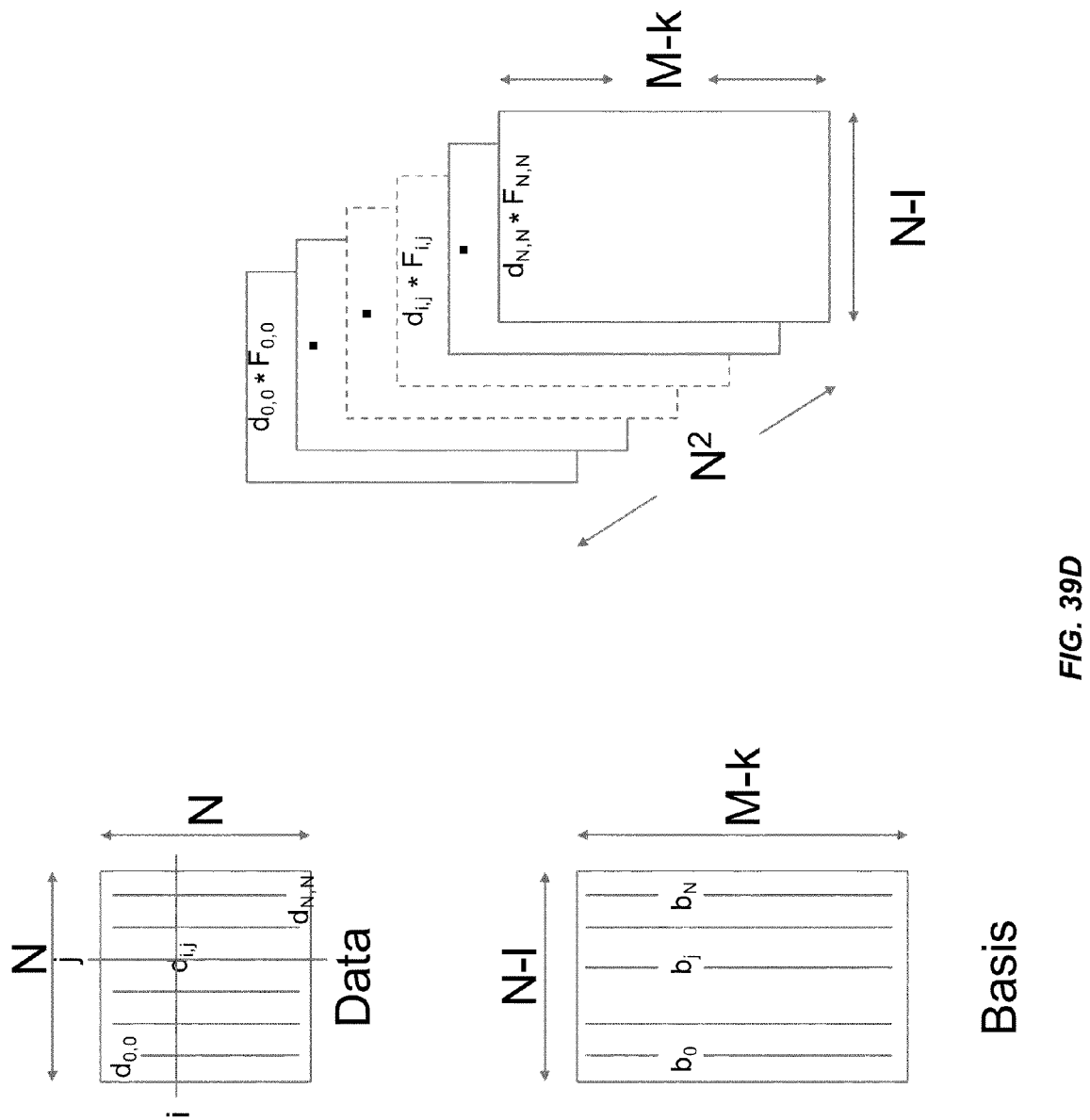
FIG. 39D illustrates an incomplete basis frame including N−l columns and M−k rows, where l and k are greater than or equal to one.

FIG. 39B illustrates an incomplete basis matrix that includes N–l columns and N–k rows where l and k are greater than or equal to one. The resulting multiplications spread only a portion of the data elements $d_{ij}$ over the entire N×N OTFS matrix. FIG. 39C illustrates a basis frame that has N vectors of length M where M is greater than N. The resulting basis frames include N×M elements. FIG. 39D illustrates an incomplete basis frame including N–l columns and M–k rows, where l and k are greater than or equal to one. The result is that fewer than all the data elements $d_{ij}$ are spread across all of the $N^2$ basis frames.

FIG. 12 shows a diagram of a cyclic deconvolution method that may be used to deconvolve received data according to the second form of the OTFS methodology. In FIG. 12, $R^m$ 1202 denotes a portion of the accumulated signal 730 received and demodulated by the OTFS receiver 455. Again, as previously discussed, particularly in the case where [U1] is composed of a cyclically permuted Legendre number of length N, then the matrix-based mathematical process of deconvolving the data and reconstructing the data can be understood alternatively as being a cyclic deconvolution of the transmitted data previously convolved in FIG. 10. Here the reconstructed components 1200 ~$d^0$, ~$d^k$, ~$d^{N-1}$ can be understood as being the reconstructed elements (symbols) of the data vector 1000 component of the [D] matrix, the $b^m$ coefficients 1002 again can be understood as representing the same base vector 1002 components of the [U1] matrix, and the X coefficients 1004 can again be understood as representing the Fourier vector

1004 components of the [U2] matrix. In addition, $[b^{m*}X^{k}]'$ may be understood as denoting the element-wise multiplication of the mirror conjugate of the $m^{th}$ base vector with the $k^{th}$ Fourier vector.

In this alternative scheme or embodiment, the OTFS method can be understood as being a method of transmitting at least one frame of data ([D]) over a communications link, comprising: creating a plurality of time-spectrum-tone or spectral-shape spreading codes operating over a plurality of time-spreading intervals, each single time-spreading interval being composed of at least one clock intervals; each time-spectrum-tone or spectral-shape spreading code comprising a function of a first time-frequency shifting, a second spectral shaping, and a time spreading code or scanning and transmission scheme.

Multiple Users

In an exemplary embodiment, OTFS modulation techniques may be employed to enable data to be sent from multiple users using multiple transmitters (here usually referred to as the multiple transmitter case) to be received by a single receiver. For example, assume multiple users "a", "b", "c", and "d", each desire to send a frame of data including N elements. Consistent with an embodiment of a multi-user OTFS transmission scheme, a conceptual N×N OTFS transmission matrix shared by multiple users may be created in the manner described below. Specifically, each given user packs their N elements of data into one column of an N×N data frame associated with such user but leaves the other columns empty (coefficients set to zero). The N×N data frame $[D_a]$ associated with, and transmitted by, a user "a" may thus be represented as:

$$[D_a] = \begin{bmatrix} a_{1,1} & 0_{1,2} & \cdots & 0_{1,n} \\ a_{2,1} & 0_{2,2} & \cdots & 0_{2,n} \\ \cdots & \cdots & \cdots & \cdots \\ a_{n,1} & 0_{n,2} & \cdots & 0_{n,n} \end{bmatrix}$$

Similarly, the N×N data frame $[D_b]$ associated with, and transmitted by, a user "b" may thus be represented as $$[D_b] = \begin{bmatrix} 0_{1,1} & b_{1,2} & \cdots & 0_{1,n} \\ 0_{2,1} & b_{2,2} & \cdots & 0_{2,n} \\ \cdots & \cdots & \cdots & \cdots \\ 0_{n,1} & b_{n,2} & \cdots & 0_{n,n} \end{bmatrix}$$

And user "n" sends and N×N data frame $[D_n]$ $$[D_n] = \begin{bmatrix} 0_{1,1} & 0_{1,2} & \cdots & n_{1,n} \\ 0_{2,1} & 0_{2,2} & \cdots & n_{2,n} \\ \cdots & \cdots & \cdots & \cdots \\ 0_{n,1} & 0_{n,2} & \cdots & m_{n,n} \end{bmatrix}$$

Thus, transmission of the data frames $[D_a]$, $[D_b]$ ... $[D_n]$ respectively by the users "a", "b" ... "n" results in transmission of the conceptual N×N OTFS transmission matrix, with each of the users being associated with one of the columns of such conceptual transmission matrix. In this way each independent user "a", "b" ... "n" transmits its N data elements during its designated slot (i.e., column) within the conceptual N×N OTFS transmission matrix, and otherwise does not transmit information. This enables signals corresponding to the data frames $[D_a]$, $[D_b]$ ... $[D_n]$ to be received at the receiver as if the conceptual N×N OTFS transmission matrix was representative of a complete data frame sent by only a single transmitter. Once so received at the receiver, the received data frames $[D_a]$, $[D_b]$ ... $[D_n]$ effectively replicate the conceptual N×N OTFS transmission matrix, which may then be deconvolved in the manner discussed above.

Figure 24:
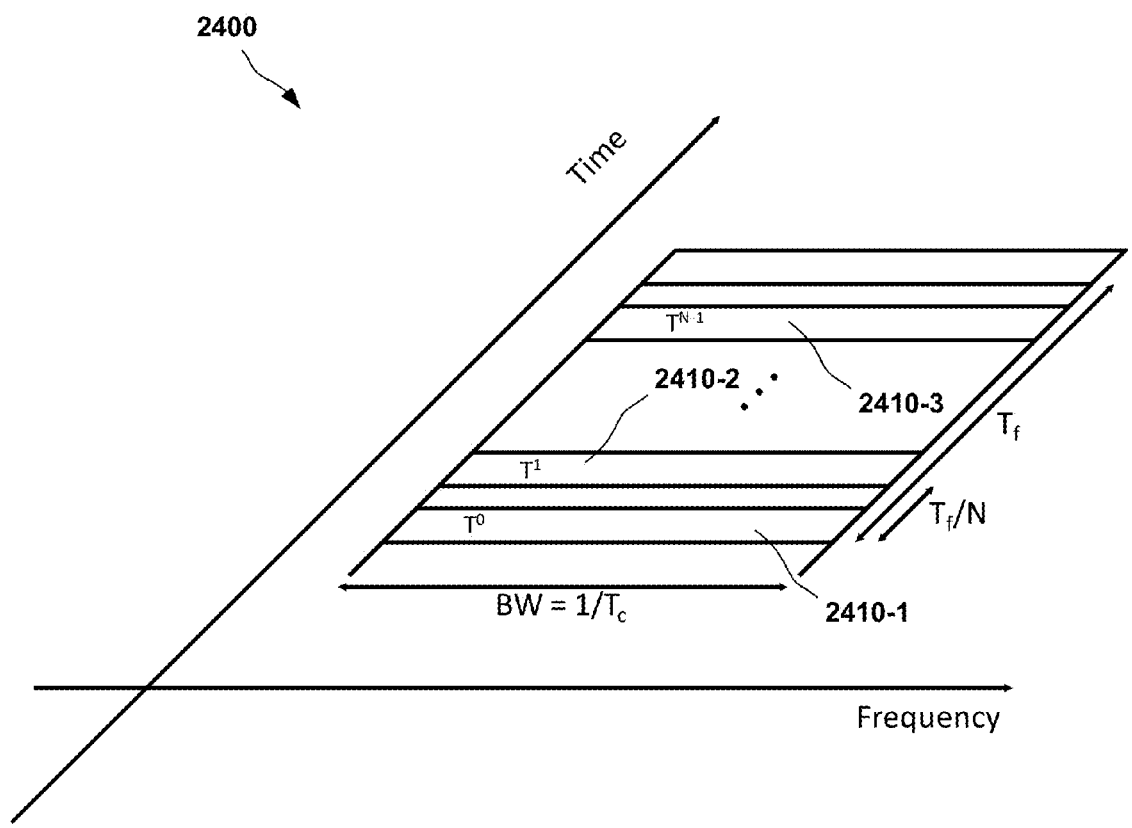
FIG. 24 illustrates a first exemplary time and frequency tiling approach that can be used in an OTFS modulation scheme.

FIG. 24 depicts a time/frequency plane 2400 which illustrates the manner in which multiple users may transmit data in designated columns of a conceptual OTFS transmission matrix consistent with the preceding example. As shown, the time/frequency plane 2400 includes a first tile $T^0$ 2410-1 representative of transmission, by a first user, of data in a first column of the conceptual OTFS transmission matrix. In the embodiment of FIG. 24 the first tile $T^0$ 2410-1 encompasses an entire bandwidth (BW) of the OTFS channel and extends for a duration of $T_f/N$, where $T_f$ denotes a total time required to transmit all of the entries within the conceptual OTFS transmission matrix. Similarly, the time/frequency plane 2400 includes a second the $T^1$ 2410-2 representative of transmission, by a second user, of data in a second column of the conceptual OTFS matrix during a second $T_f/N$ interval. In this way each of the N users are provided with a time interval of $T_f/N$ to transmit their respective N elements included within the N×N conceptual OTFS transmission matrix.

Figure 25:
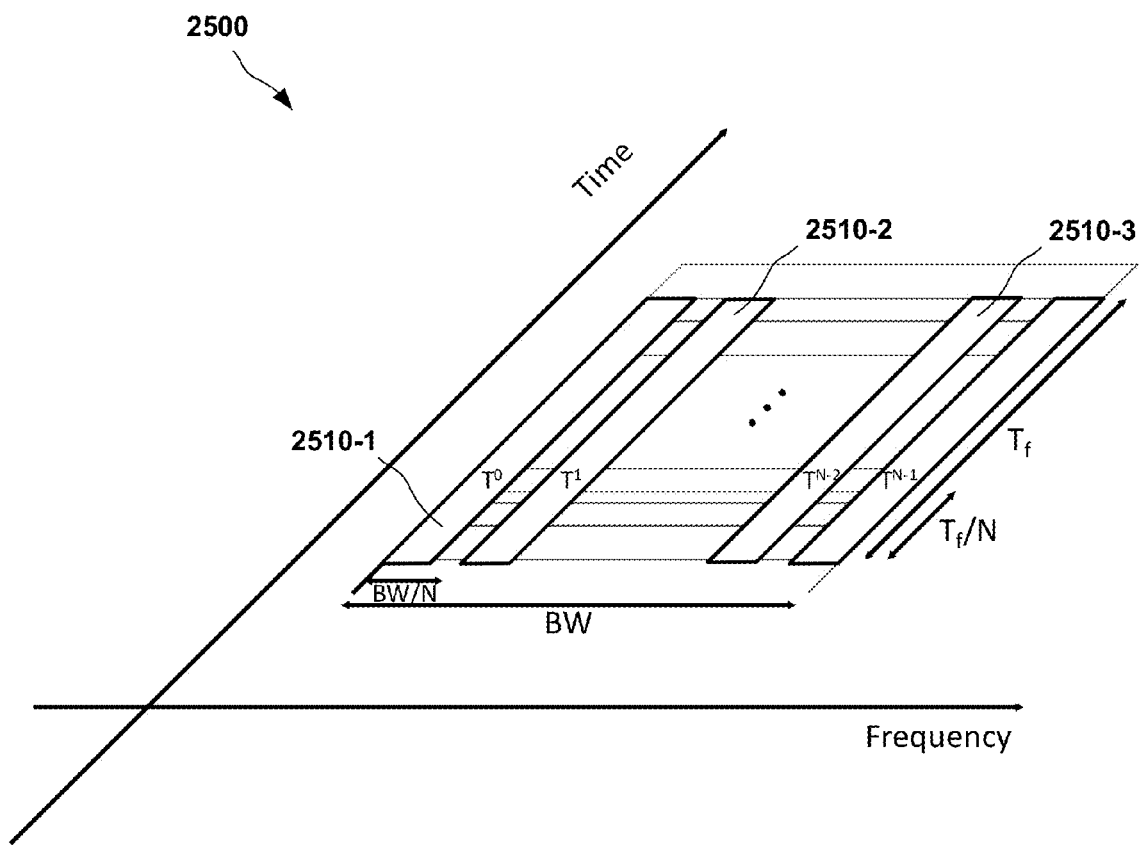
FIG. 25 illustrates a second exemplary time and frequency tiling approach that can be used in an OTFS scheme.

FIG. 25 depicts an alternative time/frequency plane 2400 which illustrates another manner in which multiple users may transmit data in designated rows of a conceptual OTFS transmission matrix consistent with the preceding example. As shown, the time/frequency plane 2500 includes a first tile $T^0$ 2510-1 representative of transmission, by a first user, of data in a first row or first set of rows of the conceptual OTFS transmission matrix. In the embodiment of FIG. 25 the first tile $T^0$ 2510-1 encompasses a first portion of the entire bandwidth (BW) of the OTFS channel corresponding to the number of first rows, and the transmission extends for an entire duration $T_f$, where $T_f$ denotes a total time required to transmit all of the entries within the conceptual OTFS transmission matrix. Similarly, the time/frequency plane 2500 includes a second tile $T^1$ 2510-2 representative of transmission, by a second user, of data in a second row or rows of the conceptual OTFS matrix encompassing a second portion of the bandwidth, and also transmitting during the entire $T_f$ time interval. In this way each of the users are provided with a portion of the bandwidth for the entire time interval of $T_f$ to transmit their respective N elements (or integer multiple of N elements) included within the N×N conceptual OTFS transmission matrix.

Figure 26:
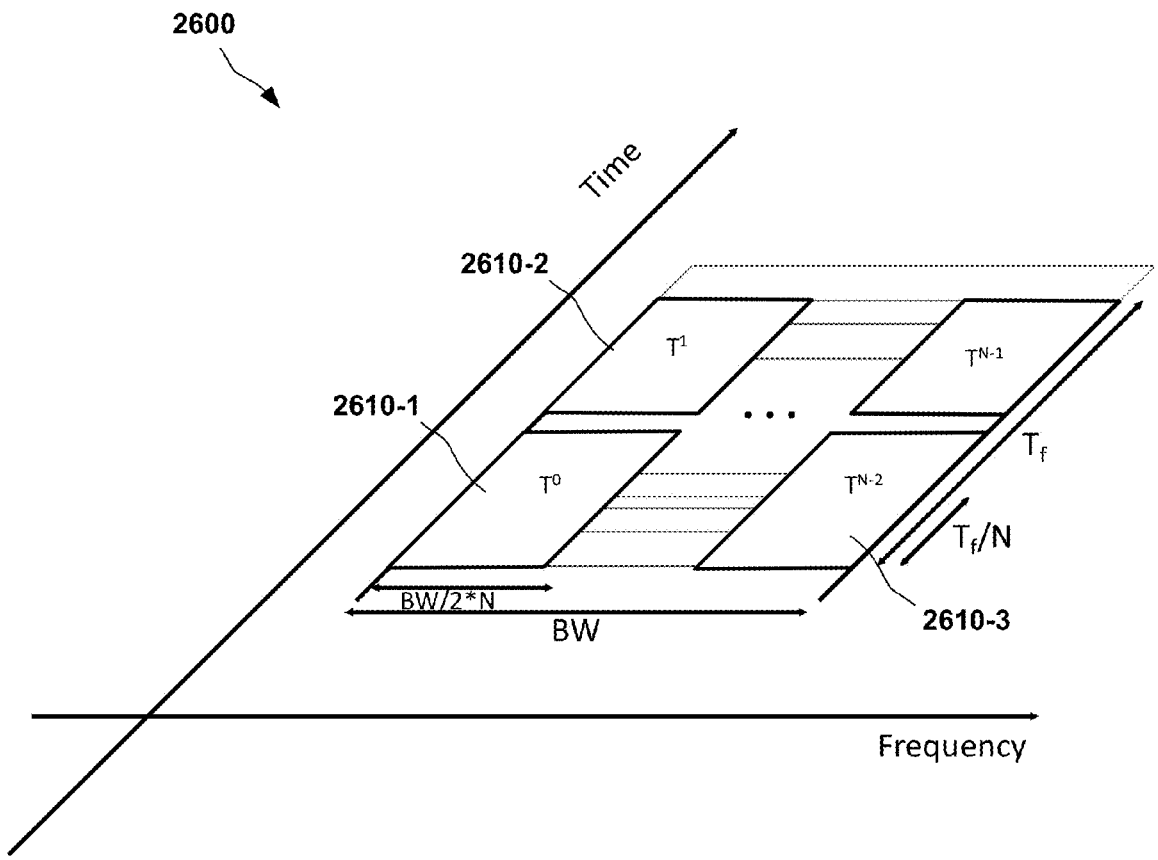

FIG. 26 depicts yet another time/frequency plane 2600 which illustrates another manner in which multiple users may transmit data in designated column/row portions of a conceptual OTFS transmission matrix consistent with the preceding example. As shown, the time/frequency plane 2600 includes a first tile $T^0$ 2610-1 representative of transmission, by a first user, of data in one or more first columns and one or more first rows of the conceptual OTFS transmission matrix. In the embodiment of FIG. 26 the first the $T^0$ 2610-1 encompasses a portion of the entire bandwidth (BW) of the OTFS channel proportional to the number of rows in the first tile 2610-1, and the transmission extends for a duration of n $T_f/N$, where $T_f$ denotes a total time required to transmit all of the entries within the conceptual OTFS transmission matrix and n≤N represents the number of rows that the first tile 2610-1 includes. Similarly, the time/frequency plane 2600 includes a second the $T^1$ 2610-2 representative of transmission, by a second user, of data in a one or more second columns and one or more second rows of the conceptual OTFS matrix during a second m $T_f/N$ interval, where m≤N represents the number of rows in the second tile 2610-2. In this way each of the users are provided with a time interval of an integer multiple of $T_f/N$ to transmit their respective elements included within the N×N conceptual OTFS transmission matrix.

The size of the tiles in FIGS. 24-26 corresponds proportionally to the amount of data provided to the corresponding user. Therefore, users with higher data rate requirements can be afforded larger portions of the [D] matrix and therefore larger tiles. In addition, users that are closer to the transmitter can be afforded larger portions of the [D] matrix while users further away may be provided smaller portions to take advantage of the efficient transmissions to close users and minimize data lost transmitting to further users.

Multiple users that are using different transmitters (or simply multiple transmitters) may communicate over the same communications link using the same protocol. Here, each user or transmitter may, for example, select only a small number of data elements in the $N^2$ sized frame of data to send or receive their respective data. As one example, a user may simply select one column of the frame of data for their purposes, and set the other columns at zero. The user's device will then compute TFS data matrices and send and receive them as usual.

As previously discussed, one advantage of the OTFS approach is increased resistance to Doppler shifts and frequency shifts. For example, in many cases the greater degree of time, frequency, and spectral shaping contemplated by the OTFS approach will largely mitigate any negative effects of such shifts due to the superior ability of OTFS-equipped devices to function over an impaired communications link. In other cases, because the local impaired device can be identified with greater accuracy, a base station or other transmitting device can either send corrective signals to the impaired device, or alternatively shut off the impaired device.

Improving Resistance to Channel Impairments

As previously discussed, one advantage of the OTFS method is increased resistance to communications channel impairments. This resistance to impairments can be improved by further selecting the first N×N time-frequency shifting matrix and the second N×N spectral shaping matrix to minimize the impact of an aberrant transmitter; specifically, a transmitter suffering from Doppler shift or frequency shift on the elements of the TFS data matrix that are adjacent to the elements of the TFS data matrix occupied by the aberrant transmitter. Alternatively, the receiver may analyze the problem, determine if an alternate set of first N×N time-frequency shifting matrices and/or said second N×N spectral shaping matrices would reduce the problem, and suggest or command that corresponding changes be made to corresponding transmitter(s).

Symbol-Based Power and Energy Considerations

The OTFS method also enables more sophisticated tradeoffs to be made between transmission distance, transmitter power, and information data rate than is possible to be made using conventional modulation techniques. This increased flexibility arises in part because each symbol is generally spread over a larger number of intervals relative to the case in which conventional techniques are employed. For example, in conventional time-division multiplexed communication systems the power per symbol transmitted must be quite high because the symbol is being transmitted over only one time interval. In conventional spread spectrum communication systems, the symbol is being transmitted over essentially N intervals, and the power per interval is correspondingly less. Because the OTFS method transmits a bit or symbol of information over $N^2$ different modalities (e.g. waveforms, times), the power per modality is much less. Among other things, this means that the effect of impulse noise, that would in general only impact a specific waveform over a specific time interval, will be less. It also means that due to increased number of signal transmission modalities (waveforms, times) enabled by the OTFS method, there are more degrees of freedom available to optimize the signal to best correspond to the particular communications link impairment situation at hand.

Overview of OTFS Equalization

Figure 27:
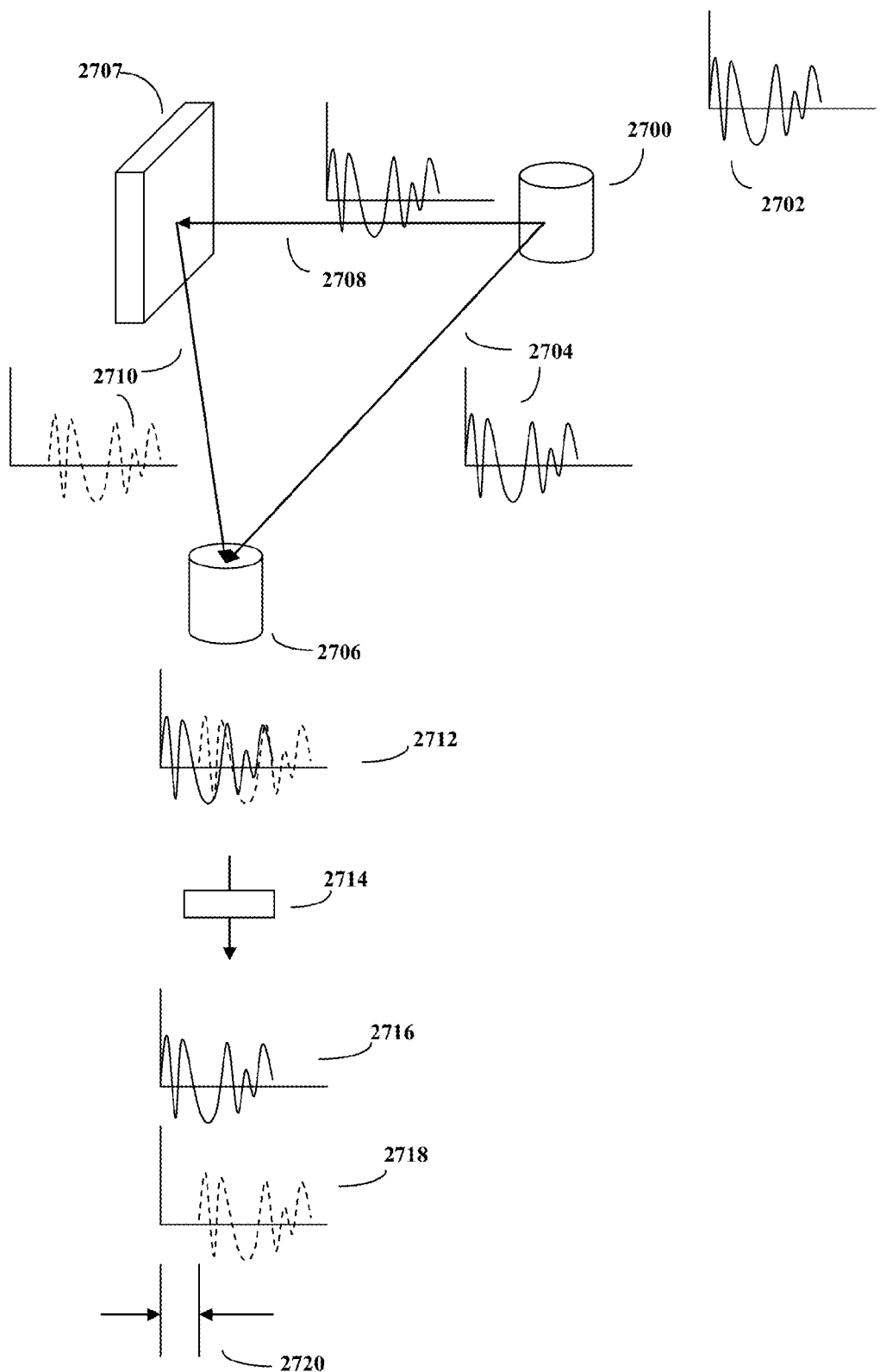
FIG. 27 illustrates the transmission of cyclically time shifted waveforms in order to enable time deconvolution of the received signal to be performed so as to compensate for various types of echo reflections.

Attention is now directed to FIGS. 27-36, to which reference will be made in describing various techniques for compensating for Doppler and frequency shift within an OTFS communication system. Turning now to FIG. 27, there is shown an exemplary process by which a receiver 2706 compensates for various types of echo reflections or other channel distortions through time deconvolution of a received signal in the manner described herein. In FIG. 27, wireless transmitter 2700 transmits a complex cyclically time shifted and cyclically frequency shifted wireless waveform 2702 in multiple directions using methods in accordance with the above description. The wireless transmitter 2700 could be realized using, for example, the OTFS transmitter 405 of FIG. 4. Some of these signals 2704 go directly to the receiver 2706. The receiver 2706 can be, for example, the OTFS receiver 455 of FIG. 4. Other signals 2708 may be reflected by a wireless reflector, such as a building 2707. These "echo" reflections 2710 travel a longer distance to reach receiver 2706, and thus end up being time delayed. As a result, receiver 2706 receives a distorted signal 2712 that is the summation of both the original signal 2704 and the echo waveforms 2710.

Since a portion of the transmitted signal 2702 is a cyclically time shifted waveform, a time deconvolution device 2714 at the receiver, such as the post-equalizer 480 of FIG. 4, analyzes the cyclically time varying patterns of the waveforms and effects appropriate compensation. In the embodiment of FIG. 27 this analysis may include a type of pattern matching or the equivalent and the decomposition of the distorted, received signal back into various time-shifted versions. These time-shifted versions may include, for example, a first time-shifted version 2716 corresponding to direct signals 2704 and a second time-shifted version 2718 corresponding to the reflected signal 2710. The time deconvolution device 2714 may also determine the time-offset 2720 necessary to cause the time delayed echo signal 2718, 2710 to match up with the original or direct signal 2716, 2704. This time offset value 2720, here called a time deconvolution parameter, may provide useful information as to the relative position of the echo location(s) relative to the transmitter 2700 and receiver 2706. This parameter may also help the system characterize some of the signal impairments that occur between the transmitter and receiver.

Figure 28:
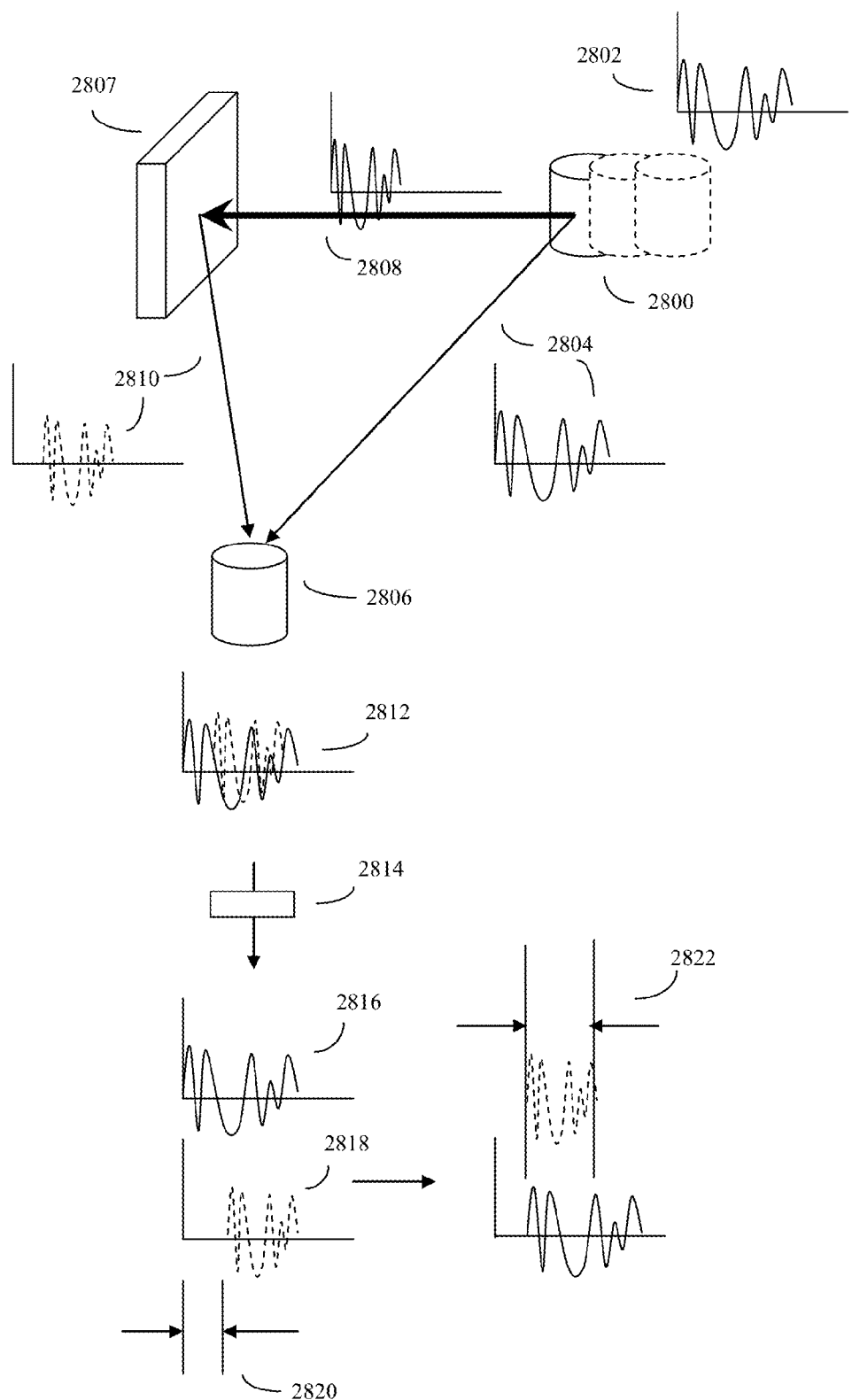
FIG. 28 illustrates the transmission of both cyclically time shifted waveforms and cyclically frequency shifted waveforms in order to enable both time and frequency deconvolution of the received signal to be performed so as to compensate for both echo reflections and frequency shifts.

FIG. 28 shows an example of how transmitting both cyclically time shifted waveforms and cyclically frequency shifted waveforms can be useful to help a receiver 2806 (such as the OTFS receiver 455) effect both time and frequency compensation of the received signal to compensate for both echo reflections and frequency shifts—in this example Doppler effect frequency shifts. In FIG. 28, a moving wireless transmitter 2800, such as the OTFS transmitter 405, is again transmitting a complex cyclically time shifted and cyclically frequency shifted wireless waveform 2802 in multiple directions. To simplify presentation, it is assumed that transmitter 2800 is moving perpendicular to receiver 2806 so that it is neither moving towards nor away from the receiver, and thus there are no Doppler frequency shifts relative to the receiver 2806. It is further assumed that the transmitter 2800 is moving towards a wireless reflector, such as a building 2807, and thus the original wireless waveform 2802 will be modified by Doppler effects, thereby shifting frequencies of the waveform 2802 towards a higher frequency (blue shifted) relative to the reflector 2807.

Thus, the direct signals 2804 impinging upon the receiver 2806 will, in this example, not be frequency shifted. However the Doppler-shifted wireless signals 2808 that bounce off of the wireless reflector, here again building 2807, will echo off in a higher frequency shifted form. These higher frequency shifted "echo" reflections 2810 also still have to travel a longer distance to reach receiver 2806, and thus also end up being time delayed as well. As a result, receiver 2806 receives a signal 2812 that is distorted due to the summation of the direct signal 2804 with the time and frequency shifted echo waveforms 2810.

However, as was described above, the OTFS techniques described herein may utilize the transmission of cyclically time shifted and frequency shifted waveforms. Accordingly, a time and frequency deconvolution device 2814 (alternatively a time and frequency adaptive equalizer such as the OTFS demodulator 460 and the OTFS post-equalizer 480 of FIG. 4) within the receiver 2806 may evaluate the cyclically time varying and frequency varying patterns of the waveforms in order to decompose such waveforms back into various time-shifted and frequency shifted versions. Included among such versions are a first version 2816 corresponding to the direct signal 2804 and a second version 2818 corresponding to the frequency shifted echo waveform 2810. In one embodiment this evaluation and decomposition may be effected using pattern matching or related techniques. At the same time, the time and frequency deconvolution device 2814 may also determine the above-referenced time deconvolution parameter and a frequency offset value 2822, which may also be referred to herein as a frequency deconvolution parameter. These parameters may provide useful information as to the relative position of the echo location(s) relative to the transmitter 2800 and the receiver 2806, and may also enable characterization of certain of the signal impairments that occur between the transmitter and receiver.

The net effect of both time and frequency deconvolutions, when applied to transmitters, receivers, and echo sources that potentially exist at different distances and velocities relative to each other, is to allow the receiver to properly interpret the impaired signal. Here, even if the energy received in the primary signal is too low to permit proper interpretation, the energy from the time and/or frequency shifted versions of the signals can be added to the primary signal upon the application of appropriate time and frequency offsets or deconvolution parameters to signal versions, thereby resulting in a less noisy and more reliable signal at the receiver. Additionally, the time and frequency deconvolution parameters can contain useful information as to the relative positions and velocities of the echo location(s) relative to the transmitter and receiver, as well as the various velocities between the transmitter and receiver, and can also help the system characterize some of the signal impairments that occur between the transmitter and receiver.

Thus, in some embodiments the OTFS systems described herein may also provide a method to provide an improved receiver where, due to either one or a combination of echo reflections and frequency offsets, multiple signals associated with such reflections and offsets result in the receiver receiving a time and/or frequency convolved composite signal representative of time and/or frequency shifted versions of the $N^2$ summation-symbol-weighted cyclically time shifted and frequency shifted waveforms. Here, the improved receiver will further time and/or frequency deconvolve the time and/or frequency convolved signal to correct for such echo reflections and the resulting time and/or frequency offsets. This will result in both time and frequency deconvolved results (i.e. signals, typically of much higher quality and lower signal to noise ratio), as well as various time and frequency deconvolution parameters that, as will be discussed, are useful for a number of other purposes.

Before going into a more detailed discussion of other applications, however, it is useful to first discuss the various waveforms in more detail.

Embodiments of the OTFS systems and methods described herein generally utilize waveforms produced by distributing a plurality of data symbols into one or more N×N symbol matrices, and using these one or more N×N symbol matrices to control the signal modulation of a transmitter. Here, for each N×N symbol matrix, the transmitter may use each data symbol to weight N waveforms, selected from an $N^2$-sized set of all permutations of N cyclically time shifted and N cyclically frequency shifted waveforms determined according to an encoding matrix U, thus producing N symbol-weighted cyclically time shifted and cyclically frequency shifted waveforms for each data symbol. This encoding matrix U is chosen to be an N×N unitary matrix that has a corresponding inverse decoding matrix $U^H$. The method will further, for each data symbol in the N×N symbol matrix, sum the N symbol-weighted cyclically time shifted and cyclically frequency shifted waveforms, producing $N^2$ summation-symbol-weighted cyclically time shifted and cyclically frequency shifted waveforms. The transmitter will transmit these $N^2$ summation-symbol-weighted cyclically time shifted and cyclically frequency shifted waveforms, structured as N composite waveforms, over any combination of N time blocks or frequency blocks.

As discussed above, various waveforms can be used to transmit and receive at least one frame of data [D] (composed of a matrix of up to $N^2$ data symbols or elements) over a communications link. Here each data symbol may be assigned a unique waveform (designated a corresponding waveform) derived from a basic waveform.

For example, the data symbols of the data matrix [D] may be spread over a range of cyclically varying time and frequency shifts by assigning each data symbol to a unique waveform (corresponding waveform) which is derived from a basic waveform of length N time slices (in embodiments described herein the set of N time slices correspond to the time required to transmit this waveform, also referred to as a time block), with a data symbol specific combination of a time and frequency cyclic shift of this basic waveform.

In one embodiment each symbol in the frame of data [D] is multiplied by its corresponding waveform, producing a series of $N^2$ weighted unique waveforms. Over one spreading time interval (or time block interval), all $N^2$ weighted unique waveforms corresponding to each data symbol in the frame of data [D] are simultaneously combined and transmitted. Further, a different unique basic waveform of length (or duration) of one time block (N time slices) may be used for each consecutive time-spreading interval (consecutive time block). Thus a different unique basic waveform corresponding to one time block may be used for each consecutive time-spreading interval, and this set of N unique waveforms generally forms an orthonormal basis. Essentially, each symbol of [D] is transmitted (in part) again and again either over all N time blocks, or alternatively over some combination of time blocks and frequency blocks (e.g. assigned frequency ranges).

To receive data over each block of time, the received signal is correlated with a corresponding set of all $N^2$ waveforms previously assigned to each data symbol by the transmitter for that specific time block. Upon performing this correlation, the receiver may produce a unique correlation score for each one of the $N^2$ data symbols. This process will be repeated over some combination of time blocks and frequency blocks until all N blocks are received. The original data matrix [D] can thus be reconstructed by the receiver by summing, for each data symbol, the correlation scores over N time blocks or frequency blocks, and this summation of the correlation scores will reproduce the $N^2$ data symbols of the frame of data [D].

Note that in some embodiments, some of these N time blocks may be transmitted non-consecutively, or alternatively some of these N time blocks may be frequency shifted to an entirely different frequency range, and transmitted in parallel with other time blocks from the original set of N time blocks in order to speed up transmission time. This is discussed later and in more detail in reference to FIG. 29.

In order to enable focus to be directed to the underlying cyclically time shifted and cyclically shifted waveforms, detailed aspects of one embodiment of the OTFS methods described above may be somewhat generalized and also discussed in simplified form. For example, the operation of selecting from an $N^2$ set of all permutations of N cyclically time shifted and N cyclically frequency shifted waveforms may correspond, at least in part, to an optional permutation operation P as well as to the other steps discussed above. Additionally, the $N^2$ set of all permutations of N cyclically time shifted and N cyclically frequency shifted waveforms may be understood, for example, to be at least partially described by a Discrete Fourier transform (DFT) matrix or an Inverse Discrete Fourier Transform matrix (IDFT). This DFT and IDFT matrix can be used by the transmitter, for example, to take a sequence of real or complex numbers and modulate them into a series of different waveforms.

Considering now a particular example, individual rows of a DFT matrix (e.g., the DFT matrix of FIG. 18) may each be used to generate a Fourier vector including set of N cyclically time-shifted and frequency-shifted waveforms. In general, the Fourier vectors may create complex sinusoidal waveforms of the type:

$$X_j^k = e^{\left(\frac{-i*2*\pi*j*k}{N}\right)}$$

where, for an N×N DFT matrix [X], $X_j^k$ is the coefficient of the Fourier vector in row k column j of the DFT matrix, and N is the number of columns. The products of this Fourier vector may be considered to represent one example of a manner in which the various time shifted and frequency shifted waveforms suitable for use in the OTFS system may be generated.

For example and as mentioned previously, FIG. 10 shows a diagram of one example of a cyclic convolution method that a transmitter can use to encode and transmit data. In FIG. 10, the sum of the various $[b^m * X^k]$ components can also be termed a "composite waveform". As a consequence, in an embodiment consistent with FIG. 10 the full [D] matrix of symbols will ultimately be transmitted as N composite waveforms.

Although previously discussed, FIG. 12 may also be understood to provide a diagram of a cyclic deconvolution method capable of being used to decode received data. More specifically, particularly in the case where $[U_1]$ is composed of a cyclically permuted Legendre number of length N, the process of deconvolving the data and reconstructing the data can be understood alternatively as being a cyclic deconvolution (cyclic decoding) of the transmitted data previously convolved (encoded) by the transmitter as described in reference to FIG. 10. In the embodiment of FIG. 12, the $\sim d^0$, $\sim d^k$, $\sim d^{N-1}$ elements represent the reconstructed symbols (symbols) of the data vector 1200 component of the [D] matrix (corresponding to the transmitted data vector 1000), the $b^m$ coefficients again represent the base vector 1002 components of the $[U_1]$ matrix, and the $X_j^k$ coefficients can again be understood as representing the Fourier vector 1004 components of the $[U_2]$ matrix. Here $(R^m)$ 1202 is a portion of the accumulated signal 1010 received and demodulated by the receiver.

As described above with reference to FIGS. 24-26, different tiling schemes for proportioning the rows (frequency offsets) and columns (time offsets) of the data matrix [D] can be utilized to provide for multiple users to transmit data over multiple time/frequency offset blocks in the same data matrix [D]. These tiling schemes can be utilized differently depending on the type(s) of motion and reflected signals and the resulting time and frequency offsets that a transmitter and receiver are experiencing. Some exemplary methods for utilizing different time/frequency blocks will now be described with reference to FIGS. 29-30.

Figure 29:
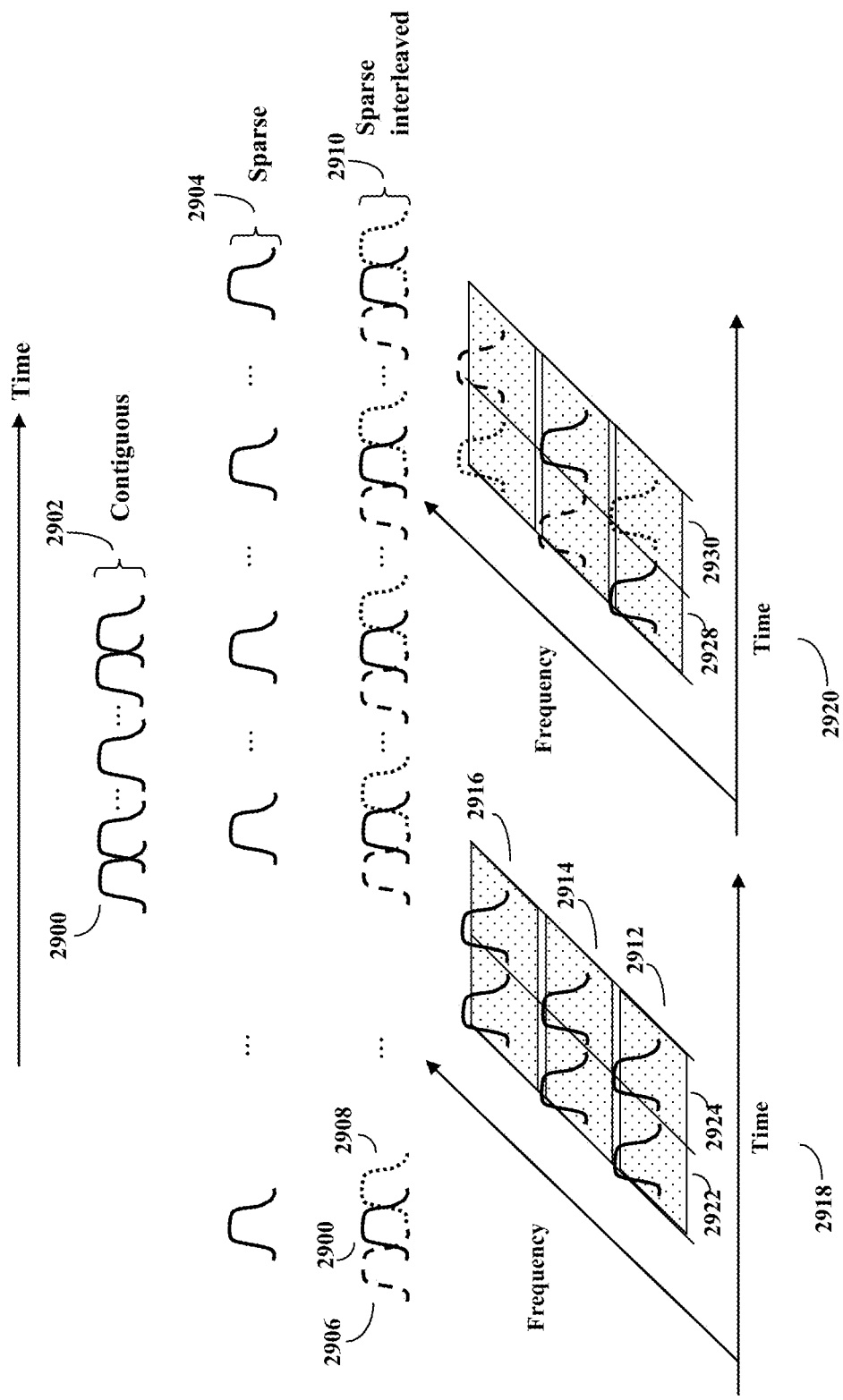
FIG. 29 illustrates the transmission of various composite waveform blocks as either a series of N consecutive time blocks associated within a single symbol matrix or, alternatively, as a time-interleaved series of blocks from different symbol matrices.

Referring now to FIG. 29, there are shown various transmitted waveform blocks 2900 can be transmitted as a series of N consecutive time blocks (i.e. no other blocks in between). These consecutive time blocks can either be a contiguous series 2902 (i.e. with minimal or no time gaps in between various waveform blocks) or they can be a sparsely contiguous series 2904 (i.e. with time gaps between the various waveform bocks, which may in some embodiments be used for synchronization, hand shaking, listening for other user's transmitters, channel assessment and other purposes. Alternatively, the various waveform time blocks can be transmitted either time-interleaved with the blocks from one or more different symbol matrices 2906, 2908 (which in some cases may be from a different transmitter) in a contiguous or sparse interleaved manner as shown in series 2910.

As yet another alternative, some of the various waveform time blocks may be frequency transposed to entirely different frequency bands or ranges 2912, 2914, 2916. This can speed up transmission time, because now multiple waveform time blocks can now be transmitted at the same time as different frequency blocks. As shown in time/frequency offset tiles 2918 and 2920, such multiple frequency band transmissions can also be done on a contiguous, sparse contiguous, contiguous interleaved, or sparse contiguous interleaved manner. Here 2922 and 2928 represent one time block at a first frequency range 2912, and 2924 and 2930 represent the next time block at the frequency range 2912. Here the various frequency ranges 2912, 2914, and 2916 can be formed, as will be described shortly, by modulating the signal according to different frequency carrier waves. Thus, for example, frequency range or band 2912 might be transmitted by modulating a 1 GHz frequency carrier wave, frequency range or band 2914 might be transmitted by modulating a 1.3 GHz frequency carrier wave, and band 2915 might be transmitted by modulating a 1.6 GHz frequency carrier wave, and so on.

Stated differently, the N composite waveforms, themselves derived from the previously discussed $N^2$ summation-symbol-weighted cyclically time shifted and cyclically frequency shifted waveforms, may be transmitted over at least N time blocks. These N time blocks may be either transmitted consecutively in time (e.g. 2902, 2904) or alternatively transmitted time-interleaved with the N time blocks from a second and different N×N symbol matrix.

Figure 30:
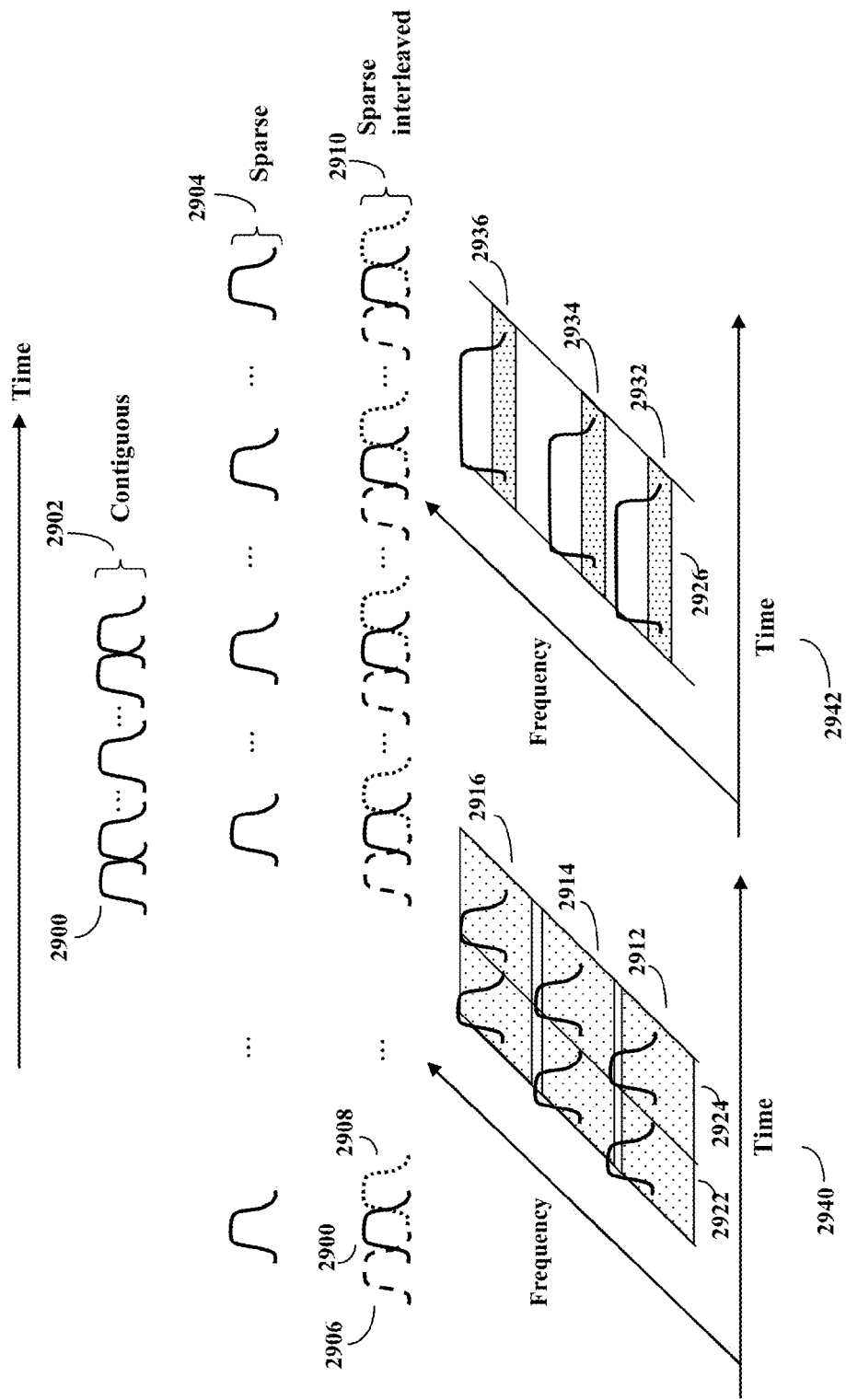
FIG. 30 illustrates the transmission of various composite waveform blocks as either shorter duration time blocks over one or more wider frequency ranges or as longer duration time blocks over one or more narrower frequency ranges.

FIG. 30 shows that the various composite waveform blocks transmitted by the transmitter can be either transmitted as shorter duration time blocks over one or more wider frequency ranges, or as longer duration time blocks over one or more narrower frequency ranges. That is, FIG. 30 shows exemplary tradeoffs between frequency bandwidth and time made available through use of embodiments of the OTFS method. Whereas in time/frequency tile 2940, the available bandwidth for each frequency range 2912, 2914, and 2916 is relatively large, in 2942, the available bandwidth for each frequency range 2932, 2934 and 2936 is considerably less. Here, the OTFS scheme can compensate for narrower frequency ranges by allowing more time per time block. Thus where as in time/frequency tile 2940, with high bandwidth available, the time blocks 2922 and 2924 can be shorter, in time/frequency tile 2942, with lower bandwidth available, the time blocks 2926 for transmitting the composite waveform is longer.

For both FIGS. 29 and 30 then, if there is only one fundamental carrier frequency, then all N blocks are transmitted consecutively in time as N time blocks. If there are less than N multiple fundamental carrier frequencies available, then all N blocks can be transmitted as some combination of N time blocks and N frequency blocks. If there are N or more fundamental frequencies available, then all N blocks can be transmitted over the duration of 1 time block as N frequency blocks.

Attention is now again directed to FIG. 21, to which reference will be made in describing an exemplary pre-equalization scheme. As was described previously, the transmitter 2100 is configured to transmit a series of N consecutive waveform time blocks where each time block encompasses a set of N time slices. During every successive time slice, one element from the OTFS matrix 2108 can be used to control the modulation circuit 2104. As was also previously discussed, the modulation scheme may be one in which the element will be separated into its real and imaginary components, chopped and filtered, and then used to control the operation of a sin and cosine generator, producing a composite analog waveform 2120. The net, effect, by the time that the entire original N×N data symbol matrix [D] is transmitted, is to transmit the data in the form of $N^2$ summation-symbol-weighted cyclically time shifted and cyclically frequency shifted waveforms, structured as N composite waveforms.

In some embodiments the transmitter 2100 may further implement a pre-equalization operation, typically performed by the pre-equalizer 410 of FIG. 4, which involves processing the [D] matrix prior to providing it to the analog modulation circuit 2102. When this pre-equalization operation is performed, the transmitter 2100 outputs pre-equalized OTFS signals 2130; otherwise, the transmitter simply outputs the OTFS signals 2120. The pre-equalization operation may be performed when, for example, the receiver in communication with the transmitter 2100 detects that an OTFS signal 2120 has been subjected to specific echo reflections and/or frequency shifts. Upon so detecting such echo reflections and/or frequency shifts, the receiver may transmit corrective information to the transmitter pertinent to such reflections and shifts. The pre-equalizer 410 may then shape subsequently-transmitted pre-equalized OTFS signals so as to compensate for these echo reflections and/or frequency shift. Thus, for example, if the receiver detects an echo delay, the pre-equalizer 410 may send the signal with an anti-echo cancellation waveform. Similarly, if the receiver detects a frequency shift, the pre-equalizer 410 can introduce a compensatory reverse frequency shift into the transmitted pre-equalization signal 2130.

Figure 31:
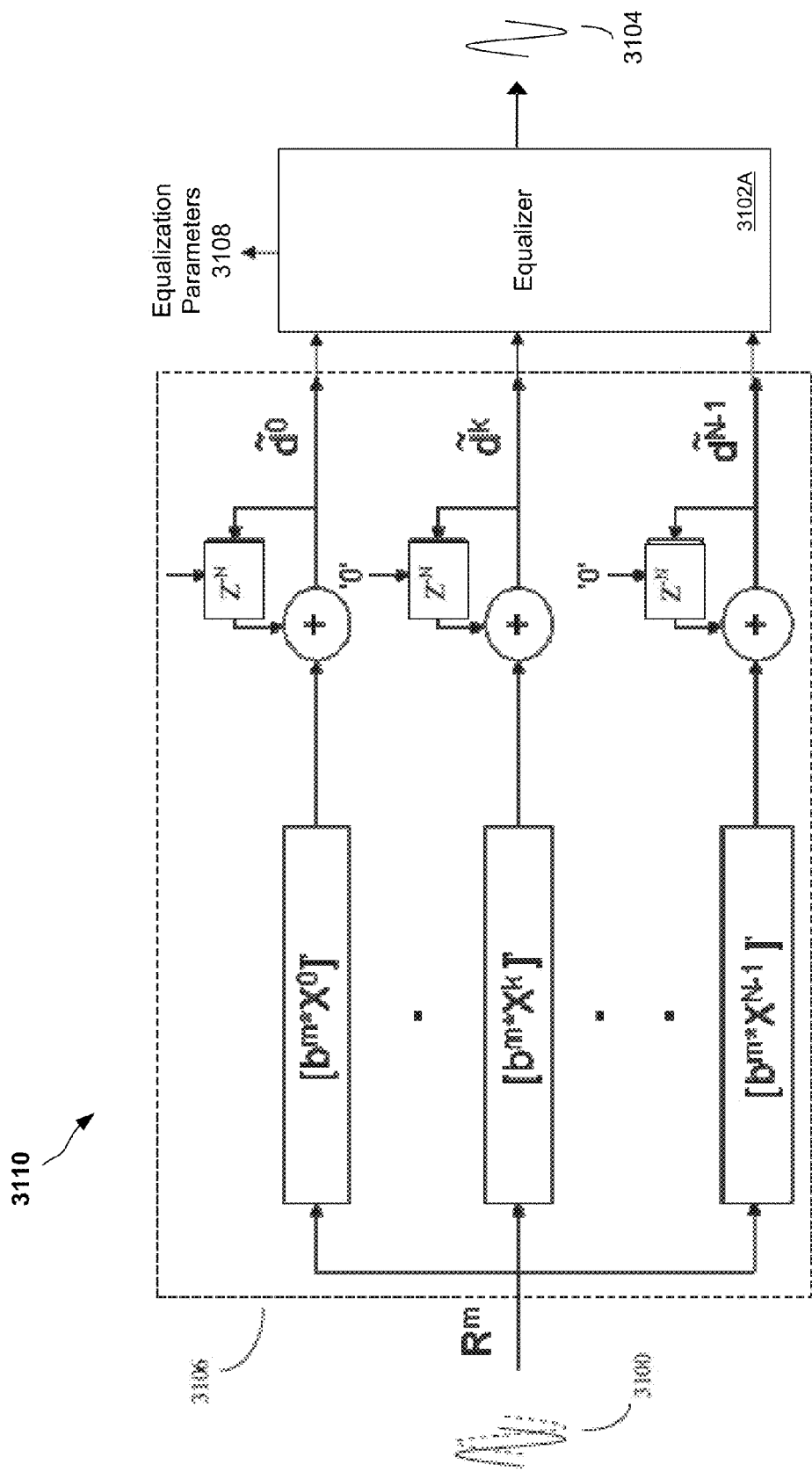
FIG. 31 shows a high-level representation of a receiver processing section configured to mathematically compensate for the effects of echo reflections and frequency shifts using an equalizer.

FIG. 31 illustrates exemplary receiver processing section 3110 operative to compensate for the effects of echo reflections and frequency shifts. Referring to FIG. 31, the receiver processing section 3110 includes a cyclic deconvolution processing block 3106 and an equalizer 3102. The equalizer 3102 performs a series of math operations and outputs equalization parameters 3108 that can also give information pertaining to the extent to which the echo reflections and frequency shifts distorted the underlying signal. The equalizer 3102A can be, for example, an adaptive equalizer.

In FIG. 31, it is assumed that the composite transmitted waveform has, since transmission, been distorted by various echo reflections and/or frequency shifts as previously shown in FIGS. 27 and 28. This produces a distorted waveform 3100, which for simplicity is represented through a simple echo reflection delayed distortion. In FIG. 31, equalizer 3102 is configured to reduce or substantially eliminate such distortion by analyzing the distorted waveform 3100 and, assisted by the knowledge that the original composite waveform was made up of N cyclically time shifted and N cyclically frequency shifted waveforms, determine what sort of time offsets and frequency offsets will best deconvolve distorted waveform 3100 back into a close representation of the original waveform, which is represented in FIG. 31 as deconvolved waveform 3104. The equalization operations performed by equalizer 3102 may alternately be carried out by the cyclic deconvolution device 3106.

In one embodiment the equalizer 3102 produces a set of equalization parameters 3108 during the process of equalizing the distorted waveform. For example, in the simple case where the original waveform was distorted by only a single echo reflection offset by time $t_{offset}$, and by the time the original waveform and the $t_{offset}$ echo waveform reach the receiver, the resulting distorted signal 3100 may be, for example, about 90% original waveform and 10% $t_{offset}$ echo waveform, then the equalization parameters 3108 can output both the 90% original and 10% echo signal mix, as well as the $t_{offset}$ value. Typically, of course, the actual distorted signal 3100 could consist of a number of various time and frequency offset components, and here again, in addition to cleaning this distortion, the equalizer 3102 can also report the various time offsets, frequency offsets, and percentage mix of the various components of signal 3100 to the transmitter and/or the receiver.

As previously discussed in FIGS. 29 and 30, the various composite waveforms in the N time blocks can be transmitted in various ways. In addition to time consecutive transmission, i.e. a first block, followed (often by a time gap which may optionally be used for handshaking or other control signals) by a second time block and then a third time block, the various blocks of composite waveforms can be transmitted by other schemes.

In some embodiments, for example in network systems where there may be multiple transmitters and potentially also multiple receivers, it may be useful to transmit the data from the various transmitters using more than one encoding method. Here, for example, a first set of N time blocks may transmit data symbols originating from a first N×N symbol matrix from a first transmitter using a first unitary matrix [$U_1$]. A second set of N time blocks may transmit data symbols originating from a second N×N symbol matrix from a second transmitter using a second unitary matrix [$U_2$]. Depending on the embodiment, [$U_1$] and [$U_2$] may be identical or different. Because the signals originating from the first transmitter may encounter different impairments (e.g. different echo reflections, different frequency shifts), some schemes of cyclically time shifted and cyclically frequency shifted waveforms may operate better than others. Thus, these waveforms, as well as the unitary matrices [$U_1$] and [$U_2$], may be selected based on the characteristics of these particular echo reflections, frequency offsets, and other signal impairments of the system and environment of the first transmitter, the second transmitter and/or the receiver.

As an example, a receiver configured to implement equalization in accordance with FIG. 31 may, based upon the equalization parameters 3108 which it derives, elect to propose an alternative set of cyclically time shifted and cyclically frequency shifted waveforms intended to provide superior operation in view of the current environment and conditions experienced by such receiver. In this case the receiver could transmit this proposal (or command) to the corresponding transmitter(s). This type of "handshaking" can be done using any type of signal transmission and encoding scheme desired. Thus in a multiple transmitter and receiver environment, each transmitter may attempt to optimize its signal so that its intended receiver is best able to cope with the impairments unique to communication between the transmitter and receiver over the communications channel therebetween.

In some cases, before transmitting large amounts of data, or any time as desired, a given transmitter and receiver may choose to more directly test the various echo reflections, frequency shifts, and other impairments of the transmitter and receiver's system and environment. This can be done, by, for example having the transmitter send a test signal where the plurality of data symbols are selected to be test symbols known to the receiver (e.g., the receiver may have stored a record of these particular test symbols). Since in this case the receiver will be aware of exactly what sort of signal it should receive in the absence of any impairment, the equalizer 3102 will generally be able to provide even more accurate time and frequency equalization parameters 3108 for use by the receiver relative to the case in which the receiver lacks such awareness. Thus, in this case the equalization parameters provide even more accurate information relating to the characteristics of the echo reflections, frequency offsets, and other signal impairments of the system and environment of the applicable transmitter(s) and the receiver. This more accurate information may be used by the receiver to suggest or command that the applicable transmitter(s) shift to use of communications schemes (e.g., to U matrices) more suitable to the present situation.

In some embodiments, when the transmitter is a wireless transmitter and the receiver is a wireless receiver, and the frequency offsets are caused by Doppler effects, the more accurate determination of the deconvolution parameters, i.e. the characteristics of the echo reflections and frequency offsets, can be used to determine the location and velocity of at least one object in the environment of the transmitter and receiver.

Examples of OTFS Equalization Techniques

This section includes a description of a number of exemplary OTFS equalization techniques capable of being implemented consistent with the general OTFS equalization approach and apparatus discussed above. However, prior to describing such exemplary techniques, a summary of aspects of transmission and reception of OTFS-modulated signals is given in order to provide an appropriate context for discussion of these OTFS equalization techniques.

Turning now to such a summary of OTFS signal transmission and reception, consider the case in which a microprocessor-controlled transmitter packages a series of different symbols "d" (e.g. $d_1, d_2, d_3 \ldots$) for transmission by repackaging or distributing the symbols into various elements of various N×N matrices [D]. In one implementation such distribution may, for example, include assigning $d_1$ to the first row and first column of the [D] matrix (e.g. $d_1 = d_{0,0}$), $d_2$ to the first row, second column of the [D] matrix (e.g. $d_2 = d_{0,1}$) and so on until all N×N symbols of the [D] matrix are full. Here, if the transmitter runs out of "d" symbols to transmit, the remaining [D] matrix elements can be set to be 0 or other value indicative of a null entry.

The various primary waveforms used as the primary basis for transmitting data, which here will be called "tones" to show that these waveforms have a characteristic sinusoid shape, can be described by an N×N Inverse Discrete Fourier Transform (IDFT) matrix [W], where for each element w in [W], $$w_{j,k} = e^{\frac{i2\pi jk}{N}}$$

or alternatively $w_{j,k} = e^{ij\Theta_k}$ or $w_{j,k} = [e^{i\Theta_k}]^j$. Thus the individual data elements d in [D] are transformed and distributed as a combination of various fundamental tones w by a matrix multiplication operation [W]*[D], producing a tone transformed and distributed form of the data matrix, here described by the N×N matrix [A], where [A]=[W]*[D].

To produce N cyclically time shifted and N cyclically frequency shifted waveforms, the tone transformed and distributed data matrix [A] is then itself further permuted by modular arithmetic or "clock" arithmetic, thereby creating an N×N matrix [B], including each element b of [B], $b_{i,j} = a_{i,(i+j) \bmod N}$. This can alternatively be expressed as [B]=Permute([A])=P (IDFT*[D]). Thus the clock arithmetic controls the pattern of cyclic time and frequency shifts.

The previously described unitary matrix [U] can then be used to operate on [B], producing an N×N transmit matrix [T], where [T]=[U]*[B], thus producing an $N^2$ sized set of all permutations of N cyclically time shifted and N cyclically frequency shifted waveforms determined according to an encoding matrix [U].

Put alternatively, the N×N transmit matrix [T]=[U]*P (IDFT*[D]).

Then, typically on a per column basis, each individual column of N is used to further modulate a frequency carrier wave (e.g. if transmitting in a range of frequencies around 1 GHz, the carrier wave will be set at 1 GHz). In this case each N-element column of the N×N matrix [T] produces N symbol-weighted cyclically time shifted and cyclically frequency shifted waveforms for each data symbol. Effectively then, the transmitter is transmitting the sum of the N symbol-weighted cyclically time shifted and cyclically frequency shifted waveforms from one column of [T] at a time as, for example, a composite waveform over a time block of data. Alternatively, the transmitter could instead use a different frequency carrier wave for the different columns of [T], and thus for example transmit one column of [T] over one frequency carrier wave, and simultaneously transmit a different column of [T] over a different frequency carrier wave, thus transmitting more data at the same time, although of course using more bandwidth to do so. This alternative method of using different frequency carrier waves to transmit more than one column of [T] at the same time will be referred to as frequency blocks, where each frequency carrier wave is considered its own frequency block.

Thus, since the N×N matrix [T] has N columns, the transmitter will transmit the $N^2$ summation-symbol-weighted cyclically time shifted and cyclically frequency shifted waveforms, structured as N composite waveforms, over any combination of N time blocks or frequency blocks, as previously shown in FIGS. 29 and 30.

On the receiver side, the transmit process is essentially reversed. Here, for example, a microprocessor controlled receiver would of course receive the various columns [T] (e.g., receive the N composite waveforms, also known as the N symbol-weighted cyclically time shifted and cyclically frequency shifted waveforms) over various time blocks or frequency blocks as desired for that particular application. In cases in which sufficient bandwidth is available and time is of the essence, the transmitter may transmit the data as multiple frequency blocks over multiple frequency carrier waves. On the other hand, if available bandwidth is more limited, and/or time (latency) is less critical, then the transmit will transmit and the receiver will receive over multiple time blocks instead.

During operation the receiver may effectively tune into the one or more frequency carrier waves, and over the number of time and frequency blocks set for the particular application, eventually receive the data or coefficients from the original N×N transmitted matrix [T] as an N×N receive matrix [R]. In the general case [R] will be similar to [T], but may not be identical due to the existence of various impairments between the transmitter and receiver.

The microprocessor controlled receiver then reverses the transmit process as a series of steps that mimic, in reverse, the original transmission process. The N×N receive matrix [R] is first decoded by inverse decoding matrix $[U^H]$, producing an approximate version of the original permutation matrix [B], here called $[B^R]$, where $[B^R]=([U^H]*[R])$.

The receiver then does an inverse clock operation to back out the data from the cyclically time shifted and cyclically frequency shifted waveforms (or tones) by doing an inverse modular mathematics or inverse clock arithmetic operation on the elements of the N×N $[B^R]$ matrix, producing, for each element $b^R$ of the N×N $[B^R]$ matrix, $a_{i,j}{}^R = b_{i,(j-i) \bmod N}{}^R$. This produces a de-cyclically time shifted and de-cyclically frequency shifted version of the tone transformed and distributed form of the data matrix [A], which may hereinafter be referred to as $[A^R]$. Put alternatively, $[A^R]=$Inverse Permute $([B^R])$, or $[A^R]=P^{-1}([U^H]*[R])$.

The receiver then further extracts at least an approximation of the original data symbols d from the $[A^R]$ matrix by analyzing the [A] matrix using an N×N Discrete Fourier Transform matrix DFT of the original Inverse Fourier Transform matrix (IDFT).

Here, for each received symbol $d^R$, the $d^R$ are elements of the N×N received data matrix $[D^R]$ where $[D^R]=DFT*A^R$, or alternatively $[D^R]=DFT*P^{-1}([U^H]*[R])$.

Thus the original $N^2$ summation-symbol-weighted cyclically time shifted and cyclically frequency shifted waveforms are subsequently received by a receiver which is controlled by the corresponding decoding matrix $U^H$ (also represented as $[U^H]$) The processor of the receiver uses this decoding matrix $[U^H]$ to reconstruct the various transmitted symbols "d" in the one or more originally transmitted N×N symbol matrices [D] (or at least an approximation of these transmitted symbols).

Turning now to a discussion of various exemplary OTFS equalization techniques, there exist at least several general approaches capable of being used correct for distortions caused by the signal impairment effects of echo reflections and frequency shifts. One approach leverages the fact that the cyclically time shifted and cyclically frequency shifted waveforms or "tones" form a predictable time-frequency pattern. In this scheme a deconvolution device situated at the receiver's front end may be straightforwardly configured to recognize these patterns, as well as the echo-reflected and frequency shifted versions of these patterns, and perform the appropriate deconvolutions by a pattern recognition process. Alternatively the distortions may be mathematically corrected using software routines, executed by the receiver's processor, designed to essentially determine the various echo reflected and frequency shifting effects, and solve for these effects. As a third alternative, once, by either process, the receiver determines the time and frequency equalization parameters of the communication media's particular time and frequency distortions, the receiver may transmit a command to the transmitter to instruct the transmitter to essentially pre-compensate or pre-encode, e.g., by using a pre-equalizer such as the pre-equalizer 410 of FIG. 4, for these effects. That is, if for example the receiver detects an echo, the transmitter can be instructed to transmit in a manner that offsets this echo, and so on.

Figure 32A:
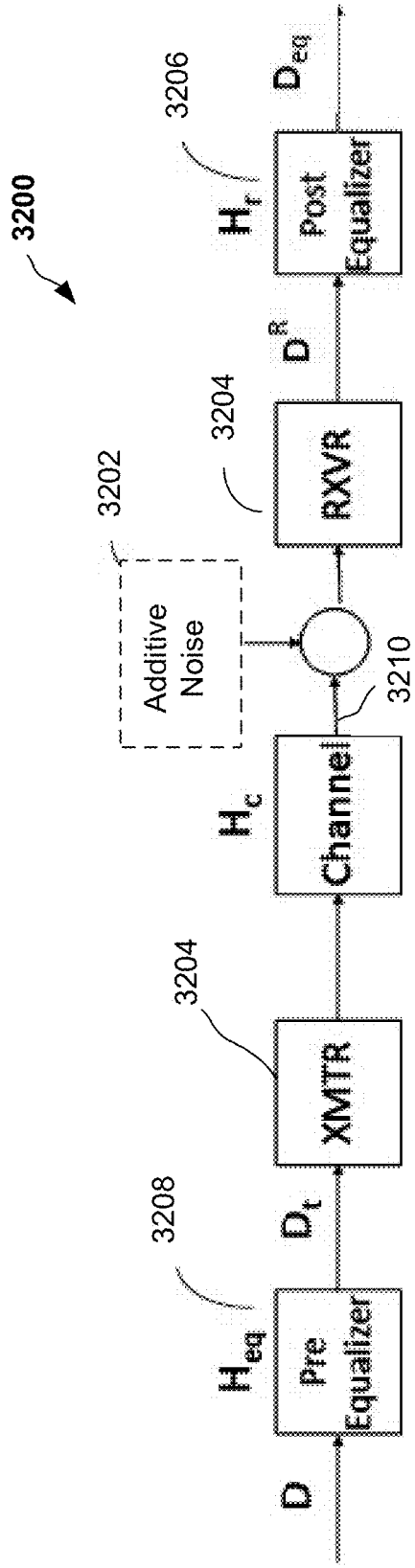
FIG. 32A shows an example of a communications channel in which echo reflections and frequency shifts can blur or impair or distort a transmitted signal.

FIG. 32A illustrates an exemplary system in which echo reflections and frequency shifts (e.g., Doppler shifts caused by motion) of a channel $H_c$ can blur or be distorted by additive noise 3202. The time and frequency distortions can be modeled as a 2-dimensional filter $H_c$ acting on the data array. This filter $H_c$ represents, for example, the presence of multiple echoes with time delays and Doppler shifts. To reduce these distortions, the signal can be pre-equalized, e.g., using the pre-equalizer 3208, before the signal 3200 is transmitted over the channel to the receiver and subsequently post-equalized, using the post-equalizer 3206, after the $D^R$ matrix has been recovered at 3206. This equalization process may be performed by, for example, using digital processing techniques. The equalized form of the received D matrix, which ideally will completely reproduce the original D matrix, may be referred to hereinafter as $D_{eq}$.

Figure 32C:
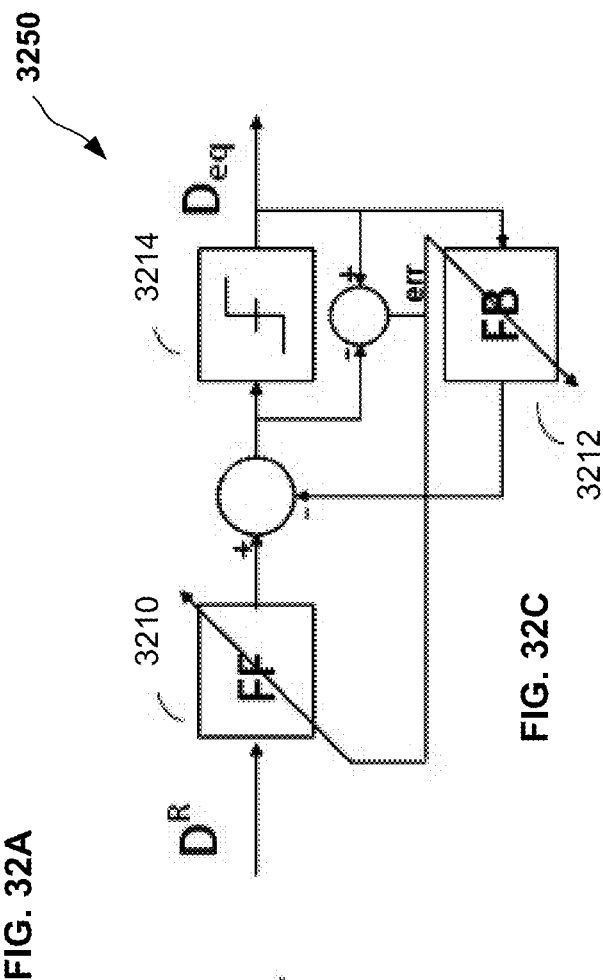
FIG. 32C shows an example of an adaptive decision feedback equalizer that may be used to correct for distortions.
Figure 32B:
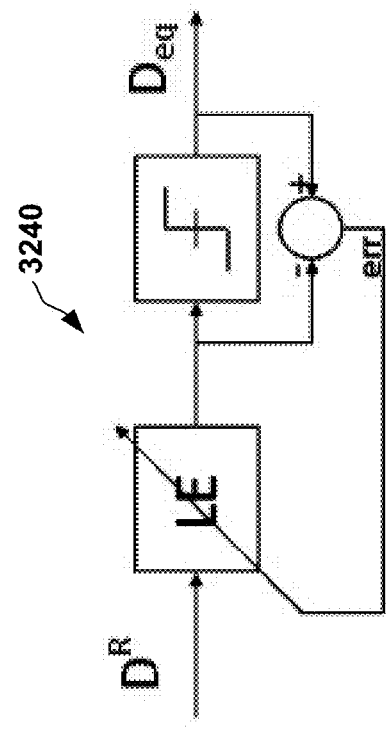
FIG. 32B shows an example of an adaptive linear equalizer that may be used to correct for distortions.

FIG. 32B shows an example of an adaptive linear equalizer 3240 that may be used to implement the post-equalizer 3206 in order to correct for such distortions. The adaptive linear equalizer 3240, which may also be used as the equalizer 3102, may operate according to the function:

$$Y(k) = \sum_{L=Lc}^{Rc} C(l) * X(k-l) + \eta(k)$$

Mathematical Underpinnings of Two Dimensional Equalization

An exemplary equalization mechanism associated with the OTFS modulation, which is inherently two dimensional, is discussed below. This is in contrast to its one dimensional counterpart in conventional modulation schemes such as, for example, OFDM and TDMA.

Assume that the input symbol stream provided to an OTFS transmitter is a digital function $X \in \mathbb{C}(R_d \times R_d)$ with values in specific finite constellation $C \subset \mathbb{C}$ (either QPSK or higher QAM's, for example). This transmitter modulates this input stream into an analog signal $\Phi^{Tx,Pass}$, which is then transmitted. During the transmission $\Phi^{Tx,Pass}$ undergo a multipath channel distortion. The distorted passband signal $\Phi^{Tx,Pass}$ arrives at the OTFS receiver and is demodulated back into a digital function $Y \in \mathbb{C}(R_d \times R_d)$, which may be referred to herein as the output stream. The locality properties of OTFS modulation imply that the net effect of the multipath channel distortion is given by a cyclic two dimensional convolution with a two dimensional channel impulse response. See FIGS. 53 and 54.

Figure 53:
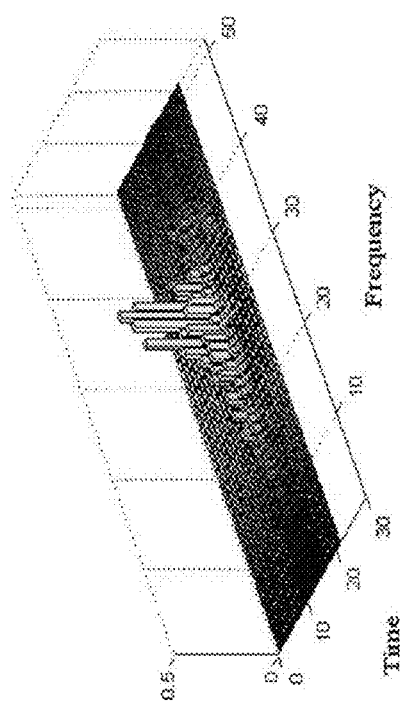
FIG. 53 provides an illustration of a two-dimensional channel impulse.
Figure 54A:
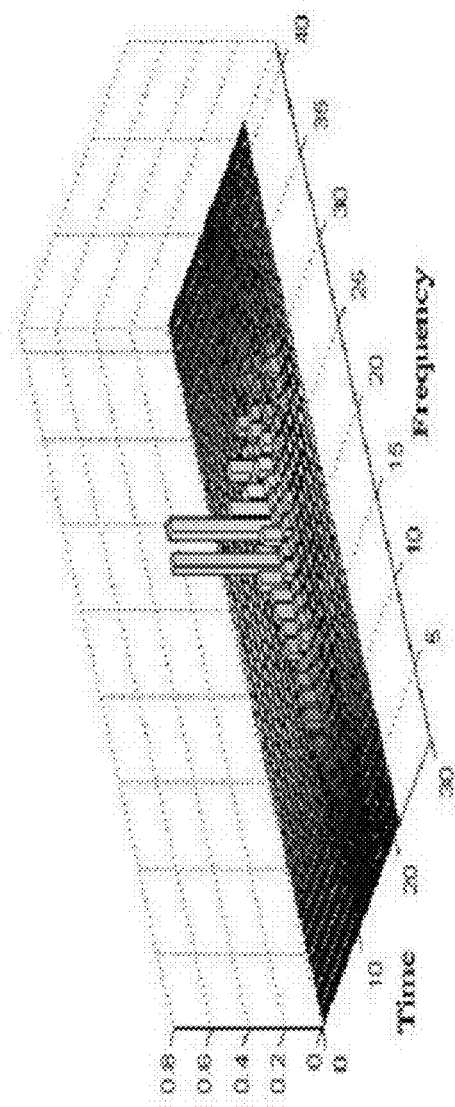
FIGS. 54A-54C depict input and output streams after two-dimensional channel distortion.
Figure 54C:
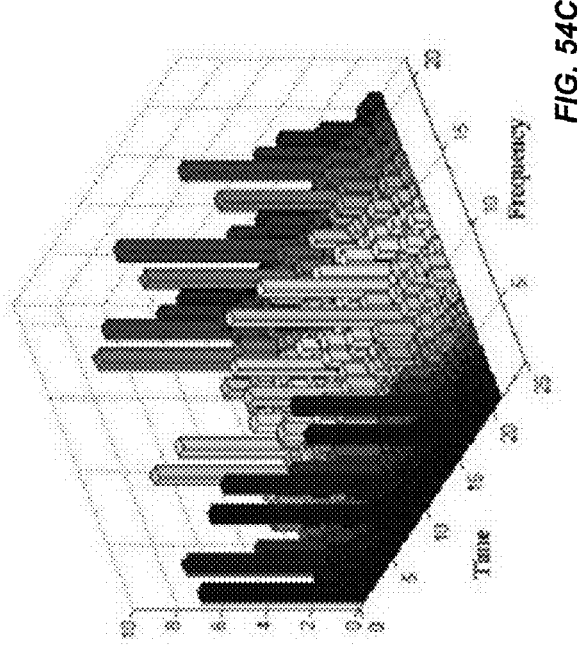
Figure 54B:
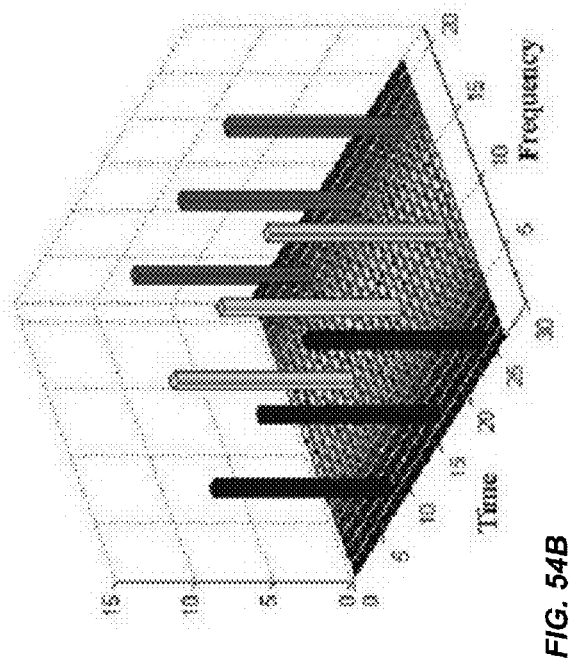

Referring to FIG. 53, an illustration is provided of a two-dimensional channel impulse. Smear along the time axis represents multipath reflections causing time delay while smear along the frequency axis represents multipath reflectors causing Doppler shifts. In FIGS. 54A-54C, input and output streams are depicted after two-dimensional channel distortion. Specifically, FIG. 54A represents the two-dimensional channel impulse, FIG. 54B represents a portion of the input stream and FIG. 54B depicts the same portion after convolution with the channel and additive noise.

In what follows an appropriate equalization mechanism will be described. To this end, it will be convenient to enumerate the elements of the digital time axis by $0, 1, \ldots, N-1$ and to consider the input and output streams X and Y, respectfully, as sequences of functions:

$$X = (X(k) \in \mathbb{C}(R_d): k=0, \ldots, N-1),$$

$$Y = (Y(k) \in \mathbb{C}(R_d): k=0, \ldots, N-1),$$

where $X(k)(i) = X(k, i)$ and $Y(k)(i) = Y(k, i)$, for every $k=0, \ldots, N-1$ and $i \in R_d$.

Furthermore, for purposes of explanation it will be assumed that the time index k is infinite in both directions, that is, $k \in \mathbb{Z}$, the digital time direction is linear, and the digital frequency direction is cyclic. Under these conventions the relation between the output stream and the input stream can be expressed by the following Equation (1.1):

$$Y(k) = \sum_{l=L_C}^{R_C} C(l) * X(k-l) + \mathfrak{N}(k), \quad 1.1$$

where:

$C = (C(l) \in \mathbb{C}(R_d): l=L_C, \ldots, R_C)$ are the channel impulse taps. Typically, $L_C \in \mathbb{Z}^{<0}$ and $R_C \in \mathbb{Z}^{>0}$. The number $n_C = R_C - L_C + 1$ may be referred to herein as the memory length of the channel. The operation * in (4.1) stands for one dimensional cyclic convolution on the ring $R_d$.

$\mathfrak{N}(k) \in (0, N_0 \cdot Id_N)$ is a complex Gaussian N dimensional vector with mean 0 and covariance matrix $N_0 \cdot Id$, representing the white Gaussian noise.

Referring now to FIG. 32C, there is shown an exemplary adaptive decision feedback equalizer 3250 capable of being utilized as the equalizer 3102 (FIG. 31). The adaptive decision feedback equalizer 3250 both shifts the echo and frequency shifted signals on top of the main signal in a forward feedback process 3210, and also then uses feedback signal cancelation methods to further remove any residual echo and frequency shifted signals in 3312. The method then effectively rounds the resulting signals to discrete values.

The adaptive decision feedback equalizer 3250 may, in some embodiments, operate according to the function:

$$X^s(k) = \sum_{l=L_F}^{R_F} F(l) * Y(k+l) - \sum_{l=L_B}^{-1} B(l) * X^h(k+l)$$

Where $X^H(k) = Q(X^s(k))$

Decision Feedback Least Mean Square Estimator (DF-LMS) with Locked Carrier Frequency An exemplary decision feedback LMS equalizer adapted to the relation expressed in Equation (1.1) will now be described under the condition that the carrier frequency is locked between the transmitter and receiver, that is, $W_{Tx} = W_{Rx}$. An adaptation of the equalizer under the condition of the existence of a non-zero discrepancy, i.e., $\Delta W \neq 0$, will subsequently be described. In one aspect, the equalizer incorporates a forward filter and a feedback filter as follows:

Forward filter: $F = (F(l) \in \mathbb{C}(R_d): l=L_F, \ldots, R_F)$,

Feedback filter: $B = (B(l) \in \mathbb{C}(R_d): l=L_B, \ldots, -1)$, where, typically $L_F, L_B \in \mathbb{Z}^{<0}$ and $R_F \in \mathbb{Z}^0$ satisfy $L_F, L_B \geq L_C$ and $R_F \geq R_C$. In fact, both filters depend on additional parameter $k \in \mathbb{Z}$ designating the present point on the digital time axis, hence, the complete notation for the filter taps is $F_k(l)$ and $B_k(l)$. However, for the sake of presentation this additional index will generally be omitted and will only be included when necessary. A soft estimator is defined as follows:

$$X^s(k) = \sum_{l=L_F}^{R_F} F(l) * Y(k+l) - \sum_{l=L_B}^{-1} B(l) * X^h(k+l). \quad 1.2$$

where $X^h(k+l)$ is the past hard estimation of the past data vector $X(k+l), l=L_B, \ldots, -1$, defined as the quantization $X^h(k) = Q(X^s(k))$, that is:

$$X^h(k)(i) = \underset{p \in C}{\mathrm{argmin}} |X^s(k)(i) - p|. \quad 1.3$$

Computation of Initial Forward and Feedback Filter Taps

In one aspect, a closed formula may be used to determine the forward and feedback filter taps of the decision feedback equalizer expressed in terms of the channel impulse response. In this case the forward filter taps are computed without regard to feedback and then the feedback filter taps are determined.

Computation of the Forward Filter Taps

First fix $k=0$ and let $X^s$ denote the following soft estimator for the vector $X(0)$, which depends only upon the forward filter taps:

$$X^s = \sum_{l=L_F}^{R_F} F(l) * Y(l). \qquad 1.7$$

In what follows it is assumed that $X(k) \sim CN(0, P \cdot Id_N)$, for every $k \in \mathbb{Z}$. Later this condition may be replaced by the condition that $X(k) \sim CN(0, P \cdot Id_N)$, for $k \geq 0$ and $X(k)=0$ for $k<0$, which is more adapted to the choice of $X^s$. We denote by Err=Err (0) the soft error term:

$$\text{Err} = X^s - X(0). \qquad 1.8$$

We consider the cost function:

$$U(F) = \mathbb{E} \|\text{Err}\|^2 = \mathbb{E} \|X^s - X(0)\|^2,$$

where the expectation is taken over the probability distribution of the input stream X and the additive white Gaussian noise $\mathfrak{N}$. The optimal filter $F^{opt}$ is defined as:

$$F^{opt} = \arg\min_F U(F),$$

therefore it satisfies the following system of linear equations:

$$\nabla_{F(l)} U(F^{opt}) = 0, l = L_F, \ldots, R_F. \qquad 1.9$$

The formula for the gradient $\nabla_{F(l)} U$ is an averaged version of (1.6), that is:

$$\nabla_{F(l)} U = \mathbb{E}[\text{Err} * Y(l)^\star] \qquad 1.10$$
$$= \mathbb{E}[(X^s - X(0)) * Y(l)^\star]$$
$$= \mathbb{E}[X^s * Y(l)^\star] - \mathbb{E}[X(0) * Y(l)^\star].$$

We first compute the term $\mathbb{E}[X(0)*Y(l)\star]$ and then the term $\mathbb{E}[X^s*Y(l)\star]$. Developing the expression $X(0)*Y(l))\star$ we obtain:

$$X(0)*Y(l)^\star = \sum_{l'=L_F}^{R_F} X(0)*X(l-l')^\star * C(l')^\star.$$

We observe that $\mathbb{E}[X(0)*X(k)\star]=0$ when $l \neq 0$ and $\mathbb{E}[X(0)*X(0)\star] = NP \cdot \delta_{w=0}$, hence we conclude that:

$$\mathbb{E}[X(0)*Y(l)^\star] = NP \cdot \delta_{w=0} * C(l)^\star = NP \cdot C(l)^\star. \qquad (1.11)$$

Next, we compute the term $\mathbb{E}[X^s*Y(l)\star]$:

$$\mathbb{E}[X^s * Y(l)^\star] = \sum_{l'=L_F}^{R_F} F(l') * \mathbb{E}[Y(l') * Y(l)]. \qquad 1.12$$

Developing the expression for $Y(l')*Y(l)$ we obtain:

$$Y(l')*Y(l) = \left( \sum_{r=L_C}^{R_C} C(r) * X(l'-r) + R(l') \right) * \qquad 1.13$$

$$\left( \sum_{s=L_C}^{R_C} C(s) * X(l-s) + R(l) \right)$$

$$= \sum_{s=L_C}^{R_C} \sum_{r=L_C}^{R_C} C(s)^\star * C(r) * X(l-s) * X(l'-r) + R(l') * R(l) +$$

Additional Terms.

Denote $$R(l, l') = \frac{1}{NP} \cdot \mathbb{E}[Y(l') * Y(l)].$$

Taking the expectation of both sides of (1.13) we obtain the following explicit formula for R(l, l'):

$$R(l, l') = \begin{cases} \sum_{\substack{s,r=L_C \\ s-r=l-l'}}^{R_C} C(r) * C(s)^\star & l \neq l' \\ \sum_{s=L_C'}^{R_C} C(s) * C(s)^\star + \frac{1}{SNR} \cdot \delta_{w=0} & l = l', \end{cases} \qquad 1.14$$

where in the computation of R(l,l') we use the following conditions on the mean of the specific terms in (1.13):

$\mathbb{E}[X(k)*X(k')] = NP \cdot \delta_{k=k'}$, $\mathbb{E}[\mathfrak{N}(k)*\mathfrak{N}(k')] = NN_0 \cdot \delta_{k=k'}$, $\mathbb{E}[\text{Additional Terms}] = 0$.

Combining (1.9), (1.10), (1.11) and (1.12) we conclude that the optimal filter $F^{opt}$ satisfies the following system of linear equations:

$$\sum_{l'=L_F}^{R_F} R(l, l') * F^{opt}(l') = C(l)^\star, \qquad 1.15$$

$$l = L_F, \ldots, R_F.$$

Finally, system (1.15) can be reduced to N systems of $n_F = R_F - L_F - 1$ scalar equations as follows. Applying a DFT to both sides of (1.15) we obtain:

$$\sum_{l'=L_F}^{R_F} \widehat{R(l,l')} \cdot \widehat{F^{opt}}(l') = \widehat{C(l)}^\star = \overline{\widehat{C(l)}}, l = L_F, \ldots, R_F. \qquad 1.16$$

where $\widehat{(-)}$ stands for the DFT of the corresponding function and · stands for pointwise multiplication of functions in $\mathbb{C}(R_d)$ as we recall that DFT interchanges convolution with pointwise multiplication and ★ with complex conjugation. Now observe that each function valued equation in (1.16) decouples into $n_F$ scalar valued equations by evaluating both sides on each element of the ring $R_d$. Explicitly, if we number the elements in $R_d$ by $0, 1, 2, \ldots, N-1$ we end up with the following scalar valued system of equations:

$$\sum_{l'=L_F}^{R_F} \widehat{R(l,l')}(i) \cdot \widehat{F^{opt}(l')}(i) = \widehat{\overline{C(l)}}(i), l = L_F, \ldots, R_F, \quad 1.17$$

for every i=0, ..., N−1. In more concrete matrix form (1.17) looks like:

$$\begin{pmatrix} \widehat{R(L_F,L_F)}(i) & \ldots & \ldots & \widehat{R(L_F,R_F)}(i) \\ \ldots & \ldots & \ldots & \ldots \\ \ldots & \ldots & \ldots & \ldots \\ \widehat{R(R_F,L_F)}(i) & \ldots & \ldots & \widehat{R(R_F,R_F)}(i) \end{pmatrix} \begin{pmatrix} \widehat{F^{opt}(L_F)}(i) \\ \ldots \\ \ldots \\ \widehat{F^{opt}(R_F)}(i) \end{pmatrix} = \begin{pmatrix} \widehat{\overline{C(L_F)}}(i) \\ \ldots \\ \ldots \\ \widehat{\overline{C(R_F)}}(i) \end{pmatrix}, \quad 1.18$$

for every i=0, ..., N−1. We conclude the discussion by considering the case when the input stream satisfies X(k)=0 for k<0 which is the case adapted to (feedback) subtraction of the past interference. In this scenario, the optimal forward filter $F^{opt}$ satisfies a system of the form (1.15) with the "matrix coefficients" R (l, l') taking the form:

$$R(l,l') = \begin{cases} \sum_{s=L_C}^{\min\{l,R_C\}} \sum_{\substack{r=L_C \\ s-r=l-l'}}^{\min\{l',R_C\}} C(s)^* * C(r) & l \neq l' \\ \sum_{s=L_C}^{\min\{l,R_C\}} C(s)^* * C(s) + \frac{1}{SNR} \cdot \delta_{w=0} & l = l', \end{cases} \quad 1.19$$

Computation of the Feedback Filter Taps

The optimal feedback filter taps $B^{opt}$ (l), l=$L_B$, ..., −1 can be computed from the forward and channel taps according to the following formula:

$$B^{opt}(l) = \sum_{l'=L_C}^{R_C} F^{opt}(l'+l) * C(l'). \quad 1.20$$

The justification of Formula (1.20) proceeds as follows. Fix an input vector X ($l_0$) for some specific $l_0$=$L_B$, ..., −1. Subtracting its interference C (l')*X ($l_0$) from each term Y ($l_0$+l'), we obtain an "interference free" sequence $\tilde{Y}$(l), l=$L_F$, ..., $R_F$. Now, applying the forward filter $F^{opt}$ to the sequence $\tilde{Y}$(l) we obtain an estimator for X (0) given by $$X^s = \sum_{l=L_F}^{R_F} F^{opt}(l) * X(l) - B^{opt}(l_0) * X(l_0),$$

which concludes the justification.

Computation of optimal initial forward and feedback filter taps

In an alternative aspect, a closed formula of the optimal forward and feedback filter taps of the decision feedback equalizer may be expressed in terms of the channel impulse response. In this regard we conduct the computation in the stochastic setting where we assume that X (k)~CN (0, P·$Id_N$), for every k∈$\mathbb{Z}$. We denote by $X^s$ the following soft estimator for the vector X (0):

$$X^s = \sum_{l=L_F}^{R_F} F(l) * Y(l) - \sum_{l=L_B}^{-1} B(l) * X(l). \quad 1.21$$

We denote by Err=Err (0) the soft error term:

$$\text{Err}=X^s-X(0). \quad 1.22$$

We consider the cost function:

$$U(F,B)=\mathbb{E}\,\|\text{Err}\|^2=\mathbb{E}\,\|X^s-X(0)\|^2,$$

where the expectation is taken over the probability distribution of the input stream X and the additive white Gaussian noise $\mathfrak{N}$. The optimal filters $F^{opt}$, $B^{opt}$ are defined as:

$$(F^{opt}, B^{opt}) = \underset{(F,B)}{\arg\min}\, U(F, B),$$

therefore they satisfy the following system of linear equations:
1.23

$$\nabla_{F(l)}U(F^{opt},B^{opt})=0, l=L_F,\ldots,R_F. \quad (4.23)$$

$$\nabla_{B(l)}U(F^{opt},B^{opt})=0, l=L_B,\ldots,-1,$$

where the gradients are given by:

$$\nabla_{F(l)}U = \mathbb{E}\,[\text{Err}^*Y(l)^\star], l=L_F,\ldots,R_F,$$

$$\nabla_{B(l)}U = -\mathbb{E}\,[\text{Err}^*X(l)^\star], l=L_B,\ldots,-1. \quad 1.24$$

First we write explicitly the first system $\nabla_{F(l)}$ U ($F^{opt}$, $B^{opt}$)=0. Expanding the term $\mathbb{E}$ [Err*Y (l)★], we obtain:

$$\mathbb{E}[\text{Err}*Y(l)^\star] = \sum_{l'=L_F}^{R_F} F(l')*\mathbb{E}[Y(l')*Y(l)^\star] - \sum_{l'=L_B}^{-1} B(l')*\mathbb{E}[X(l')*Y(l)^\star] - \mathbb{E}[X(0)*Y(l)^\star].$$

Direct computation reveals that:

$$\mathbb{E}\,[X(0)*Y(l)^\star]=NP\cdot C(l)^\star,$$

$$\mathbb{E}\,[X(l')*Y(l)^\star]=NP\cdot C(l-l'),$$

$$\mathbb{E}\,[Y(l')*Y(l)^\star]=NP\cdot R_1(l,l'),$$

where:

$$R_1(l,l') = \begin{cases} \sum_{\substack{s,r=L_C \\ s-r=l-l'}}^{R_C} C(r)*C(s)^\star & l \neq l' \\ \sum_{s=L_C}^{R_C} C(s)*C(s)^\star + \frac{1}{SNR}\cdot\delta_{w=0} & l=l'. \end{cases}$$

Thus, the first system of equations amounts to:

$$\sum_{l'=L_F}^{R_F} R_1(l, l') * F^{opt}(l') - \sum_{l'=L_F}^{R_F} C(l-l') * B^{opt}(l') = C(l)^\star, \quad 1.25$$

$$l = L_F, \ldots, R_F.$$

Next we write explicitly the system $\nabla_{B(l)} U(F^{opt}, B^{opt}) = 0$. Expanding the term $\mathbb{E}[Err * X(l)^\star]$, we obtain:

$$\mathbb{E}[Err * X(l)^\star] = \sum_{l'=L_F}^{R_F} F(l') * \mathbb{E}[Y(l') * X(l)^\star] -$$

$$\sum_{l'=L_B}^{-1} B(l') * \mathbb{E}[X(l') * X(l)^\star] - \mathbb{E}[X(0) * X(l)^\star].$$

Direct computation reveals that:

$$\mathbb{E}_{[Y(l')^* X(l)^\star]} = NP \cdot C(l'-l),$$

$$\mathbb{E}_{[X(l')^* X(l)^\star]} = NP \cdot \delta_{l=l'} \delta_{w=0},$$

$$\mathbb{E}_{[X(0)^* X(l)^\star]} = 0,$$

Thus, the second system of equations amounts to:

$$\sum_{l'=L_F}^{R_F} C(l'-l) * F^{opt}(l') - B^{opt}(l) = 0, \quad 1.26$$

$$l = L_B, \ldots, -1.$$

Using Equation (1.26), the optimal feedback filter taps may be expressed in terms of the channel taps and the optimal forward filter taps as:

1.27

$$\boxed{\begin{aligned} B^{opt}(l) = \sum_{l'=L_F}^{R_F} C(l'-1) * F^{opt}(l'), \\ l = L_B, \ldots, -1 \end{aligned}}$$

Substituting the right hand side of (1.27) in (1.25) enables the optimal forward filter taps to be determined by finding the solution of the following linear system:

$$\sum_{l'=L_F}^{R_F} R_1(l, l') * F^{opt}(l') - \sum_{l'=L_F}^{R_F} R_2(l, l') * F^{opt}(l') = C(l)^\star, \quad 1.28$$

$$l = L_F, \ldots, R_F,$$

where:

$$R_2(l, l') = \sum_{\substack{s=l+1 \\ s-r=l-l'}}^{l-L_B} \sum_{r=l'+1}^{l'-L_B} C(r) * C(s)^\star.$$

As a final note, we denote $R(l, l') = R_1(l, l') - R_2(l, l')$ and write the system (1.28) in the following form:

1.29

$$\boxed{\begin{aligned} \sum_{l'=L_F}^{R_F} R(l'-l) * F^{opt}(l') = C(l)^\star, \\ l = L_F, \ldots, R_F \end{aligned}}$$

System (1.29) can be reduced to N systems of $n_F = R_F - L_F = 1$ scalar equations as follows. Applying a DFT to both sides of (1.15) we obtain:

$$\sum_{l'=L_F}^{R_F} \widehat{R(l,l')} \cdot \widehat{F^{opt}}(l') = \widehat{C(l)}^\star = \widehat{C(l)}, \quad 1.30$$

$$l = L_F, \ldots, R_F.$$

Where ($\widehat{\phantom{-}}$) stands for the DFT of the corresponding function and · stands for pointwise multiplication of functions in $\mathbb{C}(R_d)$, since the DFT interchanges convolution with pointwise multiplication and $\star$ with complex conjugation. It is now observes that each function valued equation in (1.30) decouples into $n_F$ scalar valued equations by evaluating both sides on each element of the ring $R_d$. Explicitly, numbered the elements in $R_d$ as 0, 1, 2, ..., N−1 results in the following scalar valued system of equations:

$$\sum_{l'=L_F}^{R_F} \widehat{R(l,l')}(i) \cdot \widehat{F^{opt}}(l')(i) = \widehat{C(l)}(i), \quad 1.31$$

$$l = L_F, \ldots, R_F,$$

for every i=0, ..., N−1. In more concrete matrix form (1.31) looks like:

$$\begin{pmatrix} \widehat{R(L_F,L_F)}(i) & \cdots & \cdots & \widehat{R(L_F,R_F)}(i) \\ \vdots & \cdots & \cdots & \vdots \\ \vdots & \cdots & \cdots & \vdots \\ \widehat{R(R_F,L_F)}(i) & \cdots & \cdots & \widehat{R(R_F,R_F)}(i) \end{pmatrix} \begin{pmatrix} \widehat{F^{opt}}(L_F)(i) \\ \vdots \\ \vdots \\ \widehat{F^{opt}}(R_F)(i) \end{pmatrix} = \begin{pmatrix} \widehat{C(L_F)}(i) \\ \vdots \\ \vdots \\ \widehat{C(R_F)}(i) \end{pmatrix}, \quad 1.32$$

for every i=0, ..., N−1.

Channel Acquisition

An exemplary channel acquisition component of the OTFS modulation scheme will now be described. To this end, we number the elements of $R_d$ by 0, 1, . . . , N−1. For the channel acquisition, a rectangular strip [0, $R_C$−2$L_C$]×[0, N] is devoted in the time frequency plane. The value of the input stream X at this strip is specified to be:

$$X(\tau, w) = \begin{cases} N & \tau = -L_C \text{ and } w = 0 \\ 0 & \text{otherwise.} \end{cases}$$

The complement of this stream will generally be devoted to data.

Gradient Correction

As mentioned previously, the forward and feedback taps of the decision feedback equalizer depend on the index k and change slowly as k varies. We proceed to describe herein an exemplary tracking mechanism based on gradient correction with respect to an appropriate quadratic cost function. We denote by Err (k) the soft error term at the k step:

$$\text{Err}(k) = X^s(k) - X^h(k) \in \mathbb{C}(R_d), \quad 1.4$$

where theoretically this error should be taken with respect to the true data vector X (k) (true decisions); however, in an exemplary embodiment the error is taken with respect to the hard estimator $X^h$ (k) (hard decisions) as specified in equation (1.4). We define the following cost function U, taking as arguments the forward and feedback filter taps:

$$U(F,B) = \|\text{Err}(k)\|^2 = \|X^s(k) - X^h(k)\|^2, \quad 1.5$$

where $\|-\|$ is the norm associated with the standard Hermitian inner product (−, −) on $\mathbb{C}$ ($R_d$). Note that, in fact, the cost function depends on the index k, however, for the sake of brevity we omit this index from the notation. Next, we compute the gradients $\nabla_{F(l)}U, l=L_F, \ldots, R_F$ and $\nabla_{B(l)}U, l=L_B, -1$ with respect to the Euclidean inner product 2 Re (−, −) on $\mathbb{C}$ ($R_d$). (considered as a real vector space). The formulas for the gradients are:

$$\nabla_{F(l)} = \nabla_{F(l)}U = \text{Err}(k)*Y(k+l)^\star, l=L_F, \ldots, R_F,$$

$$\nabla_{B(l)} = \nabla_{B(l)}U = -\text{Err}(k)*X^h(k+l)^\star, l=L_B, \ldots, -1,$$

where ★ stands for the star operation on the convolution algebra $\mathbb{C}$ ($R_d$), given by f★(i)=$\overline{f(-i)}$ for every $f \in \mathbb{C}(R_d)$ and $i \in R_d$. In other words, the star operation of a function is obtained by inverting the coordinate inside $R_d$ followed by complex conjugation. We note that the star operation F by DFT to complex conjugation, that is DFT (f★)=$\overline{\text{DFT(f)}}$, for every $f \in \mathbb{C}(R_d)$.

The correction of the taps at the k step is obtained by adding a small increment in the (inverse) gradient direction, that is:

$$F_{k+1}(l) = F_k(l) - \mu \cdot \nabla_{F(l)}, l=L_F, \ldots, R_F,$$

$$B_{k+1}(l) = B_k(l) - \mu \cdot \nabla_{F(l)}, l=L_B, \ldots, -1,$$

for an appropriately chosen positive real number $\mu \ll 1$. The optimal value $\mu_{opt}$ of the small parameter $\mu$ is given by:

$$\mu_{opt} = \underset{\mu}{\arg\min} \; U(F + \mu \cdot \nabla_F, B + \mu \cdot \nabla_B).$$

A formal development of the quadratic expression U $(F+\mu \cdot \nabla_F, B+\mu \cdot \nabla_B)$ in the parameter $\mu$ reveals that:

$$U(F + \mu \cdot \nabla_F, B + \mu \cdot \nabla_B) = \\ U(F, B) + \mu(2\text{Re}\langle F, F\rangle + 2\text{Re}\langle B, B\rangle) + \mu^2 \text{Hess}(\nabla_F, \nabla_B),$$

where Hess ($\nabla_F$, $\nabla_B$) stands for:

$$\text{Hess}(\nabla_F, \nabla_B) = \left\| \sum_{l=L_F}^{R_F} \nabla_{F(l)} * Y(k+l) - \sum_{l=L_B}^{-1} \nabla_{B(l)} * X^h(k+l) \right\|^2$$

and (F, F) and (B, B) stand for:

$$\langle F, F \rangle = \sum_{l=L_F}^{R_F} \langle F(l), F(l) \rangle,$$

$$\langle B, B \rangle = \sum_{l=L_B}^{-1} \langle B(l), B(l) \rangle.$$

If we denote b=2 Re (F, F)+2 Re (B, B) and a=Hess ($\nabla_F$, $\nabla_B$) then the standard formula for the minimum of a parabola imply that $\mu_{opt}$ is given by:

$$\mu_{opt} = \frac{-b}{2a}.$$

Figure 33:
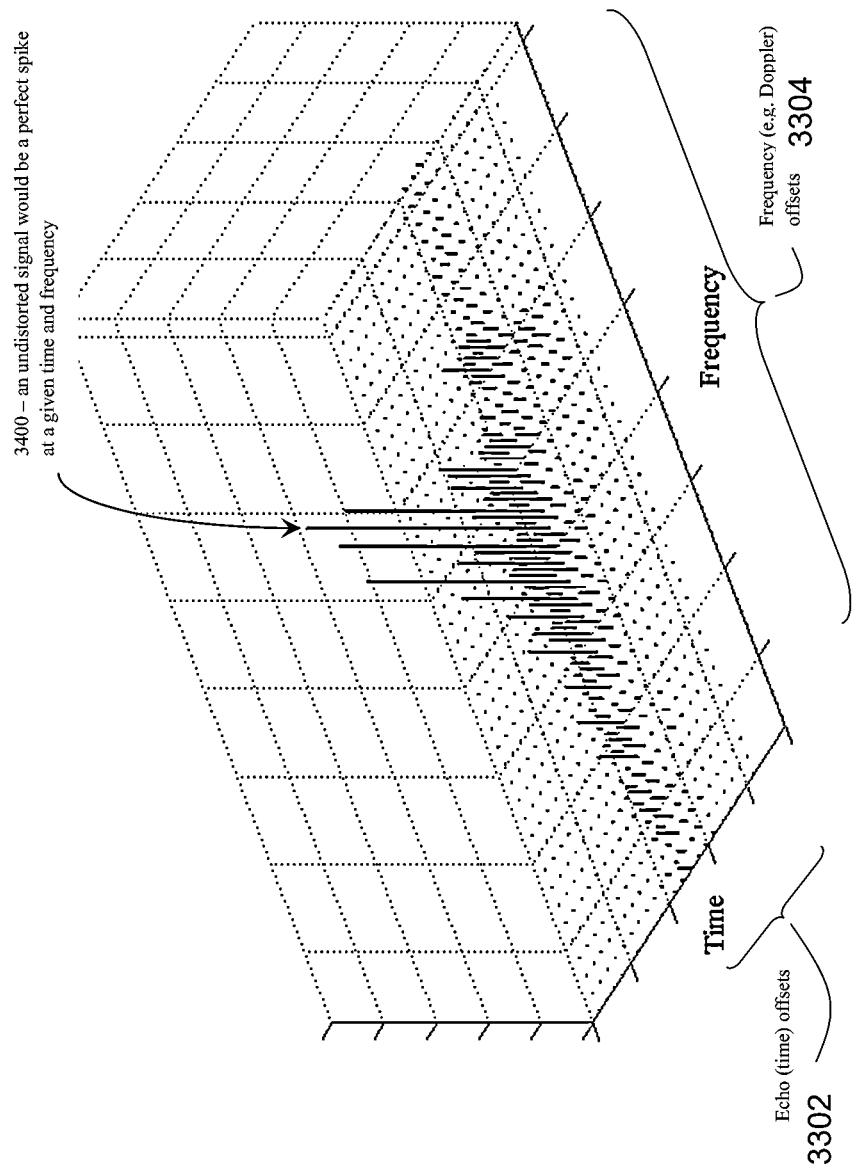
FIG. 33 shows a time-frequency graph illustrating the various echo (time shifts) and frequency shifts that a signal may encounter during propagation through a channel.

FIG. 33 shows a time-frequency graph providing an illustration of the various echo (time shifts) and frequency shifts which a signal may encounter during transmission through a channel; that is, FIG. 33 illustrates the impulse response of the channel. If the channel lacked any echo (time shift) or frequency shifts, signal spike 3400—which is representative of original signal as transformed by the channel—would instead show up as a single spike at a defined time and frequency. However due to various echoes and frequency shifts, the original signal is instead spread over both time 3302 and frequency 3304 in the manner illustrated by spike 3400. It is thus desired to compensate or otherwise address these effects, either before further processing at the receiver 3204 or later after the receiver has taken the processing to the $D^R$ stage 3206. Alternatively, the original signal may be pre-equalized 3208 prior to transmission using a related process.

Figure 34:
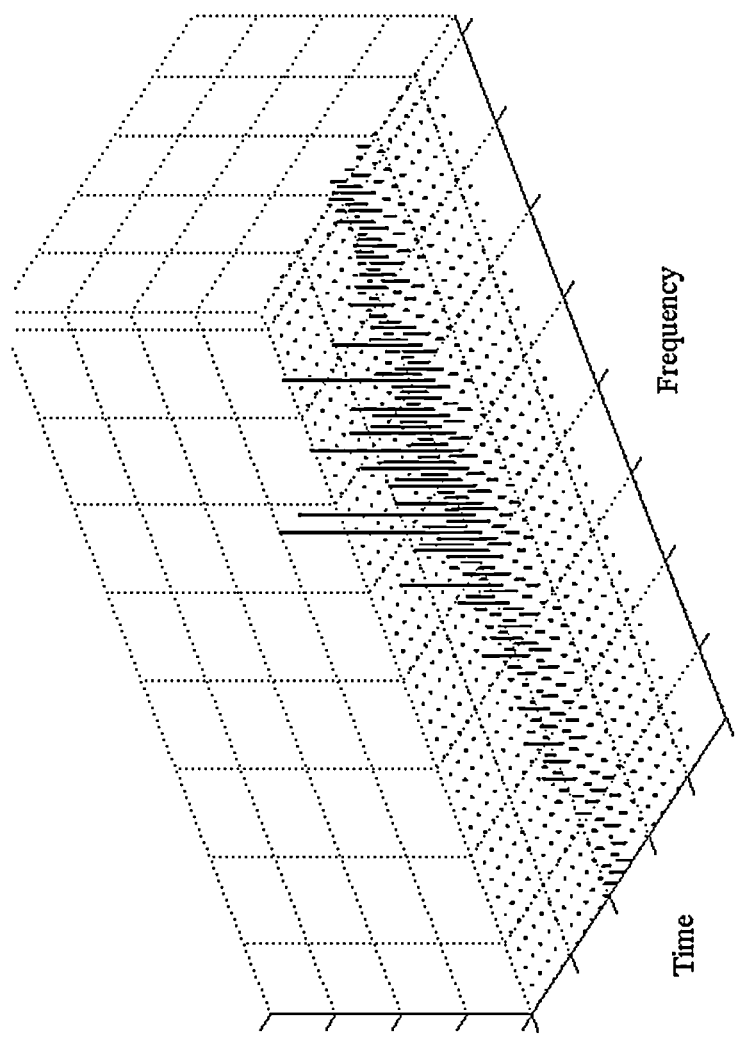
FIG. 34 illustratively represents a time-frequency map of tap values produced by the feed forward (FF) portion of the adaptive decision feedback equalizer.

FIG. 34 illustratively represents a time-frequency map of tap values produced by the feed forward (FF) portion of the adaptive decision feedback equalizer of FIG. 32C when correcting for the time and frequency distortions introduced by the channel impulse response shown in FIG. 33. The FF portion 3210 of the equalizer works to shift the echo or frequency shifted signals to once again coincide with the main signal (the un-reflected and non-shifted signal), and thus enhances the intensity of the received signal while diminishing the intensity of the echo or frequency shifted signals.

Figure 35:
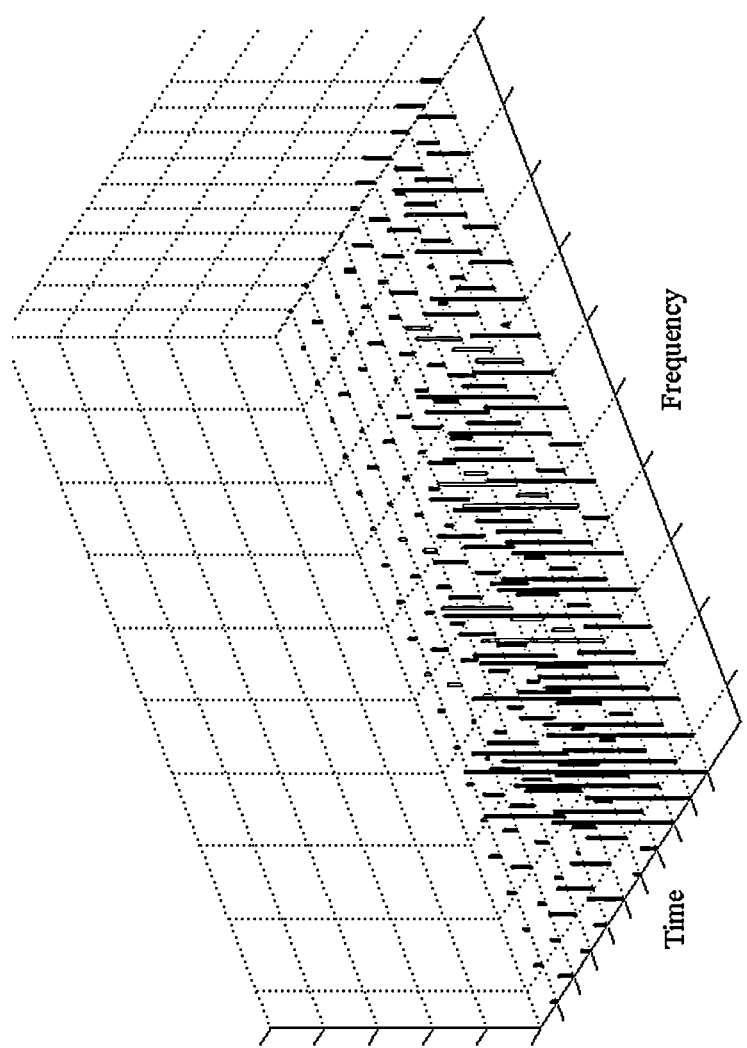
FIG. 35 illustratively represents a time-frequency map of tap values produced by the feedback (FB) portion of the adaptive decision feedback equalizer.

FIG. 35 illustratively represents a time-frequency map of tap values produced by the feedback (FB) portion 3212 of the adaptive decision feedback equalizer of FIG. 32C when correcting for the time and frequency distortions introduced by the channel impulse response shown in FIG. 33. After the feedforward (FF) portion 3210 of the equalizer has acted to substantially offset the echo and frequency shifted signals, there will still be some residual echo and frequency signals remaining. The feedback (FB) portion 3212 acts to cancel out those trace remaining echo signals, essentially acting like an adaptive canceller for this portion of the system.

The quantizer portion of the adaptive decision feedback equalizer 3214 then acts to "round" the resulting signal to the nearest quantized value so that, for example, the symbol "1" after transmission, once more appears on the receiving end as "1" rather than "0.999".

As previously discussed, an alternative mathematical discussion of the equalization method, particularly suitable for step 802B, is described in provisional application 61/615, 884, the contents of which are incorporated herein by reference.

Data Interleaving

Attention is now directed to FIGS. 36A and 36B, to which reference will be made in further elaborating upon the use of interleaving within an OTFS system. In particular, FIGS. 36A and 36B show that it may be useful to transmit various different time blocks in an interleaved scheme where the time needed to transmit all N blocks may vary between different data matrices D, and wherein the interleaving scheme is such as to take the latency, that is the time needed to transmit all N blocks, into account according to various optimization schemes. By choosing groups of latencies properly, one can prevent delays to one user or another. For example, FIG. 36A shows a first latency timeline 3600 depicting transmission times for five users a, b, c, d and e. Constellation 3605 shows a hierarchical diagram showing two groups including a first group comprising users a and b, each with a latency of four, and a second group comprising users c, d and e, each with a latency of six. This means that users a and b will transmit, or receive data every four time slots, while users c, d and e will transmit or receive data every six time slots. Time track 3610 shows the resulting order of transmission/receiving for each user, while latency indicators 3615, 3620, 3625, 3630 and 3635 show the resulting latency spacing for users a, b, c, d and e, respectively.

FIG. 36B shows a second latency timeline 3650 showing the transmission times for four users a, b, c and d. Constellation 3655 shows a hierarchical diagram depicting three groups including a first group comprising user a with a latency of two, a second group comprising user b with a latency of four, and a third group comprising users c and d, each with a latency of eight. This means that user a will transmit or receive data every two time slots, user b will transmit, or receive data every four time slots, while users c and d will transmit or receive data every eight time slots. Time track 3660 shows the resulting order of transmission/receiving for each user, while latency indicators 3665, 3670, 3675 and 3680 show the resulting latency spacing for users a, b, c and d, respectively. Different latencies can be chosen for different users depending on what type of service the user is seeking. For example, a voice connection may be provided a latency of two, while a file or video download might be provided a latency of eight. Latency may be chosen for other reasons.

Full Duplex Transceiver

Figure 37:
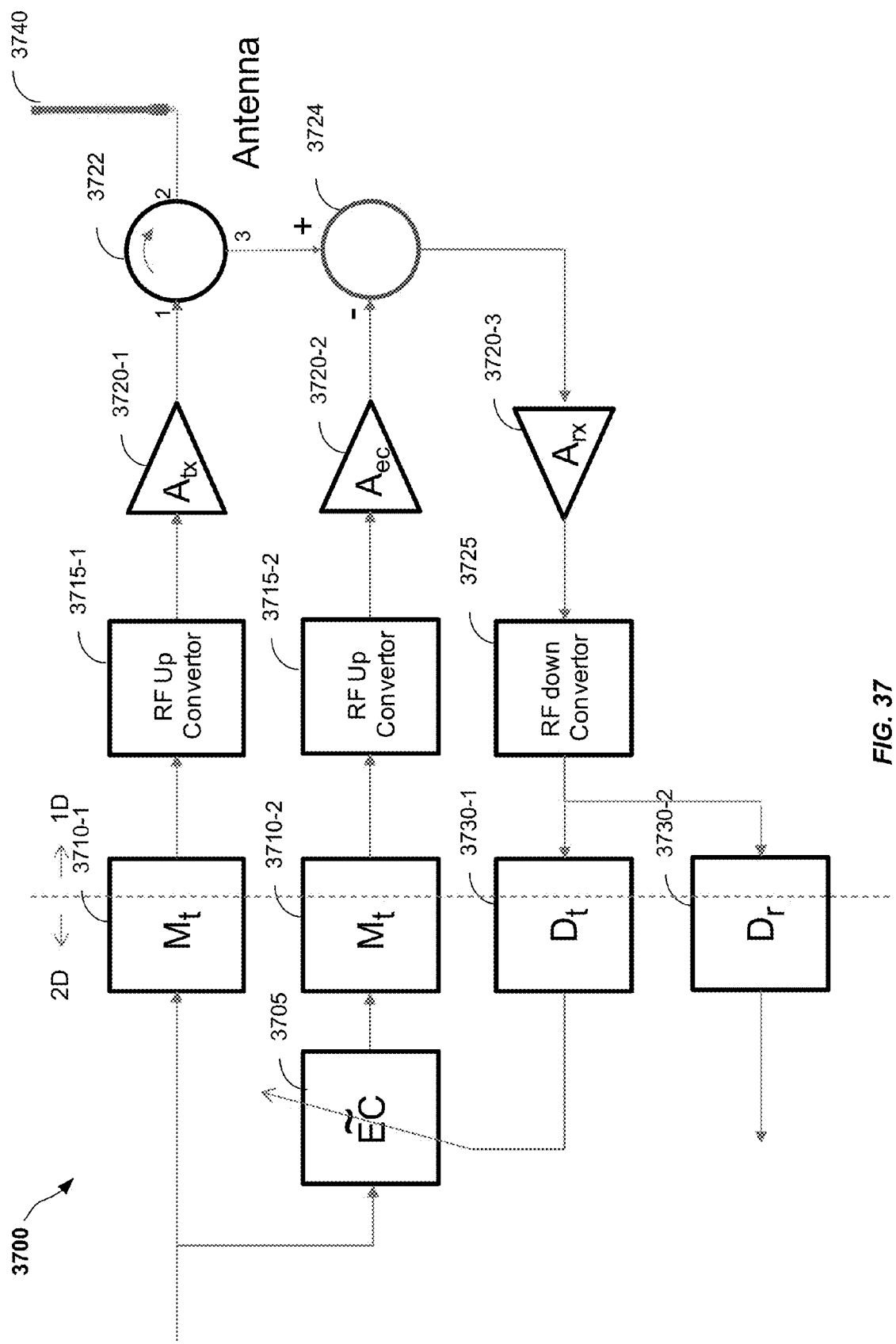
FIG. 37 illustrates an example of a full duplex OTFS transceiver in accordance with the disclosure.

FIG. 37 shows an example of a full duplex OTFS transceiver 3700 capable of enabling data to be transmitted and received simultaneously in the same frequency band. The OTFS transceiver 3700 is configured with an echo cancellation module 3705 that implements echo cancellation in the time and frequency domain. This enables estimation of two-dimensional reflections of the transmitted signal; that is, estimation of frequency shifts and time shifts. As shown, a first OTFS encoder 3710-1 performs OTFS encoding with a first matrix [U1], a permutation operation, a second matrix multiplication of a Basis matrix [U2] and sin/cos transmission of the elements of the resulting transformed data matrix. The transformed data matrix is transmitted a column at a time in a one dimensional data stream and up-converted to an RF frequency with RF up converter 3715-1, power amplified with transmit power amplifier 3720-1 and passed to an antenna 3740 via a circulator 3722.

In the embodiment of FIG. 37 the antenna also receives a second data stream from another transmitter. However, the second data stream also includes reflections of the first signal transmitted by the OTFS transmitter 3700. The circulator 3722 routes the received second signal to a subtractor 3724 that subtracts an estimate of the reflected signals that is created by the echo canceller 3705. A second OTFS encoder 3710-2, a second RF up converter 3715-2 and an echo canceller power amplifier 3720-2 create the estimated echo that is subtracted from the received second signal.

An RF down converter 3725 demodulates the second received signal and passes the demodulated received second data stream $D_r$ to a first OTFS decoder 3730-1 and a second OTFS decoder 3730-2. The first OTFS decoder 3730-2 decodes the received second signal using the base t matrix that was used to transmit the first data stream. The second OTFS decoder 3730-2 decodes the echo-canceled data stream using a base r matrix that the other transmitter used to encode the second data stream. The output of the first OTFS decoder 3730-1 is fed back as a residual error signal to the echo canceller 3705 in order to tune the two dimensional estimate of the reflected echoes channel. The output of the second OTFS decoder 3730-2 is an estimate of the second data stream from the other transmitter. The capability to obtain an estimate of the echo channel in both frequency and time is a significant advantage of the OTFS technique, and facilitates full-duplex communication over a common frequency band in a manner not believed to be possible using prior art methods.

Iterative Signal Separation

Figure 38:
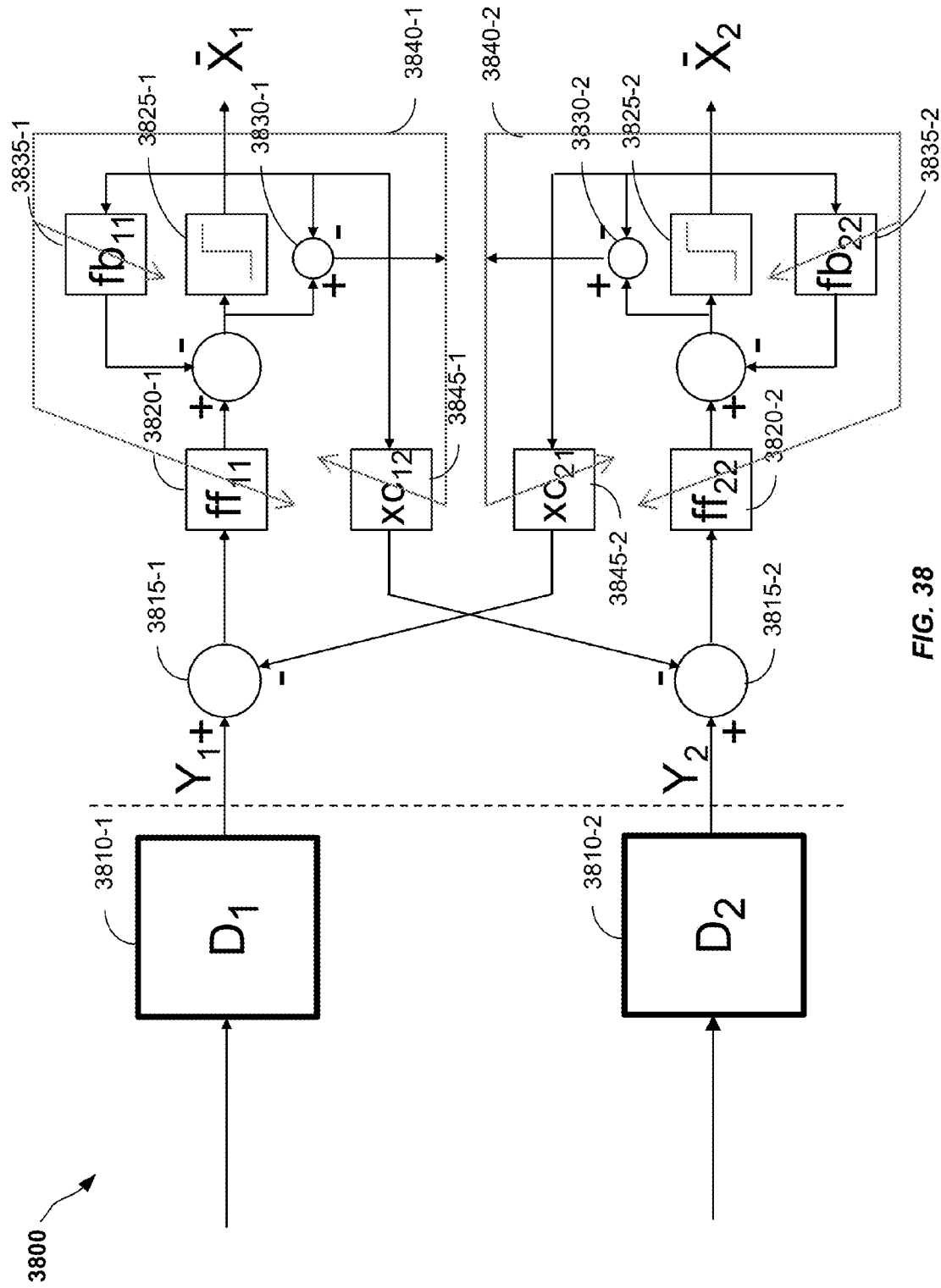
FIG. 38 illustrates an example of an OTFS receiver that provides iterative signal separation in accordance with the disclosure.

FIG. 38 shows an example of an OTFS receiver 3800 that provides iterative signal separation in accordance with the disclosure. The OTFS receiver 3800 receives a first data matrix $D_1$ from a first transmitter that uses a first basis matrix. The OTFS receiver 3800 also receives a second data stream $D_2$ from a second transmitter in the same frequency band where the second data stream $D_2$ was encoded using a second basis matrix different from the first basis matrix. A first OTFS decoder 3810-1 decodes the first data matrix $D_1$ to create a one dimensional data stream $Y_1$ while a second OTFS decoder decodes the second data matrix $D_2$ to form a second one dimensional data stream $Y_2$.

The OTFS receiver 3800 includes a pair of feed-forward and feedback equalizers comprising first and second feed forward equalizers 3820-1 and 3820-2, first and second feedback equalizers 3835-1 and 3835-2, and first and second slicers 3825-1 and 3825-2. First and second subtractors 3830-1 and 3830-2 calculate first and second residual error signals 3840-1 and 3840-2 that are used by respective ones of the feed forward equalizers 3820 and the feedback equalizers 3835 in order to optimize two dimensional time/frequency shift channel models.

A pair of cross talk cancellers 3845-1 and 3845-2 also use the residual error signals 3840-1 and 3840-2, respectively, in order to optimize estimates of the first received data signal and the second received data signal in order to subtract each signal at subtractors 3815-1 and 3815-2. In this way, the cross talk from one data signal to the other is minimized. As with the full duplex OTFS transceiver 3700 of FIG. 37, the OTFS receiver 3800 can model two dimensional time/frequency channels and is believed to represent a significant advance over receivers employing conventional one dimensional (i.e., time only) channel modeling approaches.

Figure 40:
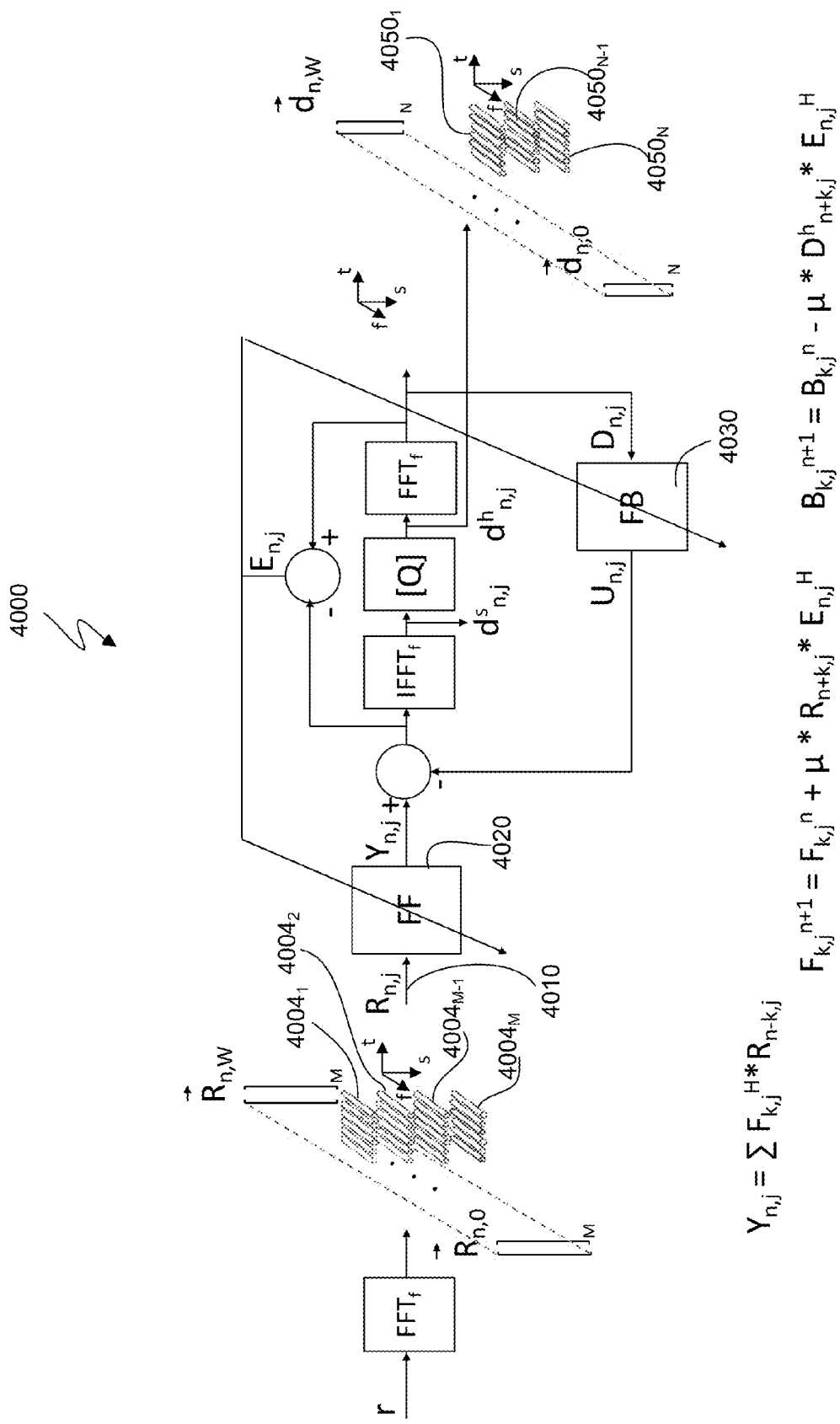
FIG. 40 is a block diagram of a time-frequency-space decision feedback equalizer that may be employed to facilitate signal separation in a multi-antenna OTFS system.

Attention is now directed to FIG. 40, which is a block diagram of a time-frequency-space decision feedback equalizer 4000 that may be employed to facilitate signal separation in a multi-antenna OTFS system. As shown in FIG. 40, received signal information (R) represented by a set of M time-frequency planes 4004 is received at input port 4010 of the equalizer 4000. Each of the M time-frequency planes 4004 represents the information collected from N transmit antenna instances (M>N) by one of M antenna instances associated with an OTFS receiver. The N transmit antenna instances, which may or may not be co-located, will generally be associated with an OTFS transmitter remote from the OTFS receiver associated with the M receive antenna instances. Each of the N transmit antenna instances and M receive antenna instances may, for example, comprise a single physical antenna which is either co-located or not co-located with the other antenna instances. Alternatively, one or more of the N transmit antenna instances and M receive antenna instances may correspond to an antenna instance obtained through polarization techniques.

In the embodiment of FIG. 40, the time-frequency-space decision feedback equalizer 4000 includes a time-frequency-space feedforward FIR filter 4020 and a time-frequency-space feedback FIR filter 4030. The equalizer 4000 produces an equalized data stream at least conceptually arranged in set of N time-frequency planes (M>N) wherein, again, N corresponds to the number of antenna instances transmitting information to the M antenna instances of the OTFS receiver associated with the equalizer 4000.

Figure 41:
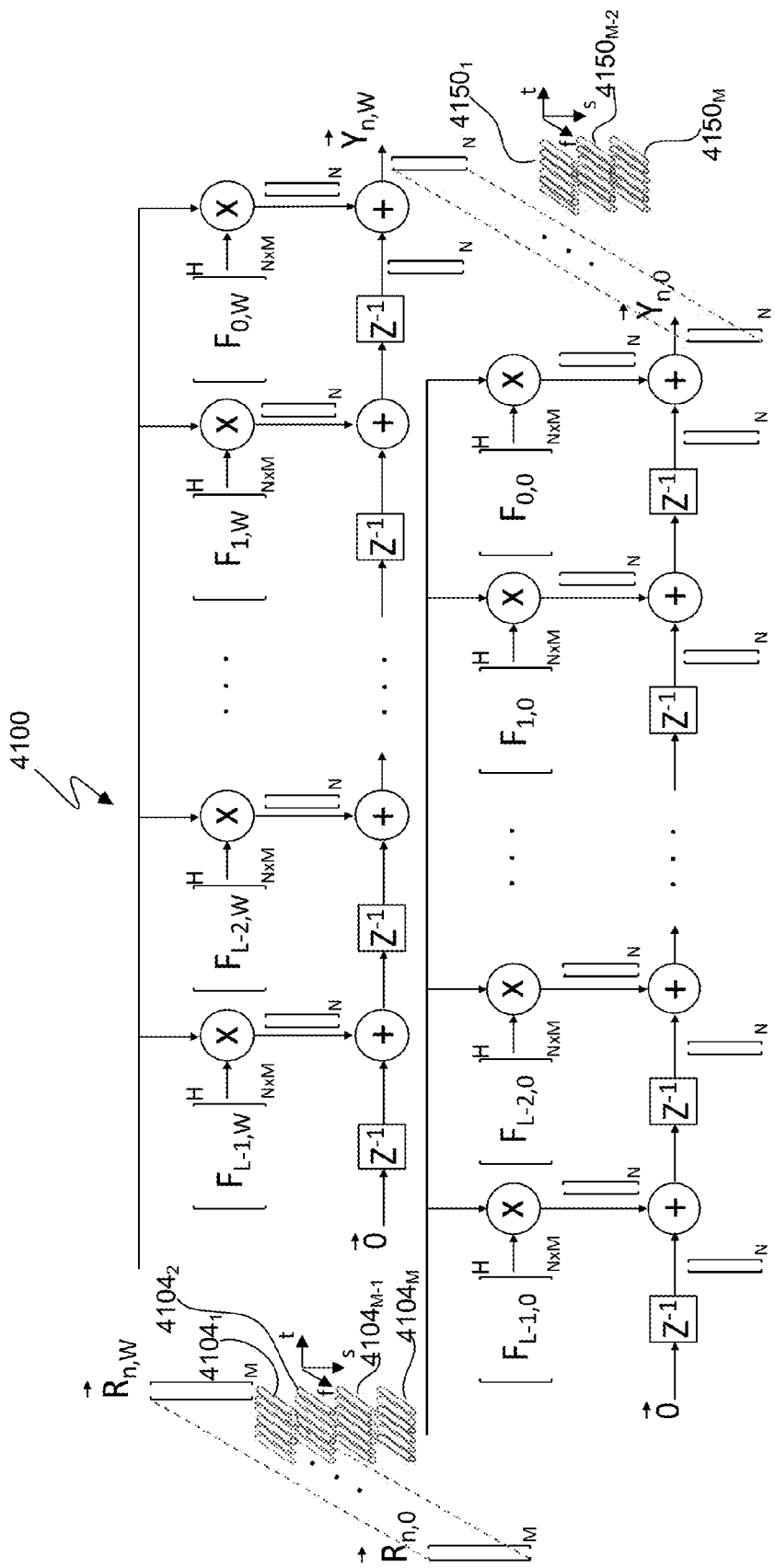
FIG. 41 is a block diagram of a time-frequency-space decision feedforward FIR filter.

Turning now to FIG. 41, a block diagram is provided of a time-frequency-space decision feedforward FIR filter 4100 which may be utilized to implement the time-frequency-space feedforward FIR filter 4020. As shown, the filter 4100 processes received signal information (R) carried on a set of M time-frequency planes 4104 provided by a corresponding set of M receive antennas. The filter 4100 produces a filtered data stream at least conceptually arranged in set of N time-frequency planes 4150 (M>N), where, again, N corresponds to the number of antenna instances transmitting information to the M antenna instances of the OTFS receiver associated with the equalizer 4000.

Figure 42:
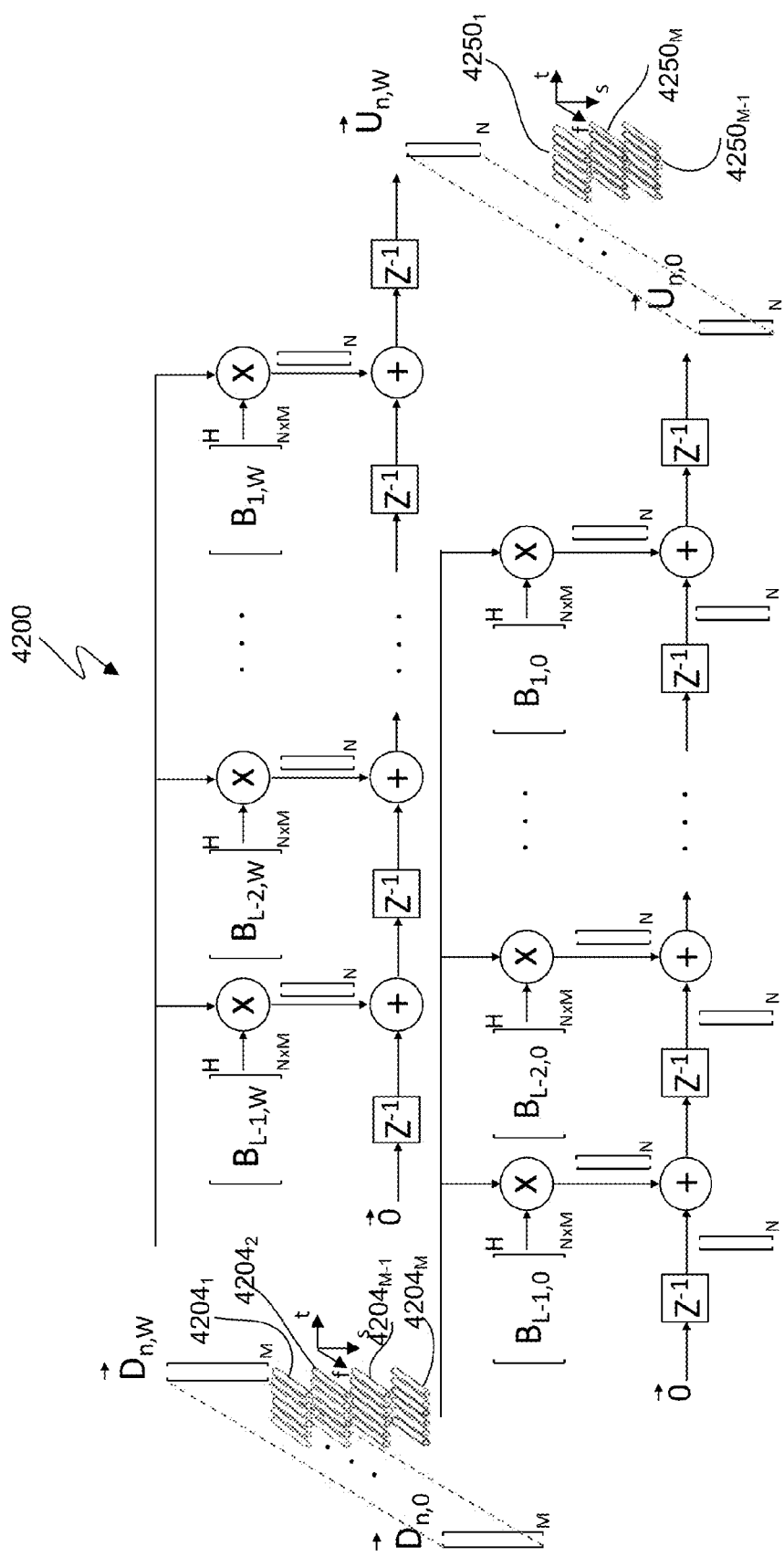
FIG. 42 is a block diagram of a time-frequency-space decision feedback FIR filter.

Referring to FIG. 42, a block diagram is provided of a time-frequency-space decision feedback FIR filter 4200 which may be utilized to implement the time-frequency-space feedback FIR filter 4030. As shown, the filter 4200 processes received signal information (R) carried on a set of M time-frequency planes 4204 which may, for example, correspond to the set of M time-frequency planes provided by a corresponding set of M receive antennas. The filter 4200 produces a filtered data stream at least conceptually arranged in a set of N time-frequency planes 4250 (M>N).

The time-frequency-space decision feedback equalizer 4000 advantageously enables the separation of signals within an OTFS communication system in a manner that substantially maximizes utilization of the available bandwidth. Such signal separation is useful in several contexts within an OTFS communication system. These include separation, at a receiver fed by multiple co-located or non-co-located antennas, of signals transmitted by a set of co-located or non-co-located antennas of a transmitter. In addition, the time-frequency-space decision feedback equalizer 4000 enables the separation, from signal energy received from a remote transmitter, of echoes received by a receive antenna in response to transmissions from a nearby transmit antenna. This echo cancellation may occur even when the transmit and receive signal energy is within the same frequency band, since the two-dimensional channel-modeling techniques described herein enable accurate and stationary representations of the both the echo channel and the channel associated with the remote transmitter. Moreover, as is discussed below the signal separation capability of the disclosed time-frequency-space decision feedback equalizer enables deployment of OTFS transceivers in a mesh configuration in which neighboring OTFS transceivers may engage in full duplex communication in the same frequency band with other such transceivers in a manner transparent to one another.

Again with reference to FIG. 40, operation of an exemplary OTFS system may be characterized as the transmission, from each antenna instance associated with a transmitter, of a time-frequency plane representing a two-dimensional information array being sent. Each such antenna instance, whether co-located or non-co-located, may simultaneously transmit two-dimensional information planes, each independent of the other. The information in each of these information planes may be shifted in time and frequency using the same basis functions. During transmission from each of N transmit antenna instances to each of M receive antenna instances, the information within each transmitted plane is differently affected by the different two-dimensional channels linking one of the N transmit antenna instances to each of the M receive antenna instances.

At each of the M antenna instances associated with an OTFS receiver, each entry within the two-dimensional array of received signal energy being collected will typically include a contribution from each of the N transmit antenna instances involved in transmitting such signal energy. That is, each of the M receive antenna instances collects a mixture of the two-dimensional, time-frequency planes of information separately sent by each of the N transmit antenna instances. Thus, the problem to be solved by the equalizer 4000 may be somewhat simplistically characterized as inversion of the N×M "coupling matrix" representative of the various communication channels between the N OTFS transmit antenna instances and the M OTFS receive antenna instances.

In one embodiment each of the N transmit antenna instances sends a pilot signal which may be differentiated from the pilot signals transmitted by the other N−1 antenna instances by its position in the time-frequency plane. These pilot signals enable the OTFS receiver to separately measure each channel and the coupling between each antenna instance. Using this information the receiver essentially initializes the filters present within the equalizer 4000 such that convergence can be achieved more rapidly. In one embodiment an adaptive process is utilized to refine the inverted channel or filter used in separating the received signal energy into different time-frequency-space planes. Thus, the coupling channel between each transmit and receive antenna instance may be measured, the representation of the measured channel inverted, and that inverted channel representation used to separate the received signal energy into separate and distinct time-frequency planes of information.

As noted above, the channel models associated with known conventional communication systems, such as OFDM-based systems, are one-dimensional in nature. As such, these models are incapable of accurately taking into consideration all of the two-dimensional (i.e., time-based and frequency-based) characteristics of the channel, and are limited to providing an estimate of only one such characteristic. Moreover, such one-dimensional channel models change rapidly relative to the time scale of modern communication systems, and thus inversion of the applicable channel representation becomes very difficult, if possible at all.

The stationary two-dimensional time-frequency channel models described herein also enable OFTS systems to effectively implement cross-polarization cancellation. Consider the case in which a transmit antenna instance associated with an OFTS transceiver is configured for horizontally-polarized transmission and a nearby receive antenna of the OFTS transceiver is configured to receive vertically-polarized signal energy. Unfortunately, reflectors proximate either the transmit or receive antenna may reflect and cross-polarize some of the transmitted horizontally-polarized energy from the transmit antenna, some of which may be directed to the receive antenna as a vertically-polarized reflection. It is believed that a two-dimensional channel model of the type disclosed herein is needed in order to decouple and cancel this cross-polarized reflection from the energy otherwise intended for the receive antenna.

Similarly, full duplex communication carried out on the same channel requires echo cancellation sufficiently robust to substantially remove the influence of a transmitter on a nearby receiver. Again, such echo cancellation is believed to require, particularly in the case of moving reflectors, an accurate two-dimensional representation of at least the echo channel in order to permit the representation to be appropriately inverted.

OTFS Transceiver Using Spreading Kernel

As discussed above, embodiments of the OTFS method may involve generating a two-dimensional matrix by spreading a two-dimensional input data matrix. In addition, time/frequency tiling may be utilized in transport of the two-dimensional matrix across a channel. In this approach each matrix column may be tiled as a function of time; that is, each column element occupies a short symbol time slice utilizing the full available transmission bandwidth, with time gaps optionally interposed between subsequent columns. Alternatively, the matrix columns may be tiled and transported as a function of frequency; that is, each element of the column occupies a frequency bin for a longer period of time, with time gaps optionally interposed between subsequent columns.

In other embodiments a spreading kernel may be used to effect spreading of the input data matrix. In this case two-dimensional spreading may be achieved through, for example, a two-dimensional cyclic convolution with a spreading kernel, a convolution implemented using a two-dimensional FFT, multiplication with the two-dimensional DFT of the spreading kernel, followed by a two-dimensional inverse Fourier transform. A wide variety of spreading kernels may be utilized; however, the two-dimensional DFT of the selected kernel should lack any zeroes so as to avoid division by zero during the dispreading process. Moreover, spreading may also be achieved using alternate methods of convolutions, transforms and permutations. Masking (i.e., element by element multiplication) may also be utilized as long as each operation in invertible.

Figures 44A, 44B:
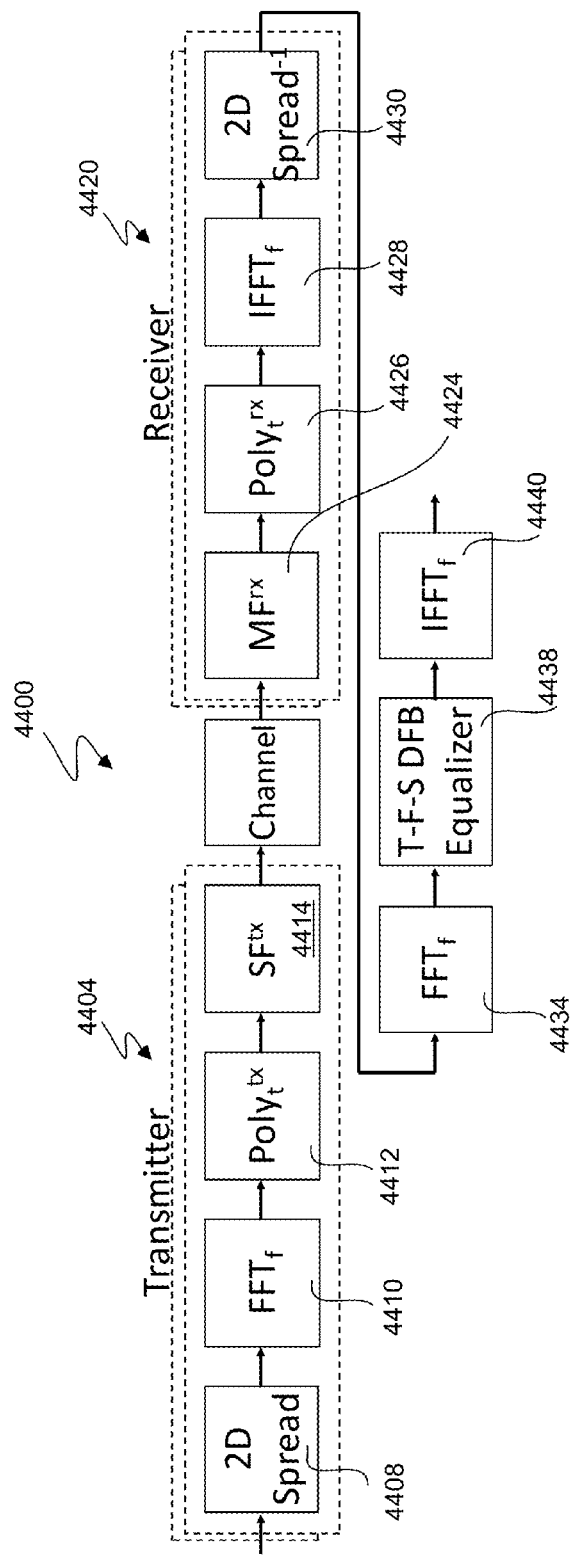
FIGS. 44A and 44B provide block diagrammatic representations of embodiments of first and second OTFS transceivers configured to utilize a spreading kernel.

Attention is now directed to FIGS. 44A and 44B, which provide block diagram representations of embodiments of a first OTFS transceiver 4400 and a second OTFS transceiver 4450 configured to utilize a spreading kernel. Reference will be made to the first OTFS transceiver 4400 of FIG. 44A in describing principles of OTFS communication using a spreading kernel. The second OTFS transceiver 4450 is substantially similar in principle to the first OTFS transceiver 4400 but is characterized by an architecture believed to enable more efficient signal processing.

As shown in FIG. 44A, a transmitter 4404 of the first OTFS transceiver 4400 includes two-dimensional spreading block 4408, an FFT block 4410 and first and second time-frequency tiling elements 4412, 4414. The first and second time-frequency tiling elements 4412, 4414 are configured to effect time-frequency tiling of the two-dimensionally spread input data and may, for example, be implemented using one or more filter banks. The two-dimensional spreading block 4408 and FFT block 4410 cooperatively effect spreading of the two-dimensional input data by performing a series of operations using, for example, a spreading kernel selected from a wide family of unitary matrices. In one embodiment this series of operations includes two-dimensional cyclic convolution with the spreading kernel, convolution implemented using a two-dimensional FFT, multiplication using two-dimensional Discrete Fourier Transform of the spreading kernel, and a two-dimensional inverse Fourier transform. This results in cyclically shifting the kernel matrix "up" along the column direction by an amount corresponding to an information index (yielding a time shift) and multiplying by a diagonal tone whose frequency is set by the information index. All resulting transformed matrices are then summed together in order to generate the two-dimensional spread matrix, each element of which is carried using a transformed Kernel (basis matrix).

A receiver 4420 of the first OTFS transceiver 4400 includes first and second inverse time-frequency tiling elements 4424, 4426 configured to effect an inverse of the tiling operation performed by the time-frequency tiling elements 4412 and 4414. A two-dimensional IFFT block 4428 and despreading block 4430 are configured to perform the inverse of the spreading operation performed by the two-dimensional spreading block 4408 and the FFT block 4410. The received data is then converted using an FFT block 4434 prior to being equalized by a time-frequency-space decision feedforward/feedback analyzer block 4438. The equalized data is then converted using an IFFT block 4440.

Turning now to FIG. 44B, a transmitter 4454 of the second OTFS transceiver 4450 includes a two-dimensional spreading arrangement comprised of an FFT block 4458 and a multiplier 4460 addressed by a Fourier mask. Within the transmitter 4454, each information element is represented as a cyclic shift of a kernel matrix in both a horizontal (row) and vertical (column) direction corresponding to the applicable information element index (row and column position in the input two-dimensional information array). In the implementation of FIG. 44B, the spreading kernel is selected such that its two-dimensional DFT is comprised entirely of non-zero elements (thus enabling the resulting matrix to be inverted without forming singularities). The resulting matrix goes through a DFT transformation of the rows to represent the two-dimensional spread information element. All resulting transformed matrices are then summed together in order to generate the resulting two-dimensional spread information matrix.

As shown in FIG. 44B, an arrangement of time-frequency tiling elements 4462, 4464 and 4466 are configured to effect time-frequency tiling of the two-dimensionally spread input data output by the multiplier 4460. The time-frequency tiling elements 4464 and 4466 may, for example, be implemented using one or more filter banks.

A receiver 4470 of the second OTFS transceiver 4450 includes a serial arrangement of inverse time-frequency tiling elements 4474, 4476, 4478 configured to effect an inverse of the tiling operation performed by the time-frequency tiling elements 4462, 4464 and 4466. A multiplier 4480 is configured to multiply the output produced by the inverse time-frequency tiling elements 4474, 4476 and 4478 by an inverse mask. Next, an IFFT block 4482 converts the output of the multiplier 4480 and provides the result to a time-frequency-space decision feedforward/feedback analyzer block 4488. The equalized data is then converted by an IFFT block 4492.

Mesh Networking

Figure 50:
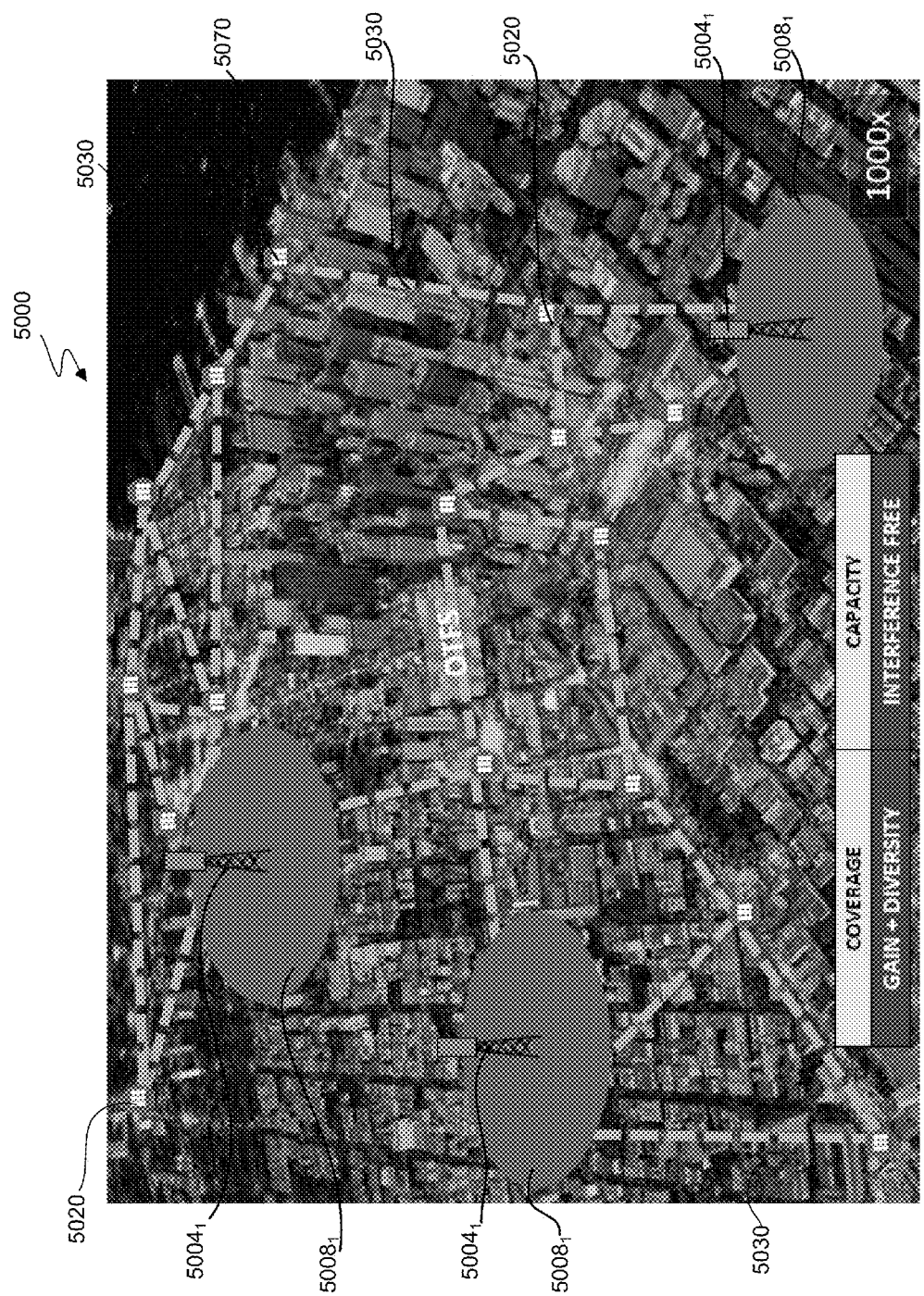
FIG. 50 shows an OTFS mesh network within the context of a cellular communication system comprised of cell sites and associated cell coverage areas.
Figure 51:
FIG. 51 shows an OTFS mesh network organized around a set of wired network gateways.
Figure 52:
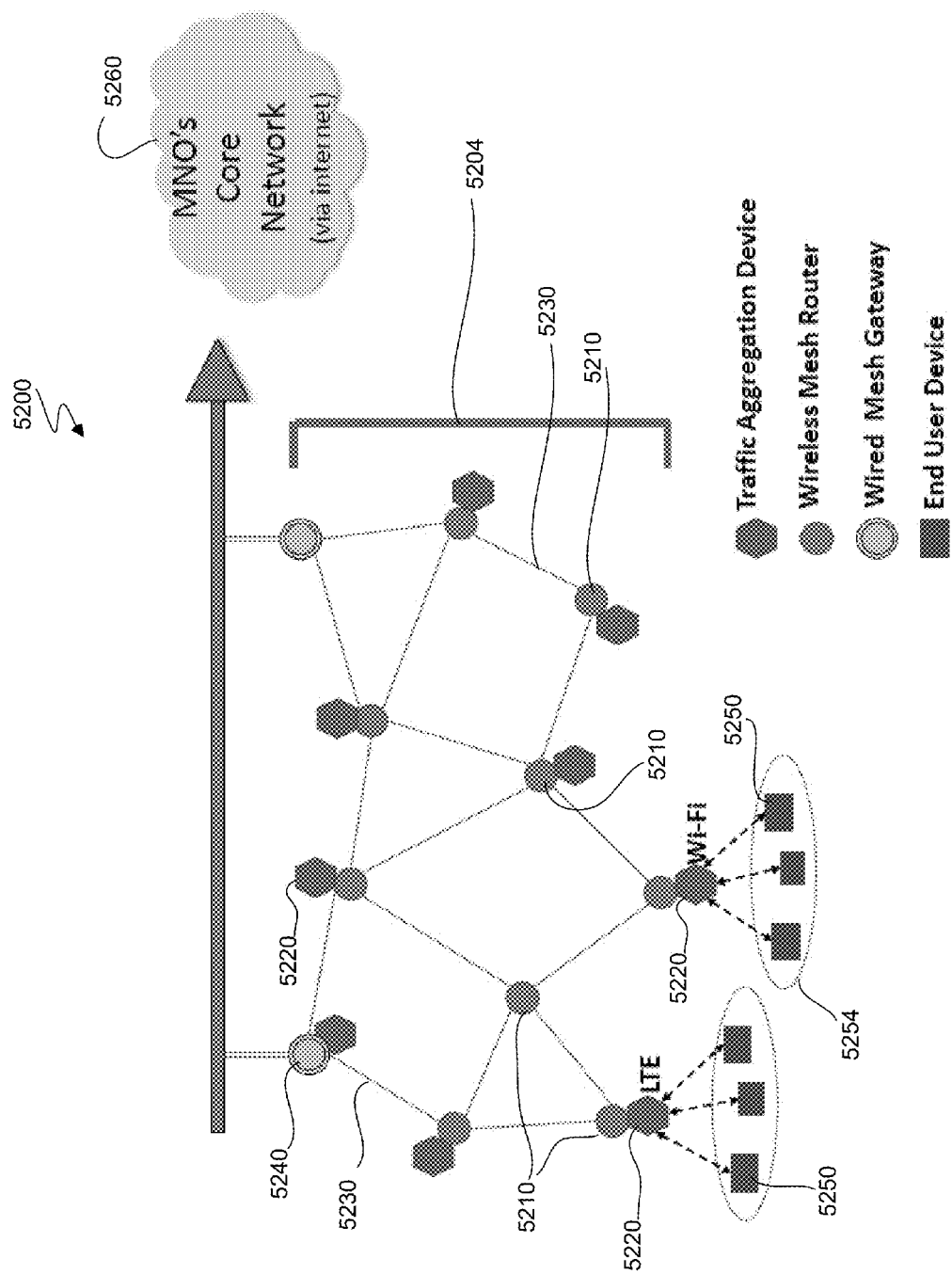
FIG. 52 shows an OTFS mesh network system comprised of a single-channel wireless mesh network including a plurality of mesh elements.

Attention is now directed to FIGS. 50-52, which illustratively represent mesh network implementations of OTFS communication systems. The OTFS mesh networks depicted in FIGS. 50-52 advantageously leverage the time-frequency-space equalization and echo cancellation techniques described herein to enable OTFS mesh nodes to engage in full duplex communication with other such nodes on the same communication channel, whether or not such communication channel is also used by neighboring OTFS mesh nodes.

Referring to FIG. 50, there is shown an OTFS mesh network 5000 within the context of a cellular communication system comprised of cell sites 5004 and associated cell coverage areas 5008. As may be appreciated from FIG. 50, significant gaps may exist between the coverage areas 5008.

The mesh network 5000 comprises a plurality of OTFS wireless mesh nodes 5020 operative to provide wireless communication coverage to fixed or mobile devices within areas of high demand which are generally outside of the range of the coverage areas 5008. For the reasons discussed above, each OTFS wireless mesh node 5020 may be configured for full duplex wireless communication with other such mesh nodes 5020 over the same frequency band. This full duplex wireless communication over the same frequency band is represented in FIG. 50 by wireless communication links 5030. In the embodiment of FIG. 50 each of the wireless mesh links 5030 operates over an identical frequency range.

Turning now to FIG. 51, there is shown an OTFS mesh network 5100 organized around a set of wired network gateways 5110. The mesh network 5100 comprises a plurality of OTFS wireless mesh nodes 5120 operative to provide wireless communication to fixed or mobile devices within areas proximate each of the nodes 5120. Each OTFS wireless mesh node 5120 may be configured for full duplex wireless communication with other such mesh nodes 5120 over the same frequency band. This full duplex wireless communication over the same frequency band is represented in FIG. 51 by wireless mesh links 5130. In the embodiment of FIG. 51, the wireless mesh nodes 5120 are self-organizing in the sense that the nodes 5120 are configured to discover each other and to determine all possible paths over links 5130 to each wired network gateway 5110. Accordingly, network routing techniques may be employed to route packetized information between and among the mesh nodes 5120 and the wired network gateways 5110 in both directions over the wireless mesh links 5130.

FIG. 52 shows an OTFS mesh network system 5200 comprised of a single-channel wireless mesh network 5204 including plurality of mesh elements. In one embodiment certain of the mesh elements of mesh network 5204 preferably include an OTFS wireless mesh router 5210 and a traffic aggregation device 5220 (e.g., and LTE node or Wi-Fi access point) serving end user devices 5250 within a respective coverage area 5254. Each OTFS wireless mesh router 5210 may be configured for full duplex wireless communication with other such mesh nodes 5210 over the same frequency band. In the embodiment of FIG. 52, the wireless mesh nodes 5210 are self-organizing in the sense that the nodes 5210 are configured to discover each other and to determine all possible paths over OTFS wireless links 5230 to each wired network gateway 5240. Accordingly, network routing techniques may be employed to route packetized information between and among the mesh nodes 5120 and a wired network 5244—via the wired network gateways 5110—in both directions over the wireless mesh links 5130. As shown, the wired network 5244 may provide a conduit to a wide area network through which information packets are routed between the mesh network 5204 and a core network 5260 of a mobile network operator.

In one embodiment mesh spatial gain may be achieved by using neighboring mesh nodes 5120 to support the simultaneous parallel transmission of streams of information using an identical frequency band over a single point to point link. This approach may improve signal transmission gain by using neighboring nodes 5120 to effectively create a distributed transmit source, thereby achieving gain through spatial signal separation.

Some embodiments of the systems and methods described herein may include computer software and/or computer hardware/software combinations configured to implement one or more processes or functions associated with the methods such as those described above and/or in the related applications. These embodiments may be in the form of modules implementing functionality in software and/or hardware software combinations. Embodiments may also take the form of a computer storage product with a computer-readable medium having computer code thereon for performing various computer-implemented operations, such as operations related to functionality as describe herein. The media and computer code may be those specially designed and constructed for the purposes of the claimed systems and methods, or they may be of the kind well known and available to those having skill in the computer software arts, or they may be a combination of both.

Examples of computer-readable media within the spirit and scope of this disclosure include, but are not limited to: magnetic media such as hard disks; optical media such as CD-ROMs, DVDs and holographic devices; magneto-optical media; and hardware devices that are specially configured to store and execute program code, such as programmable microcontrollers, application-specific integrated circuits ("ASICs"), programmable logic devices ("PLDs") and ROM and RAM devices. Examples of computer code may include machine code, such as produced by a compiler, and files containing higher-level code that are executed by a computer using an interpreter. Computer code may be comprised of one or more modules executing a particular process or processes to provide useful results, and the modules may communicate with one another via means known in the art. For example, some embodiments of systems described herein may be implemented using assembly language, Java, C, C#, C++, or other programming languages and software development tools as are known in the art. Other embodiments of the described systems may be implemented in hardwired circuitry in place of, or in combination with, machine-executable software instructions.

The foregoing description, for purposes of explanation, used specific nomenclature to provide a thorough understanding of the claimed systems and methods. However, it will be apparent to one skilled in the art that specific details are not required in order to practice the systems and methods described herein. Thus, the foregoing descriptions of specific embodiments of the described systems and methods are presented for purposes of illustration and description. They are not intended to be exhaustive or to limit the claims to the precise forms disclosed; obviously, many modifications and variations are possible in view of the above teachings. The embodiments were chosen and described in order to best explain the principles of the described systems and methods and their practical applications, they thereby enable others skilled in the art to best utilize the described systems and methods and various embodiments with various modifications as are suited to the particular use contemplated. It is intended that the following claims and their equivalents define the scope of the systems and methods described herein.

What is claimed is:

1. A method, comprising:
   wirelessly receiving a first modulated signal from a first user device, the first modulated signal being generated based upon a time-frequency transformation of first user data wherein the first user data is associated with a first transmission interval of an orthonormal time frequency shifting (OTFS) transmission matrix having dimensions of time and frequency;
   wirelessly receiving a second modulated signal from a second user device, the second modulated signal being generated based upon a time-frequency transformation of second user data wherein the second user data is associated with a different transmission interval of the OTFS transmission matrix; and
   processing the first modulated signal and the second modulated signal.

2. A method, comprising:
   wirelessly receiving a first modulated signal from a first user device, the first modulated signal being generated based upon a time-frequency transformation of first user data wherein the first user data is associated with a first frequency band of an orthonormal time frequency shifting (OTFS) transmission matrix having dimensions of time and frequency;
   wirelessly receiving a second modulated signal from a second user device, the second modulated signal being generated based upon a time-frequency transformation of second user data wherein the second user data is associated with a different frequency band of the OTFS transmission matrix; and
   processing the first modulated signal and the second modulated signal.

3. A method, comprising:
   wirelessly receiving a first modulated signal from a first user device, the first modulated signal being generated based upon a time-frequency transformation of first user data wherein the first user data is associated with a first area of an orthonormal time frequency shifting (OTFS) transmission matrix having dimensions of time and frequency;
   wirelessly receiving a second modulated signal from a second user device, the second modulated signal being generated based upon a time-frequency transformation of second user data wherein the second user data is associated with a second area of the OTFS transmission matrix; and
   processing the first modulated signal and the second modulated signal.

4. A wireless device comprising:
   an antenna;
   a receiver coupled to the antenna, the receiver being configured to:
     receive a first modulated wireless signal from a first user device wherein the first modulated wireless signal is generated based upon a time-frequency transformation of first user data wherein the first user data is associated with a first transmission interval of an orthonormal time frequency shifting (OTFS) transmission matrix having dimensions of time and frequency, and
     receive a second modulated wireless signal from a second user device wherein the second modulated wireless signal is generated based upon a time-frequency transformation of second user data wherein the second user data is associated with a different transmission interval of the OTFS transmission matrix; and
   a processor in communication with the receiver, the processor being configured to process the first modulated signal and the second modulated signal.

5. A wireless device comprising:
   an antenna;
   a receiver coupled to the antenna, the receiver being configured to:
     receive a first modulated wireless signal from a first user device wherein the first modulated wireless signal is generated based upon a time-frequency transformation of first user data wherein the first user data is associated with a first frequency band of an orthonormal time frequency shifting (OTFS) transmission matrix having dimensions of time and frequency, and
     receive a second modulated wireless signal from a second user device wherein the second modulated wireless signal is generated based upon a time-frequency transformation of second user data wherein the second user data is associated with a different frequency band of the OTFS transmission matrix; and
   a processor in communication with the receiver, the processor being configured to process the first modulated signal and the second modulated signal.

6. A wireless device comprising:
   an antenna;
   a receiver coupled to the antenna, the receiver being configured to:
     receive a first modulated wireless signal from a first user device wherein the first modulated wireless signal is generated based upon a time-frequency transformation of first user data wherein the first user data is associated with a first area of an orthonormal time frequency shifting (OTFS) transmission matrix having dimensions of time and frequency, and
     receive a second modulated wireless signal from a second user device wherein the second modulated wireless signal is generated based upon a time-frequency transformation of second user data wherein the second user data is associated with a second area of the OTFS transmission matrix; and
   a processor in communication with the receiver, the processor being configured to process the first modulated signal and the second modulated signal.

* * * * *